United States Patent
Freda et al.

(10) Patent No.: US 12,185,413 B2
(45) Date of Patent: Dec. 31, 2024

(54) METHODS FOR PERFORMING DISCONTINUOUS RECEPTION ON SIDELINK

(71) Applicant: InterDigital Patent Holdings, Inc., Wilmington, DE (US)

(72) Inventors: Martino Freda, Laval (CA); Tao Deng, New York, NY (US); Moon-Il Lee, Melville, NY (US); Tuong Hoang, Montreal (CA); Ghyslain Pelletier, Montreal (CA); Paul Marinier, Brossard (CA); Jaya Rao, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/781,584

(22) Filed: Jul. 23, 2024

(65) Prior Publication Data
US 2024/0381485 A1  Nov. 14, 2024

Related U.S. Application Data

(63) Continuation of application No. 17/798,294, filed as application No. PCT/US2021/017909 on Feb. 12, 2021.
(Continued)

(51) Int. Cl.
*H04W 76/28* (2018.01)
*H04W 52/02* (2009.01)
*H04W 92/18* (2009.01)

(52) U.S. Cl.
CPC ....... *H04W 76/28* (2018.02); *H04W 52/0232* (2013.01); *H04W 92/18* (2013.01)

(58) Field of Classification Search
CPC . H04W 76/28; H04W 52/0232; H04W 92/18; H04W 52/0216; H04W 52/0274;
(Continued)

(56) References Cited

U.S. PATENT DOCUMENTS

2021/0059005 A1   2/2021  Hosseini et al.
2021/0227465 A1*  7/2021  Kung ............... H04W 76/27
(Continued)

FOREIGN PATENT DOCUMENTS

EP         3500028 A1    6/2019
WO    WO 2018/016882 A1  1/2018

OTHER PUBLICATIONS

3rd Generation Partnership Project (3GPP); "Study on architecture enhancements for EPS and 5G System to support advanced V2X services (Release 16), Technical Specification Group Services and System Aspects, Technical Report", 3GPP TR 23.786 V0.8.0, Aug. 2018, 83 pages.
(Continued)

*Primary Examiner* — Ayaz R Sheikh
*Assistant Examiner* — David Zhijun Sun
(74) *Attorney, Agent, or Firm* — Flaster Greenberg P.C.

(57) ABSTRACT

A method for determining a DRX operation in a wireless transmit receive unit (WTRU) that has information indicating multiple DRX configurations, includes selecting a first DRX configuration from the multiple DRX configurations based on a first cast type and an associated first quality of service (QOS) information for a first sidelink radio bearer (SLRB) configuration, selecting a second DRX configuration from the multiple DRX configurations based on a second cast type and an associated second QoS information for a second SLRB configuration, determining a sidelink monitoring time based on a combination of an active time associated with the first DRX configuration and an active
(Continued)

time associated with the second DRX configuration, and monitoring a sidelink control channel using the determined sidelink monitoring time.

20 Claims, 11 Drawing Sheets

Related U.S. Application Data

(60) Provisional application No. 63/125,446, filed on Dec. 15, 2020, provisional application No. 63/090,992, filed on Oct. 13, 2020, provisional application No. 63/061,388, filed on Aug. 5, 2020, provisional application No. 62/985,604, filed on Mar. 5, 2020, provisional application No. 62/975,238, filed on Feb. 12, 2020.

(58) Field of Classification Search
CPC ..... H04W 52/0229; H04W 4/08; H04W 4/40; Y02D 30/70
See application file for complete search history.

(56) References Cited

U.S. PATENT DOCUMENTS

| | | | |
|---|---|---|---|
| 2022/0361284 A1* | 11/2022 | Liu | H04W 52/0216 |
| 2022/0369154 A1* | 11/2022 | Hu | H04W 28/0263 |
| 2023/0064488 A1 | 3/2023 | Han et al. | |
| 2023/0107246 A1* | 4/2023 | Kang | H04W 52/02 |
| | | | 370/329 |

OTHER PUBLICATIONS

3rd Generation Partnership Project (3GPP); "Proximity-based services (ProSe); Stage 2 (Release 15), Technical Specification Group Services and System Aspects, Technical Specification", 3GPP TS 23.303 V15.1.0, Jun. 2018, 130 pages.

3rd Generation Partnership Project (3GPP); "Study on enhancement of 3GPP Support for 5G V2X Services (Release 15)", Technical Specification Group Services and System Aspects; Technical Report, 3GPP TR 22.886 V15.1.0, Mar. 2017, 58 pages.

3rd Generation Partnership Project (3GPP); "Enhancement of 3GPP support for V2X scenarios, Stage 1 (Release 15), Technical Specification Group Services and System Aspects, Technical Specification", 3GPP TS 22.186 V15.2.0, Sep. 2017, 16 pages.

3rd Generation Partnership Project (3GPP); Physical Layer Procedures, Technical Specification Group Radio Access Network; Evolved Universal Terrestrial Radio Access (E-UTRA); Physical layer procedures (Release 14), 3GPP TS 36.213 V14.4.0, Sep. 2017, 7 pages.

3rd Generation Partnership Project (3GPP); "Running CR to TS 38.331 for 5G V2X with NR Sidelink", Huawei et al., 3GPP Draft; 38331, for 5G V2X with NR Sidelink, Mobile Competence Centre; 650, Route Des Lucioles, vol. Ran WG2, No. ChongQing, China; Oct. 14, 2019-Oct. 18, 2019 Oct. 12, 2019, 73 pages.

ETSI MCC: "Report of 3GPP TSG RAN2#107bis meeting, Chongqing, China", 3GPP Draft; R2-1914301, 3rd Generation Partnership Project (3GPP), Mobile Competence Centre: 650, Route Des Lucioules; F-06921 Sophia-Antipolis Cedex; France, No; Oct. 14, 2019-Nov. 17, 2019), 106 pages.

Shrivastava Vinay Kumar et al: "Joint Optimization of Energy Efficiency and Scheduling strategies for Side-Link Relay System", 2017 IEEE Wireless Communications and Networking Conference (WCNC), IEEE, Mar. 19, 2017, 6 pages.

* cited by examiner

Establishment of Secure Layer-2 Link Over PC5

METHODS FOR PERFORMING DISCONTINUOUS RECEPTION ON SIDELINK

CROSS REFERENCE TO RELATED APPLICATIONS

This application is a Continuation of U.S. patent application Ser. No. 17/798,294, Aug. 8, 2022, which is the U.S. National Stage Application under 35 U.S.C. § 371 of International Patent Application No. PCT/US2021/017909, filed Feb. 12, 2021, which claims the benefit of U.S. Provisional Patent Application No. 63/125,446, filed Dec. 15, 2020, U.S. Provisional Patent Application No. 63/090,992, filed Oct. 13, 2020, U.S. Provisional Patent Application No. 63/061,388 filed Aug. 5, 2020, U.S. Provisional Patent Application No. 62/985,604, filed Mar. 5, 2020, and U.S. Provisional Patent Application No. 62/975,238, filed Feb. 12, 2020, all of which are incorporated by reference herein in their entirety for all purposes.

BACKGROUND 5G specifications include a provision for Discontinuous Reception (DRX) to save energy in mobile units. The main purpose of DRX is to lower battery consumption when there is no uplink or downlink data to process by the mobile device. As such, the mobile device may enter a sleep mode where the RF interfaces are in low power or off mode. When traffic relevant to the mobile unit is expected the mobile unit may power up to process messages.

SUMMARY

In one embodiment, a method for determining a DRX operation in a wireless transmit receive unit (WTRU) that has information indicating multiple DRX configurations, includes selecting a first DRX configuration from the multiple DRX configurations based on a first cast type and an associated first quality of service (QOS) information for a first sidelink radio bearer (SLRB) configuration, selecting a second DRX configuration from the multiple DRX configurations based on a second cast type and an associated second QoS information for a second SLRB configuration, determining a sidelink monitoring time based on a combination of an active time associated with the first DRX configuration and an active time associated with the second DRX configuration, and performing sidelink (SL) control channel monitoring using the determined sidelink monitoring time.

In one embodiment, a method for use in a receive wireless transmit receive unit (RX WTRU), having received configuration information including a first RX resource pool and a second RX resource pool, includes changing a monitoring from the first RX resource pool to monitoring the first RX resource pool and a second RX resource pool upon reception of data, and changing the monitoring from the first RX resource pool and the second RX resource pool back to monitoring the first RX resource pool after an elapsed time.

In one embodiment, a method for determining discontinuous reception (DRX) operation in a wireless transmit receive unit (WTRU) having multiple DRX configurations includes one or more of selecting one of the multiple DRX configurations associated with a type of received transmission and/or intended recipient, selecting one of the multiple DRX configurations associated with a quality of service (QOS) of an ongoing service, selecting one of the multiple DRX configurations associated with a priority of recently received data, selecting one of the multiple DRX configurations provided by another WTRU, and selecting one of the multiple DRX configurations based on a static configuration associated with sidelink.

In another embodiment, a method for determining discontinuous reception (DRX) operation in a wireless transmit receive unit (WTRU), having multiple DRX configurations, includes one or more of determining DRX operation based on a forward reservation signal and/or a planned reception or transmissions, wherein the WTRU performs DRX operation between the planned transmissions or receptions, and determining DRX operation based on at least one of a Channel Busy Ratio (CBR), sidelink control information (SCI) contents, configuration of the WTRU, a presence of pending transmissions, a time period between planned transmissions or receptions, and latency in the WTRU buffers.

In another embodiment, a method for determining discontinuous reception (DRX) operation in a wireless transmit receive unit (WTRU) includes one or more of determining DRX operation based on sidelink transmissions or reception at the WTRU, and determining DRX operation based on a combination of transmission activity and reception activity.

In another embodiment, a method performed by a first WTRU to determining a transmission opportunity to reach a peer WTRU which is in a discontinuous reception (DRX) operation, includes one or more of determining a transmission time based on availability of the peer WTRU, the availability dependent on at least one of a time related to a last transmission to the peer WTRU and a quality of service (QOS) for a transmission to the peer WTRU, determining a transmission time based on the peer WTRU active period, determining different offsets for a transport block retransmission associated with a transmission opportunity, and transmitting an activity signal on a sidelink communication to indicate an intention to transmit from the WTRU to the peer WTRU.

In another embodiment, a method for use in a receive wireless transmit receive unit (RX WTRU), where the RX WTRU is configured with a first receive (RX) resource pool and a second RX resource pool includes changing a monitoring from the first RX resource pool to monitoring the first RX resource pool and a second RX resource pool upon reception of quality of service data, and changing the monitoring from the first RX resource pool and the second RX resource pool to monitoring the first RX resource pool upon expiration of an inactivity timer.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
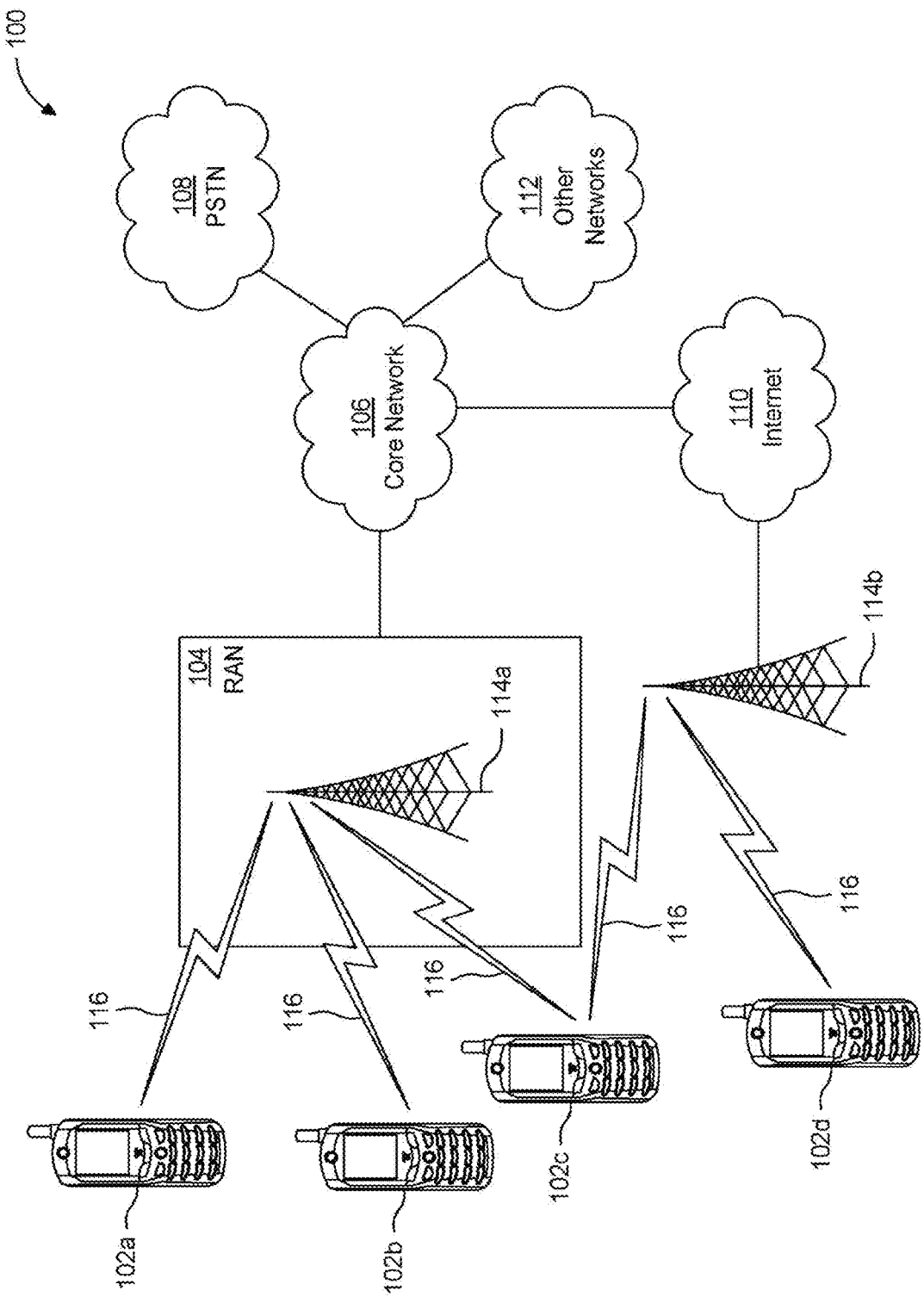
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
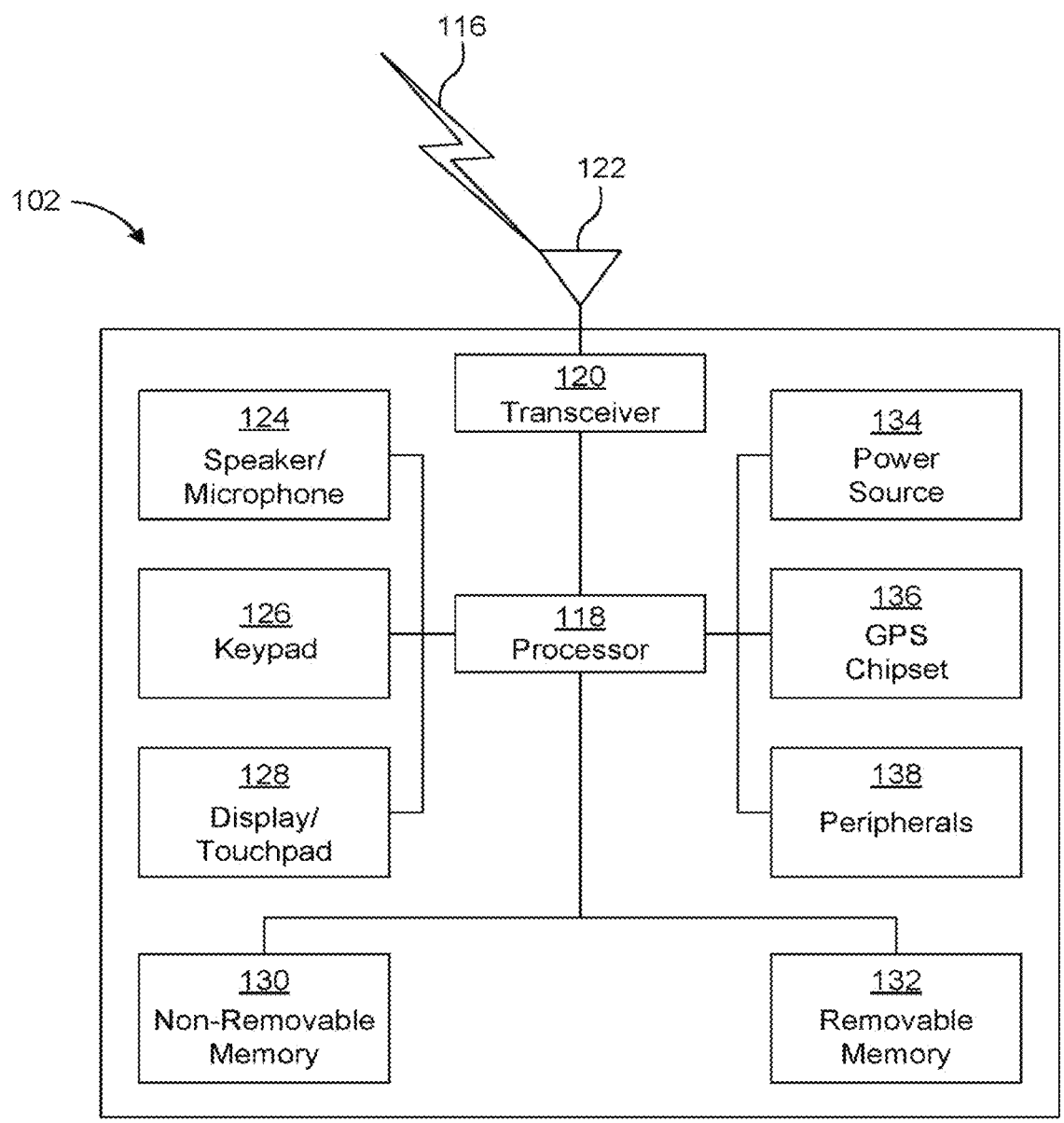
FIG. 1B is a system diagram illustrating an example WTRU that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
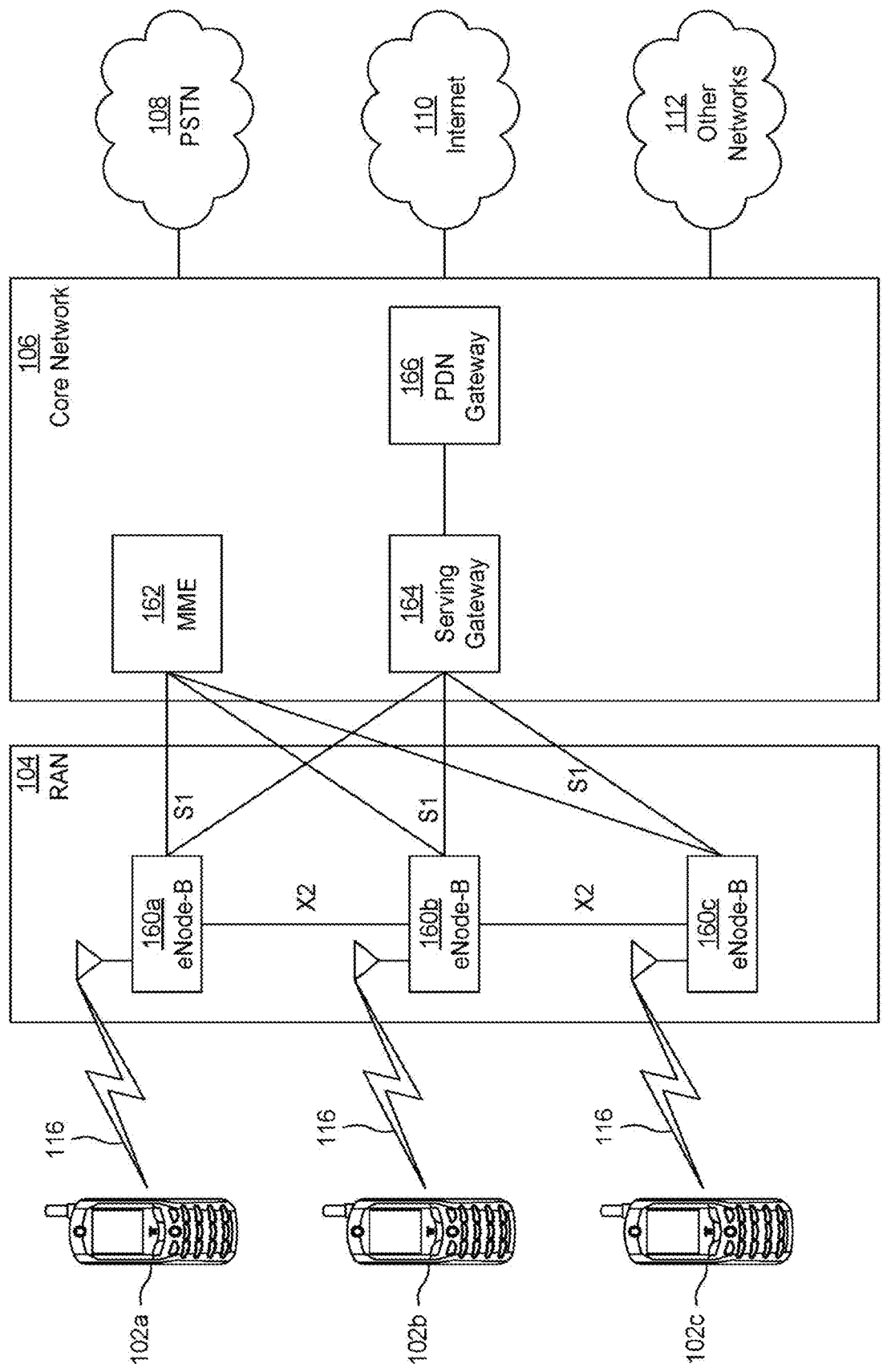
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the SI interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
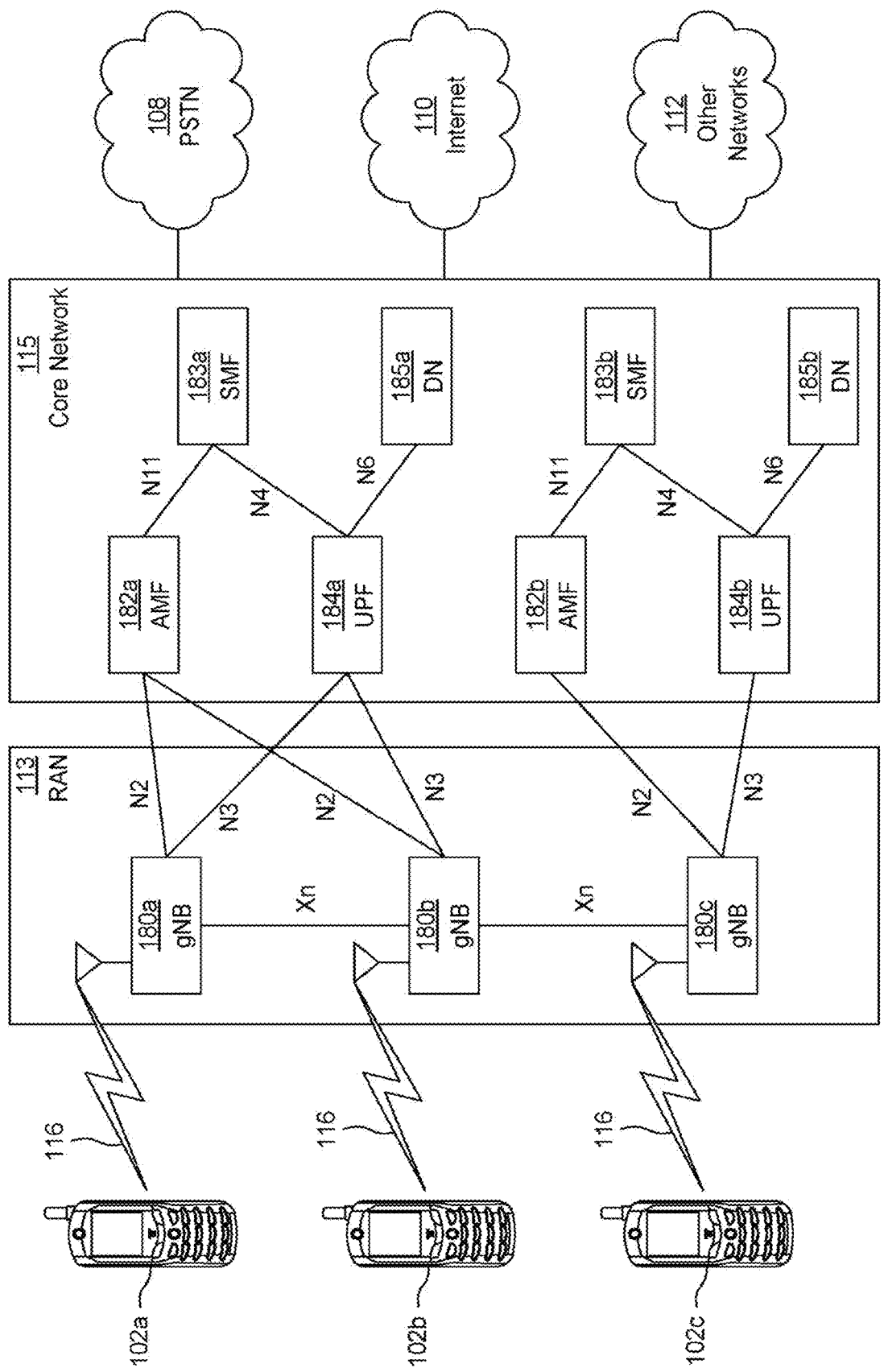
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of (non-access stratum) (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU/UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit/receive unit (WTRU) may be an example of a user equipment (UE). Hence the terms UE and WTRU may be used in equal scope herein.

Vehicular communication is a mode of communication whereby WTRUs can communicate with each other directly. There are two scenarios for Vehicle to Everything (V2X) operations:
(a) In-coverage scenario, where WTRUs receive assistance from the network to start transmitting and receiving V2X messages and (b) Out of coverage scenario, where WTRUs use some pre-configured parameters to start transmitting and receiving V2X messages.

V2X communication is supported in Release-14 LTE and was inspired from the previous work on Device-to-Device (D2D) communications. V2X communication services can consist of the four different types:
(i) V2V (Vehicle to Vehicle): Vehicular WTRUs can communicate with each other directly.
(ii) V2I (Vehicle to Infrastructure): Vehicular WTRUs can communicate with road side Units/eNode B (RSUs/cNB).
(iii) V2N (Vehicle to Network): Vehicular WTRUs can communicate with core network.
(iv) V2P (Vehicle to Pedestrian): Vehicular WTRUs can communicate with WTRUs with special conditions e.g. low battery capacity.

V2X Resource Allocation in LTE

Long Term Evolution (LTE) defines two modes of operation in V2X communication. Mode 3, where the network gives the WTRU a scheduling assignment for V2X sidelink (SL) transmission. Mode 4, where the WTRU autonomously select the resources from a configured/pre-configured resource pool. Furthermore, V2X LTE defines two categories of resource pools, receiving pools which are monitored for receiving V2X transmission, and V2X transmitting pools which are used by WTRUs to select the transmission resource in Mode 4. Transmitting pools are not used by WTRUs configured in Mode 3. A resource pool defines the subset of available subframes and resource blocks for either sidelink transmission or reception. Sidelink communication is a half-duplex scheme and a WTRU can be configured with multiple transmit resource pools and multiple receive resource pools.

In LTE, the resource pools are semi-statically signaled to WTRUs via Radio Resource Control (RRC) signaling. In Mode 4, the WTRU uses sensing before selecting a resource from the RRC configured transmitting pool. LTE V2X does not support dynamic resource pools reconfiguration; pool configuration may only be carried via System Information Block (SIB) and/or dedicated RRC signaling. As used herein for New Radio (NR) V2X using discontinuous reception (DRX), a resource pool may include the set of resources used in V2X communication. The receive (RX) resource pool defines the resources that a WTRU should monitor. The transmit (TX) resource pool defines the resources that a WTRU can use to transmit. Not all resources in sidelink can be used for TX or RX. Herein, a RX resource pool may also be termed a RX pool and a TX resource pool may also be termed a TX pool.

New Radio (NR) V2X Access Technology

Third Generation Partnership Project (3GPP) includes the next generation of wireless systems, called "New Radio" (NR). NR systems is expected to support a number of use cases such as enhanced Mobile Broadband (eMBB), ultra-high reliability and low latency communications (URLLC).

3GPP may support enhanced V2X (eV2X) communication in NR systems. eV2X in NR is expected to support new services for both safety and non-safety scenarios e.g. sensor sharing, automated driving, vehicle platooning, remote driving. Different eV2X services require different performance requirements and for some scenarios, 3 ms latency is required.

New Use Cases for NR V2X NR V2X is expected to support new use cases, as defined in 3GPP standards. In particular, the following use cases are to be supported:

Vehicle Platooning. Vehicle Platooning enables the vehicles to dynamically form a group travelling together. All the vehicles in the platoon receive periodic data from the leading vehicle, in order to carry on platoon operations. This information allows the distance between vehicles to become extremely small, i.e., the gap distance translated to time can be very low (sub second). Platooning applications may allow the vehicles following to be autonomously driven.

Advanced Driving. Advanced Driving enables semi-automated or fully-automated driving. Longer inter-vehicle distance is assumed. Each vehicle and/or roadside unit (RSU) shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

Extended Sensors. Extended Sensors enables the exchange of raw or processed data gathered through local sensors or live video data among vehicles, RSUs, devices of pedestrians and V2X application servers. The vehicles can enhance the perception of their environment beyond what their own sensors can detect and have a more holistic view of the local situation.

Remote Driving. Remote Driving enables a remote driver or a V2X application to operate a remote vehicle for those passengers who cannot drive themselves or a remote vehicle located in dangerous environments. For a case where variation is limited and routes are predictable, such as public transportation, driving based on cloud computing can be used. In addition, access to cloud-based back-end service platform can be considered for this use case group.

Quality of Service (QOS) for NR V2X

A QoS model is usedfor NR V2X in by 3GPP. In Rel-14 V2X as documented in TS 23.285, the QoS over PC5 is supported with the ProSe Per-Packet Priority (PPPP). Application layer is allowed to mark the packets with the PPPP, which indicates the required QoS level. Certain enhancements were added, e.g. by allowing deriving of Packet Delay Budget (PDB) from the PPPP.

The new QoS requirements for NR V2X are captured in TS 22.186. The new performances key performance indicators (KPIs) were specified with the following parameters:
  Payload (Bytes);
  Transmission rate (Message/Sec);
  Maximum end-to-end latency (ms);
  Reliability (%);
  Data rate (Mbps);
  Minimum required communication range (meters).

Note that the same set of service requirements apply to both PC5 based V2X communication and Uu based V2X communication. These QoS characteristics could be well represented with 5G QoS indicator (5QI) defined in TS 23.501.

One possibility is to have a unified QoS model for PC5 and Uu, i.e. also use 5QIs for V2X communication over PC5, such that the application layer can have a consistent way of indicating QoS requirements regardless of the link used.

Considering the 5GS V2X capable WTRUs, there are three different types of traffic: broadcast, multicast, and unicast. For unicast type of traffic, the same QoS Model as that of Uu can be utilized, i.e. each of the unicast link could be treated as a bearer, and QoS flows could be associated with it. All the QoS characteristics defined in 5QI and the additional parameter of data rate could apply. In addition, the minimum required communication range could be treated as an additional parameter specifically for PC5 use. A similar consideration applies to multicast traffic, as it can be treated as a special case of unicast, i.e. with multiple defined receivers of the traffic.

For broadcast traffic, there is no bearer concept. Therefore, each of the message may have different characteristics according to the application requirements. The 5QI should then be used in the similar manner as that of the PPPP/PPPR, i.e. to be tagged with each of the packet. 5QI is able to represent all the characteristics needed for the PC5 broadcast operation, e.g. latency, priority, reliability, etc. A group of V2X broadcast specific 5QIs (i.e. VQIs) could be defined for PC5 use.

The PC5 QoS parameters are negotiated at the establishment of one-to-one communication procedure, so the one-to-one communication establishment procedure defined in TS 23.303 is enhanced to support PC5 QoS parameters negotiation between two WTRUs. After the PC5 QoS parameters negotiation procedure, the same QoS is used in both directions.

Figure 2:
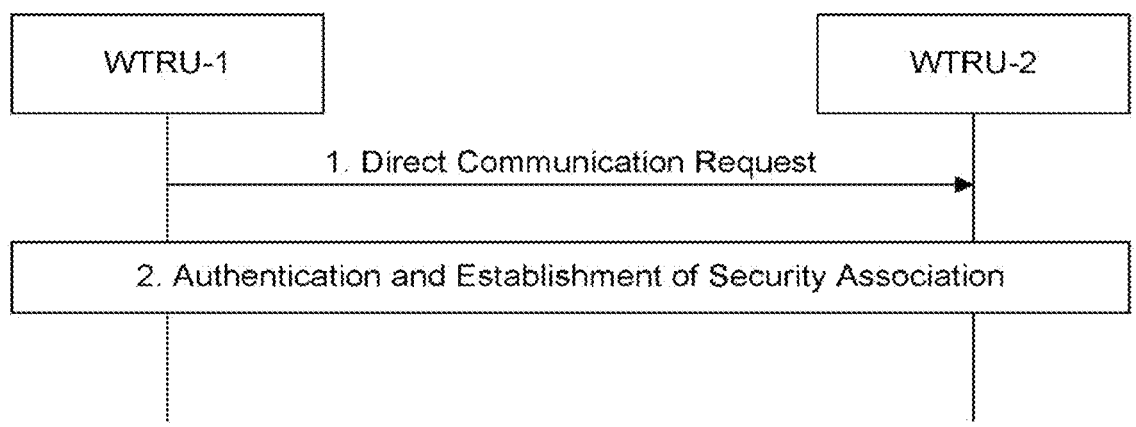
FIG. 2 depicts an example establishment of a secure Layer-2 Link over PC5.

WTRUs engaged in one to one communication negotiate PC5 QoS parameters during the link establishment procedure as depicted in FIG. 2. Message 1 is a Direct Communication Request (DCR) message and message 2 is an Authentication and Establishment of security association message. At message 1, UE-1 (WTRU-1) sends a Direct Communication Request message to UE-2 (WTRU-2) in order to trigger mutual authentication. This message includes the requested PC5 QoS parameters. At message 2, UE-2 (WTRU-2) initiates the procedure for mutual authentication. The UE-2 (WTRU-2) includes the accepted PC5 QoS parameters in a response message.

Discontinuous Reception (DRX) in NR Uu

CONNECTED mode DRX is specified for power savings in NR Uu for WTRU in RRC_CONNECTED. DRX is based on a configured schedule of wake-up times at the WTRU. If the WTRU receives Physical Downlink Control Channel (PDCCH) scheduling during its wakeup time, it remains awake for a certain time until no further scheduling is received. The WTRU can be configured with the following example parameters.
  drx-onDurationTimer: the duration at the beginning of a DRX Cycle;
  drx-SlotOffset: the delay before starting the drx-onDuration Timer;
  drx-InactivityTimer: the duration after the PDCCH occasion in which a PDCCH indicates a new uplink (UL) or downlink (DL) transmission for the MAC entity;
  drx-RetransmissionTimerDL (per DL Hybrid Hybrid ARQ, Hybrid Automatic Repeat Request (HARQ) process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the WTRU shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

A WTRU configured with DRX will then determine its active time (the time when the WTRU actively monitors PDCCH) based as follows:

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in subclause 5.1.5 of Rel. 14) is running; or a Scheduling Request is sent on Physical Uplink Control Channel (PUCCH) and is pending (as described in subclause 5.4.4 of Rel. 14); or a PDCCH indicating a new transmission addressed to the Cell Radio Network Temporary Identifier (C-RNTI) of the MAC entity has not been received after successful reception of a Random Access Response for the preamble not selected by the MAC entity (as described in subclause 5.1.4 of Rel. 14).

Partial Sensing and Random Selection in LTE V2X

Another power savings mechanism that was introduced in LTE V2X (for use by pedestrian WTRUs) was the aspect of partial sensing. With partial sensing, the WTRU is configured by upper layers with a minimum number of candidate subframes in the resource selection window [T1, T2], where the specific subframes are selected by WTRU implementation. The WTRU then performs sensing only on subframes in the sensing window which are an integer number of reservation periods from the candidate subframes, thus reducing the amount of resources the WTRU needs to perform sensing on in the sensing window.

Another possibility for pedestrian WTRUs is to perform random selection on the resource pool. If a resource pool is configured for random selection, the WTRU can perform selection of resources without considering any sensing results during the sensing procedure.

Objectives

Power savings in sidelink (PC5 reference point interface) may be achieved by performing discontinuous reception (i.e. skipping certain slots in decoding of sidelink resources). However, since a WTRU may be communicating with multiple peer WTRUs, the WTRU performing DRX should preferably act to ensure that it performs DRX when no peer WTRUS (regardless of broadcast, groupcast, or unicast) perform transmission. Alternatively, a transmitting WTRU preferably acts to select a resource such that it knows that an intended WTRU is performing active reception.

Methods for Sidelink DRX

Definition of Activity Behavior

In the following embodiments, the WTRU may determine the activity behavior on sidelink (PC5 reference point interface) in order to reduce power consumption of a WTRU performing sidelink transmissions. A PC5 reference point interface may be used in an instance where a WTRU directly communicates with another (peer) WTRU over a direct channel between the units. In this instance, the communication with a core network is not required. Examples of such PC5 direct communication may include communication between a vehicle and other devices such as in vehicle to vehicle (V2V) or vehicle to anything (V2X) communication in which WTRUs are used. In one example the WTRU may be a mobile handheld device employing sidelink (SL) communications on a PC5 reference point communication link. Activity behavior can be determined dynamically by the WTRU (e.g. based on measurements on sidelink and/or reception and/or transmission of data from upper layers or peer WTRUs) or it may be configured by the network. Additionally, the network (NW) may configure a set of measured values (e.g. of a sidelink measurement) and the corresponding activity behavior to be applied by the WTRU. Additionally, the WTRU may change its activity behavior as a result of an event related to reception of data (possibly from a peer WTRU, or from upper layers for transmission), or reception of an explicit indication to change such activity behavior.

In the discussion hereinbelow, activity behavior may include any of the following:

Whether a WTRU is considered active (e.g. is monitoring Physical Sidelink Control Channel (PSCCH) and/or PDCCH) at a given time;

DRX cycle: The periodicity of wakeup when performing DRX;

The value of and/or whether to use one or more timers associated with DRX behavior, and similar to Uu DRX timers, such as:

The inactivity timer associated with sidelink transmission;

The on-duration timer associated with sidelink transmissions;

The slot offset;

The retransmission timer;

The HARQ Round-trip time (RTT) timer; and/or

DRX short cycle timer.

Length of the sensing window for sensing of resource pool for mode 2 resource allocation.

The number candidate subframes or slots in the resource selection window that can be considered by the WTRU for transmission (as resulting sensing resources).

Number of subchannels, number of frequency resources, the initial, the last subchannel/frequency resource to be considered for sensing and/or resource allocation.

The number of candidate frequency resources or subchannels that can be considered by the WTRU for transmission.

The offset(s) of one or multiple sensing and/or resource selection subframes. For example, the WTRU may determine to perform sensing in subframes $n1+j*P$, where n1 is an offset to the system frame number (SFN), j is an integer value and P is a fixed/(pre-)configured value.

The number of repetitions performed by the WTRU, possibly of the same transport block (TB), possibly in order to reach other WTRU(s) which are in DRX.

The amount of resources and/or the resource pool(s) that can be used for reception/transmission/sensing—for example, the WTRU may be configured with multiple activity states (e.g. low, high, medium, etc.), whereby each state may be associated with the usage of one or more resources amounts and/or resource pools, and may transition between such states based on any of the events described herein.

Activation/deactivation of channel state information (CSI) reporting, and/or HARQ feedback, or whether the WTRU is allowed/required to send HARQ and/or CSI feedback.

The number of receive (RX) antennas used or activated. The number of RX antennas used or activated may be referred to as maximum number of layers. For example, a first configuration of RX antenna may support a single layer as a maximum number of layers and a second configuration of RX antenna may support two layers as a maximum number of layers.

How the WTRU sets specific values for certain timers (e.g. HARQ RTT timer, retransmission timer). That is, whether the WTRU is expected to receive during a retransmission timer or not.

Hereafter, the following terms may be usefully understood to be related to a unit of time: a slot, sub-slot, mini-slot, subframe, transmission time interval (TTI), radio frame, and the like. In addition, a symbol and set of symbols may be indicative of a time period in which such symbols occur.

Activity Behavior Determined Based on an Event Related to Sidelink Reception, Transmission Activity behavior may be determined based on reception and/or measurement of a trigger by the WTRU, similar to reception of PDCCH for Uu DRX. Specifically, the WTRU may reset an inactivity timer, or have any behavior which modifies its activity behavior as a result of any of:

Reception of a sidelink control information (SCI), whereby the SCI may be:
  a. An SCI which schedules data,
  b. An SCI which performs announcement of future scheduled data,
  c. An SCI which may trigger a Channel State Information (CSI) reporting,
  d. An SCI which may request an associated HARQ feedback for a scheduled data,
  e. An SCI (e.g., a first SCI) which may indicate that another SCI (e.g., a second SCI) needs to be monitored, decoded, attempt to be decode, or received.
  f. An SCI which does not reserve another resource in the future, and/or an SCI which is associated with a periodic sidelink (SL) process but which is the last reserved resource associated with the periodic sidelink process,
  g. An SCI which indicates that resource reselection was performed,
  h. An SCI which contains some explicit indication to modify the receive WTRUs' activity behavior.

Reception of a downlink control information (DCI) scheduling sidelink.

Reception of sidelink data whereby such data is addressed (by the L2 ID) to the RX WTRU Reception of a sidelink wake-up signal (S-WUS), wherein a WTRU may monitor Physical Sidelink Control Channel (PSCCH) in a certain time window when the WTRU received an associated S-WUS signal. Otherwise, the WTRU may skip monitoring PSCCH in the time window. The S-WUS may be one or more of following:
  a. A special SCI indicating wake-up. A SCI may be used for S-WUS, wherein the S-WUS may include at least one or more of following:
    (i) Destination ID or source ID; For WTRUs configured with the destination ID or source ID may wake up.
    (ii) Time window size; A WTRU may monitor a PSCCH during the indicated time window after the S-WUS reception.
    (iii) Resource pool index or identity; a WTRU may monitor a PSCCH in the indicated resource pool(s).
    (iv) Bandwidth part (BWP) and/or a carrier ID; a WTRU may monitor a PSCCH in the indicated BWP and/or carrier.
  b. A predetermined signal (e.g., sequence, reference signal) which may indicate to wake-up.

Reception of a data PDU on sidelink, where such data PDU may further be conditioned in terms of the property of the PDU or the contents of the PDU.
  a. For example, the WTRU may have a first behavior (e.g. reset an inactivity timer) when the PDU contains data from a logical channel (LCH) and may have a second behavior (e.g. don't reset an inactivity timer) when the PDU contains control information (e.g. MAC control element (CE), CSI feedback, PC5 RRC, etc.).

Reception of SL synchronization signal block/physical broadcast channel (SSB/PBCH).

Reception of PC5-RRC signaling.

Reception of sidelink MAC control element (SL MAC CE).

For example, the WTRU may start DRX on PSCCH upon occurrence of any of the above events. For example, the WTRU may start/stop an inactivity timer (who's expiry results in initiated DRX on PSCCH) upon the occurrence of any of the above events.

In the following section, it is assumed that any solution/embodiment referring to "reception" can mean reception of any of the above triggers.

Power-Saving Behavior can be Enabled/Disabled Autonomously by a WTRU

A WTRU may disable any power-saving behavior, or any behavior related to power savings described herein, autonomously based on one or a number of factors determined at the WTRU, which may include:

WTRU location: For example, the WTRU may be configured with a set of zones or a zone configuration whereby power saving behavior described herein is enable/disabled (e.g. enabled in zone X, and disabled in zone Y).

Current WTRU battery life: For example, the WTRU may be (pre) configured with a percentage battery life above which power-saving behavior is disabled.

Resource pool congestion: For example, the WTRU may be (pre) configured with a range of Channel Busy Ratio (CBR) above/below which power saving behavior is disabled/enabled.

Upper layer service configuration: For example, the WTRU may be (pre) configured with a set of L2 IDs for which power savings should be disabled. Such WTRU may disable a power saving behavior (possibly for that service, or for all transmissions) when it is configured with such a service.

Cast type: For example, the WTRU may be (pre) configured to perform a power savings behavior only for certain cast types (e.g. for unicast transmissions, but not for broadcast/groupcast transmissions).

Properties associated with group information: For example, the WTRU may be (pre) configured to perform a power savings behavior only when its group transmissions are associated with a certain group size, knowledge of group size, knowledge of its WTRU ID within a group, or similar group information provided by the upper layers. For example, a WTRU may perform a specific power savings behavior only when the group size associated with a specific group transmission/reception is known.

QoS of current pending or configured transmissions/receptions (e.g. based on the sidelink radio bearer (SLRB) configuration): For example, the WTRU may disable a power-savings behavior when it and/or a peer WTRU has a SLRB established with a certain QoS, or for which the SLRB configuration indicates that such behavior should be disabled.

WTRU capability: For example, if other operations at the WTRU cause the WTRU to exceed its capabilities, power savings can be enabled to meet WTRU capabilities.

Number of radio access technology (RAT) s: For example, if a WTRU uses both LTE V2X and NR V2X, the WTRU may use power saving behavior for NR V2X operation (or LTE V2X operation). However, if the WTRU uses NR V2X only, the WTRU may disable power saving behavior.

WTRU speed (absolute or relative): For example, if a WTRU speed is higher than a threshold, the WTRU may disable power saving behavior. Otherwise, the WTRU may enable power saving behavior.

Radio link failure (RLF) is declared: When an RLF is declared, the WTRU may enable/disable power saving behavior.

Activity Behavior can be Characterized by Performing or not Performing Different Behaviors on Sidelink at the WTRU Activity behavior at a WTRU can be characterized by performing or not performing different behaviors on sidelink. Specifically, in the discussion herein, any reference to "DRX" or "Sidelink DRX" may refer to a different activity behavior performed on sidelink during an active time versus a non-active time. Active time versus non-active time may be characterized by differences in the WTRUs:

PSCCH decoding.
  a. Whether the WTRU performs PSCCH decoding. For example, the WTRU may perform PSCCH decoding when active and not perform PSCCH decoding when not active.
  b. The number or configuration of subchannels it performs decoding on. For example, the WTRU may perform PSCCH decoding on a first set of subchannels when active, and on a second set of subchannels when not active. For example, the WTRU may assume a first configuration of subchannels when active, and a second configuration of subchannels when not active.
  c. The intensity of PSCCH decoding. For example, the WTRU may perform a first number of blind decoding on PSCCH when active, and perform a second set of blind decodings on PSCCH when not active.
  d. The type of PSCCH decoding. For example, the WTRU may decode for a first set of SCI transmissions when active, and may decode of a second set of SCI transmissions when not active. For example, the WTRU may decode first stage SCI only when active, and may decode both first and second stage SCI when not active. For example, the WTRU may decode a first SCI (e.g. SCI-1) when not active, and may only decode the associated SCI (e.g. SCI-2) when active. For example, in one application of the above, a WTRU may change from monitoring of SCI-1 only to monitoring of both SCI-1 and SCI-2 based on fixed time periods for SCI-2 monitoring and/or a time since last successful decoding of SCI-2.
  e. Performing of sensing. For example, the WTRU may change any of the following behavior depending on whether the WTRU is active or not active.
    (i) Whether the WTRU performs sensing or not, possibly for the purposes of resource selection.
    (ii) Whether the WTRU updates sensing results or not.
    (iii) Any parameters or properties related to the WTRUs sensing algorithm, such as the sensing window, the number of time/frequency resources being sensed, the thresholds used for determining availability of data, whether sensing for pre-emption is performed, etc.

Synchronization. The WTRU may perform transmission of a synchronization source when it is active, and may not perform such transmission when it is not active.

Measurements on sidelink (e.g. related to unicast) such as CSI request/reporting, reference signal received power (RSRP) measurement request/reporting, radio link monitoring/radio link failure (RLM/RLF).
  a. For example, active behavior may consist of performing such operations, while inactive may consist of not performing such actions.
  b. For example, active behavior may consist of performing such operation with:
    (i) a different configuration of time frequency (more often, less often).
    (ii) different configuration of parameters (e.g. different number of HARQ failures/radio link control (RLC) failures/timers/counters for RLF, different averaging for reference received radio power (RSRP) measurements).

(A). Channel Quality Feedback Transmission Behavior May Depend on WTRU Activity State/Behavior In one example, a WTRU's channel quality feedback behavior may depend on the WTRU activity state. Specifically, a WTRU may perform certain operations with respect to channel quality feedback when the WTRU is in active state. The WTRU may perform a second set of actions (e.g. limited operations) when the WTRU is in inactive state. In this solution, and any example solution herein, channel quality feedback may refer to either CSI feedback, or RSRP report, or any other measurement feedback provided by a WTRU to another WTRU. Herein, example solutions specific to CSI feedback may also be applied to RSRP reports or other types of feedback, or vice versa. The WTRU may change any of the following with respect to its feedback reporting behavior depending on its activity state:

Whether the WTRU reports feedback or not.

The priority associated with feedback report transmission with respect to other transmissions.

The timing of feedback report transmission, possibly with respect to the CSI request.

The timing of the feedback report transmission, possibly with respect to the activity behavior (e.g. the DRX on period).

Resource selection rules associated with selection of resources for transmission of feedback.

The WTRU may further change any of the above aspects with respect to feedback reporting behavior conditioned on other aspects of the activity behavior itself when CSI feedback is transmitted. For example, the timing of the DRX on-duration (or activity behavior) with respect to the CSI feedback window may further determine the modified CSI feedback transmission behavior.

In one example embodiment, a WTRU may respond to a CSI feedback request only when not configured with DRX or power-saving mechanism associated with some limited activity behavior. In another example embodiment, a WTRU may provide CSI feedback only when such feedback can be provided within the on-duration (or some expected decoding period) of the said WTRU or the peer WTRU, otherwise, the WTRU may drop the CSI feedback transmission. In another example embodiment, the WTRU may send CSI feedback only when the WTRU has pending data to transmit and other DRX-based rules described herein allow such transmission. If the WTRU does not have pending data transmissions, possibly within the CSI feedback window, the WTRU may drop the CSI feedback transmission (i.e. CSI feedback only transmission not allowed during DRX). In another example embodiment, a WTRU may change the priority associated with the CSI feedback transmission depending on the activity state. Specifically, the WTRU may set the feedback to a first priority when the WTRU is in active state, and the WTRU may set the priority to a second value when the WTRU is in inactive state. In another example embodiment, the WTRU may decide whether to send the CSI feedback depending on the CSI feedback window/latency relative to the activity period duration. Specifically, the WTRU may send the CSI feedback if the latency falls within the DRX activity time/duration, or some within some offset of the end of the DRX activity time/duration. Otherwise, the WTRU may drop the CSI feedback report. In one example, a WTRU may be configured with periodic RSRP reports. A WTRU may measure and/or report such RSRP only if the periodic reporting time coincides with an active monitoring period of the said WTRU and/or the peer WTRU. A WTRU may further delay such measurement and/or reports to the next active monitoring period of the said WTRU and/or peer WTRU.

For example, an RX WTRU may monitor or receive PSCCH within an active time and the WTRU may skip monitoring or receiving PSCCH outside active time. An RX WTRU is a WTRU that receives with respect to a specific transmission from another entity, such as a peer WTRU or a core network entity. A TX WTRU is a WTRU that transmits to another entity, such as a peer WTRU.

a. A PSCCH may consist of one or more SCIs. For example, two stage SCI may be used wherein a PSCCH may carry two SCIs (e.g., SCI-1 and SCI-2). A WTRU may monitor a first stage SCI (e.g., SCI-1) only in OFF-duration (or inactive time) and the WTRU may monitor a first and a second stage SCIs (e.g., SCI-1 and SCI-2) in ON-duration (or active time). Hereafter, active time, On-duration, a time window wherein a WTRU may monitor PSCCH, and active window may be used interchangeably. In addition, inactive time, Off-duration, a time window wherein a WTRU may skip monitoring PSCCH, and inactive window may be used interchangeably herein.
    (i) A SCI-1 may include DRX activity related information. For example, the SCI-1 may indicate a specific WTRU or a group of WTRUs to wake up or skip monitoring PSCCH for a certain duration.
    (ii) A SCI-1 may indicate that whether the associated SCI-2 may need to be monitored or not in OFF-duration. Therefore, a WTRU may determine whether the WTRU needs to decode the associated SCI-2 based on the indication in SCI-1. If the WTRU is ON-duration, the WTRU may decode SCI-2 irrespective of the indication in SCI-1 or if there is no such indication in SCI-1.
  b. When a WTRU is configured with more than one destination ID, the WTRU may monitor PSCCH in a slot which is active slot in any of DRX configurations. Alternatively, a WTRU may determine one of destination ID with the highest L1 priority and activity is based on the DRX configuration associated with the determined destination ID.

RX WTRU Behavior for Determining Activity/Inactivity
Methods for Determining the WTRUs Activity Behavior Configuration
  (For example, how does the WTRU determine its DRX cycle configuration parameters).
Separate Reception Activity Defined Per Type of Transmission and/or Intended Recipient, and Combined by the WTRU In the examples which follow, a particular WTRU behavior may depend on the specific cast type of the transmission. For example, determination of DRX configuration based on L2 ID may be used only for groupcast and/or broadcast. Other examples of such behavior limited to a specific cast type are not precluded.

In one embodiment, a WTRU may define or be configured with different reception activity behavior (e.g. set of timers, a DRX mechanism, a DRX configuration, etc.) for different types of transmission on sidelink. In addition, the WTRU may further combine the independent activity behavior associated with each type of data being received to determine an overall activity behavior or set of resources to monitor for the WTRU (for example, to determine the actual slots and/or subchannels for which the WTRU performs sidelink control channel monitoring). A WTRU may, potentially monitor SCI only for the specific transmission type for which DRX activity behavior associated with that transmission type indicates that the WTRU should be active. Alternatively, a WTRU may be active if at least one the activity behavior of one if its transmission types indicate the WTRU should be active.

Different reception activity behavior may be performed for each different transmission type. Different reception activity behavior may consist of, for example:
  A different DRX cycle, cycle offset, on duration, DRX timers, etc, or any similar configuration;
    a. For example, a WTRU may maintain a DRX cycle, offset, inactivity timer, etc. for each transmission type. A WTRU may, for example, reset an inactivity timer associated only with a first transmission type when SCI is received associated with that first transmission type.
  A different functionality within a DRX mechanism;
    a. For example, a WTRU may use inactivity timer/ mechanism for determining wakeup times for one transmission type but not with another transmission type.
  A different DRX scheme:
    a. For example, a WTRU may use a timer-based scheme for DRX as described herein (i.e. DRX cycle, on duration, etc) for one transmission type, and use pool based scheme as described herein (e.g. monitoring a separate resource pool for active state vs non-active state, or implementing DRX with the monitoring of a sparse resource pool) for another transmission type A different set of active resources, either defined as a specific resource pool, or a defined set of active resources within a resource pool.

Specifically, the transmission types may encompass any or a combination of the following:

Transmission mode (i.e. mode 1 transmission vs mode 2 transmission).

Cast type (i.e. unicast vs groupcast vs broadcast).

Uu vs sidelink transmissions/receptions.

Operation on different resource pools with different configuration (e.g. physical sidelink feedback channel (PSFCH) configuration, DRX configuration, etc.).

Sidelink reception processes, possibly associated with different properties such as:
 a. HARQ enabled vs HARQ disabled.
 b. Different expected reception periodicity based on, for example, the SCI reserving resources for that sidelink process.
 c. Periodic vs non-periodic transmissions.
 d. Reception on a configured grant vs on a dynamic grant.

Slot type (e.g., normal slot vs. mini slot, wherein mini slot referred to as a slot containing a smaller number of consecutive symbols).

L2 source and/or destination ID.

DRX/Activity Behavior Configuration (possibly identified by the TX WTRU in its transmissions).

A QoS parameter (e.g. L1/L2 priority, PC5 QoS Identifier (PQI) or group of PQI).

A WTRU may determine whether it should be active based on a reception activity behavior associated with a transmission type. For example, a WTRU may maintain one or more timers (e.g. inactivity timer, etc) associated with reception of a specific transmission type. For example, a WTRU may reset its inactivity timer upon reception of data associated with that transmission type. A WTRU may determine whether it is active for that transmission type based on whether one or more timers are running and/or not running.

A WTRU may be configured with a rule to determine when it is active (e.g. monitors SL PSCCH for SL scheduling) based on the independent activity behaviors associated with each transmission type. Such rule may be based on any of:

Having at least one of the activity behaviors indicate the WTRU should be active.

Having a specific number of the activity behaviors indicate the WTRU should be active.

Having at least one of the activity behaviors with a (pre) configured or predetermined property indicate the WTRU should be active, where such property may be any of:
 a. A priority or other QoS property.
 b. The presence or value of a specific configuration aspect or parameter, possibly associated with a SLRB, such as the presence of a range parameter associated with an SLRB or whether an RLC entity is configured with an Acknowledged Mode (AM), mode, etc.

A WTRU may determine that it is active (e.g. monitors SL PSCCH) when at least one of the reception activity behaviors indicate it should be active. Alternatively, a WTRU may determine that it is active (e.g. monitors SL PSCCH) when at least one of a subset (possibly configured) of activity behaviors indicate it should be active.

For example, an RX WTRU may be configured with an activity behavior for each of the transmission types, where a transmission type may be any of the factors described above. For example, the RX WTRU may be configured with any of the following for each for each transmission type:

A DRX cycle or period of slots for which a WTRU always monitors PSCCH for scheduling and/or changes to a different RX pool.

An on-duration, or number of, potentially consecutive, slots for which the WTRU monitors PSCCH and/or remains on an active RX pool before changing back to an inactive RX pool.

An inactivity timer, which the WTRU may reset when receiving sidelink scheduling for the transmission type.

A WTRU may determine the slots for active PSCCH monitoring for scheduling based on a combination of each of the independent activity behaviors associated with each transmission type. For example, a WTRU may wakeup to perform PSCCH monitoring for scheduling and/or change RX resource pool according at each of the slots dictated by the DRX cycle of each of the transmission types. For example, a WTRU may start multiple on-duration timers, where each such timer is associated with each of its transmission types and is started when the WTRU wakes up for PSCCH monitoring for scheduling according to corresponding DRX cycle. A WTRU may further start an inactivity timer upon reception of SCI indicating a particular transmission type, where the value of the inactivity timer may be determined based in the indicated configuration. A WTRU may determine that it may stop monitoring PSCCH for scheduling if there are no inactivity timers running and no on-duration timers.

(A). WTRU has Separate Activity Behavior for Broadcast and/or for Each of its Unicast Links In one example, a WTRU may be configured with a SL DRX behavior (e.g. a DRX configuration with a set of timers) for broadcast receptions. In addition, a WTRU may be configured with an additional DRX behavior for each of the unicast link(s) active at the WTRU. The DRX behavior for each cast type may further be defined differently and may consist of any of the behaviors defined herein. Specifically, for broadcast, the WTRU may select a DRX configuration for which reception activity of the WTRU is determined based on received QOS (as described herein). On the other hand, the WTRU may have separate DRX processes or activity behavior for each of the established unicast links, and may define the activity behavior based on the reception of a reservation signal (as described herein). Additionally, the WTRU may further combine the groupcast DRX cycle behavior with all of the independent unicast DRX behaviors to determine a single activity time. Specifically, the WTRU may determine the activity time such that the WTRU may be active based on at least one of the unicast or broadcast DRX behaviors.

In one example, a WTRU may be configured with a DRX behavior (i.e. DRX configuration with a set of timers) for non-periodic (one-shot or asynchronous) transmissions and may be configured to perform DRX based on reception of reservation signals (as discussed herein) for periodic transmissions. A WTRU may monitor PSCCH for periodic transmissions based on reception of SCI reservations (possibly having independent DRX behavior for each periodic reception process) and also adhere to an additional non-periodic DRX configuration for possible reception of one-shot transmissions. In one example application of the above, a WTRU may perform DRX between periodic transmissions and disables DRX when receiving an SCI which indicates presence of an asynchronous transmission.

(B). WTRU has Separate Activity Behavior for Different L2 Source/Destination IDs In one example, a WTRU may be configured (e.g. by the network, or by upper layers) with a reception activity behavior for each source and/or destination L2 ID or group thereof. For example, a WTRU may receive a reception activity behavior or change of such for a particular source and or destination ID from a peer WTRU in PC5-RRC signaling and/or in a MAC CE. For example, a WTRU may receive a reception activity behavior for a specific L2 ID or group of L2 ID in System Information Block (SIB) or dedicated signaling and/or following request of such from the network. For example, a WTRU may receive in PC5-RRC, a DRX configuration (e.g. an on-duration, DRX cycle, inactivity timer, etc.) and/or a set of pools to be used for different activity state, and associated with a source/destination L2 ID. A WTRU may determine its active time from the activity behavior of at least one of the PC5-RRC connections at the WTRU and/or interested source/destination L2 IDs. For example, if the WTRU determines it should be active for at least one L2 source/destination ID (based on the source/destination L2 ID activity behavior), the WTRU may be active and monitor the Physical Sidelink Shared Channel (PSSCH). Specifically, the active time may be defined as the union of the active times defined for each of the WTRU's interested source/destination L2 IDs. A WTRU may maintain a separate activity behavior (e.g. set of timers, on-duration, active resource pool, etc.) for each source/destination L2 ID. A WTRU may perform any behavior described herein on such timer or activity state property (e.g. reset an inactivity timer, determine an on-duration, etc.) based on reception of SCI for which L2 source/destination ID matches the source/destination associated with the activity state behavior.

In the above example, source/destination IDs may encompass any identifiers derived from or related to these identities (e.g. destination index) as well as any indication of service, service type, or similar defined by upper layers. For example, a WTRU may receive a DRX configuration to be applied to a specific destination index, upon reporting the L2 IDs to the network and their associated destination indices.

A WTRU may receive the mapping information of L2 ID to DRX configuration in different ways. In one example, a WTRU may receive a list of DRX configurations, and the applicable or allowed L2 ID(s) for each DRX configuration. In another example, a WTRU may receive a table/list of L2 IDs, and the corresponding DRX configuration (e.g. an index to the DRX configuration) to be applied to each.

(C). WTRU Determines Whether to Perform DRX Based on Whether an Interested L2 ID is Configured for DRX In one example, a WTRU may determine whether to perform SL DRX, or continuous monitoring based on the DRX status of one or more of its configured/interested L2 IDs. For example, a WTRU may receive (e.g. from upper layer, or NW) a configuration of the L2 IDs which are configured/not configured to operate under DRX. A WTRU may operate in SL DRX if all of its interested L2 IDs are configured with DRX. A WTRU may disable DRX if at least one of its interested L2 IDs has DRX disabled or is configured without DRX. A WTRU may enable/disable DRX if an interested L2 ID is added/removed from its list of interested L2 IDs and the condition for enabling/disabling DRX is changed as a result.

(D). WTRU has Separate Activity Behavior for Different Activity Behavior Configuration In one example, a WTRU may be configured with an activity behavior for each of a set of activity behavior configurations. Each such configuration may be identified by a configuration ID. The TX WTRU may transmit the configuration ID with one or more of its transmissions. For example, the TX WTRU may transmit a configuration ID in SCI.

An RX WTRU may be configured with an activity behavior for each of the expected/configured DRX configurations. For example, the RX WTRU may be configured with any of the following for each expected/configured DRX configuration:

A DRX cycle or period of slots for which a WTRU always monitors PSCCH for scheduling and/or changes to a different RX resource pool.

An on-duration, or number of, potentially consecutive, slots for which the WTRU monitors PSCCH and/or remains on an active RX pool before changing back to an inactive RX pool.

An inactivity timer, which the WTRU may reset when receiving sidelink scheduling for the indicated configuration.

A WTRU may determine its expected/configured DRX configurations from NW (pre) configuration and/or from sidelink RRC configuration (e.g. from a peer WTRU).

A WTRU may determine the slots for active PSCCH monitoring for scheduling based on a combination of each of the independent activity behaviors associated with each of the expected/configured DRX configurations. For example, a WTRU may wakeup to perform PSCCH monitoring for scheduling and/or change RX resource pool according at each of the slots dictated by the DRX cycle of each of the expected/configured DRX configurations. For example, a WTRU may start multiple on-duration timers, where each such timer is associated with each of its expected/configured DRX configurations and is started when the WTRU wakes up for PSCCH monitoring for scheduling according to corresponding DRX cycle. A WTRU may further start an inactivity timer upon reception of SCI indicating a particular DRX configuration, where the value of the inactivity timer may be determined based in the indicated configuration. A WTRU may determine that it may stop monitoring PSCCH for scheduling if there are no inactivity timers running (associated with any expected/configured DRX configuration) and no on-duration timers (associated with any expected/configured DRX configuration).

A TX WTRU may select the activity behavior configuration (e.g. the configuration ID to be transmitted in SCI) based on any of the following:

One or more QoS parameters associated with the data being transmitted (e.g. the L2/L1 priority).
  a. For example, a WTRU may select a (pre) configured activity behavior configuration when the transmission is performed with a specific L1/L2 priority.

The SLRB or logical channel (LCH) of the data being transmitted.
  a. For example, a WTRU may select a (pre) configured activity behavior configuration when the transmission contains data from a SLRB or LCH. For example, a WTRU may be configured with a mapping of SLRB or LCH to activity behavior configuration.

Whether the transmission is periodic or non-periodic.

Buffer status of one or more logical channels.

(E). WTRU has Separate Activity Behavior for Different Received Qos

In one example, a WTRU may be configured with a separate activity behavior for one or more values of a QoS parameter. For example, a WTRU may be configured (e.g.

by NW (pre) configuration or sidelink RRC) with a separate activity behavior for each L1/L2 priority. The WTRU may perform independent DRX for each of the interested L1/L2 ID. Specifically, a WTRU may be configured via sidelink RRC with the interested L1/L2 priorities and corresponding activity behaviors. Alternatively, the WTRU may assume all L1/L2 priorities are interested L1/L2 priorities.

(F). WTRU Combines Independent Activity Behavior for Periodic and Non-Periodic Transmissions Examples described herein (DRX between periodic transmissions and inactivity timer following SCI reception) may be combined to define the WTRU behavior under the reception of both periodic and non-periodic data. Specifically, the WTRU may perform reception-based DRX and following a DRX configuration with a DRX cycle, on-duration, and an inactivity timer. Upon reception of an SCI without periodic reservation while the WTRU is active, the WTRU may start an inactivity timer, and may enter DRX upon expiry of such timer. In conjunction, while the WTRU is active (e.g. possibly while the inactivity timer is running) the WTRU may receive an SCI with periodic reception indicated. The WTRU may perform DRX in between transmissions of the periodic SCI transmissions as long as the inactivity timer is not running, and the on-duration timer are not running (i.e. the WTRU is in DRX with respect to aperiodic transmissions). The WTRU may be active only for reception of the periodic SCI in this case.

(G). Reception Activity of a WTRU Determined Based on Received Qos

A WTRU may define its activity behavior based on a QoS related parameter associated with the expected reception. The WTRU may determine the QoS of an expected reception based on any of the following:

The configured services at the WTRU, and one or more QoS parameters associated with each service (e.g. the worst case QoS configured for any service).

The QoS associated with any established or configured bearers from which a WTRU is receiving.

A QoS parameter included in the data/control received by the WTRU at some prior period of time, or over some prior period of time.

Indication from the network.

QoS parameter associated with an established unicast link upon which the reception activity is being defined.

How a WTRU determines the DRX configuration based on QoS may further depend on the cast type. For example, in unicast, the WTRU may determine the QoS based on the QoS profile and/or SLRB configuration established by the TX WTRU (and provided in PC5-RRC signaling by the TX WTRU), and may determine the DRX configuration from this QoS profile/SLRB. For groupcast/broadcast, a WTRU may be configured with a worst case QoS profile associated with a L2 ID. Other examples are provided below. How this is done can fall into any of the following categories.

First Category: The QoS can be Associated/Configured by NW/Upper Layers with the L2 ID:

(1). WTRU Selects a DRX Configuration Associated with the QoS of its Ongoing Services In one example, the WTRU may be configured with multiple DRX configurations (DRX cycle, on-duration, inactivity timer, etc.), possibly associated with a resource pool. Each DRX configuration may be associated with a QoS related property, such as latency, priority, reliability, minimum communication range (MCR) etc., or value derived from any of these (e.g. PQI). A WTRU may be configured (by the network or upper layers) with a sidelink service (e.g. via an interested L2 ID) as well as a mapping between such service and one or more QoS parameters. Such QoS parameter may further represent the worst case QoS parameter. For a WTRU configured in DRX, a WTRU may select the DRX configuration for the resource pool with the associated QoS parameter. Specifically, the WTRU may follow the pattern of wakeup times, and/or apply the timers associated with the DRX configuration of the corresponding QoS configuration.

For example, a WTRU may be configured with a list of interested L2 IDs (e.g. broadcast or groupcast). The WTRU may be configured with one or more QoS values (e.g. PQI) associated with each L2 ID. The WTRU may determine a single DRX configuration for each of its configured QoS values based on a configured mapping (e.g. a DRX configuration, and a set of allowed QoS values). The WTRU may determine its active time based on the combination of the DRX configurations of each of the QoS values for the interested L2 IDs. A WTRU may further select one of multiple DRX configurations if it is configured with multiple DRX configurations allowable for a QoS value. Alternatively, a WTRU may determine a single QoS value from the set of configured QoS values for the one or more L2 IDs. The WTRU may select the minimum/maximum value, may select based on some (pre) configured or predefined table, or may select based on a specific QoS value (e.g. select PQI for which the latency is minimum). Once selected, the WTRU may use the DRX configuration associated with that QoS value. A WTRU may further derive one QoS value for all of its interested services or L2 IDs. Alternatively, a WTRU may derive one QoS value for all of its interested DRX services or L2 IDs of a specific cast type (e.g. broadcast and/or groupcast). Alternatively, a WTRU may select one QoS value for each interested L2 ID.

Second Category: The QoS can be Determined from the Transmissions of the Peer WTRU.

(1). WTRU Selects a DRX Configuration Associated with the Priority (Ies) of Recently Received Data In another example, the WTRU may be configured with multiple DRX configurations/activity behaviors, possibly each associated with a QoS parameter which is provided in a transmission by another WTRU (e.g. an L1 priority or an L2 priority). The WTRU may determine the DRX configuration/activity behavior based on reception of past data tagged with a specific L1/L2 priority. Specifically, the WTRU may select the DRX configuration associated with the priority:

Received in the last transmission prior to entering a specific activity state.

For which the majority of transmissions over a past period of time are associated with the specific priority.

Number of transmissions over some past window of a specific priority is above a threshold.

When multiple transmissions are received with different priority, the WTRU may be configured to select one associated activity behavior based on some specified or (pre) configured rules (e.g. the configuration associated with the highest priority transmission).

For example, a WTRU may determine the value of a timer (e.g. on-duration, inactivity timer, etc.) which determines whether it is active or not based on the priority and/or other received QoS parameter (e.g. MCR), possibly where such received parameter was associated with a transmission which caused a previous active state transition at the WTRU. For example:

A WTRU may determine the DRX cycle and/or on-duration and/or periodicity of RX resource pool change based on the priority of the last SCI scheduling data received by the WTRU.

A WTRU may determine the inactivity timer value (i.e. period of time after which the WTRU moves to DRX) based on the L1 priority in the SCI scheduling data received when such timer is reset. Specifically, a WTRU may start an inactivity timer upon reception of an SCI, whereby expiry of such timer may move the WTRU to DRX. The WTRU may set the value of such timer based on the L1 priority in the SCI which started such timer.

In another example, the WTRU may change from one activity behavior to another activity behavior based on the reception of data tagged with a specific priority. For example, the change of activity behavior may include of a change from short DRX cycle to long DRX cycle or vice versa.

- For example, the WTRU may change from a configured short DRX cycle to a configured long DRX cycle after some time in which it has not received one or more transmissions with a priority higher than some threshold priority.
- For example, the WTRU may change from long DRX to short DRX after a reception of one or more transmissions with a threshold higher than some threshold priority.

(2). WTRU Determines/Changes the DRX Configuration Based on QoS Information Received from any Transmitter (e.g. in a Group)

In another solution, the WTRU may determine/change the activity behavior (e.g. the DRX configuration), based on information received and associated with the link on which a DRX applies or should apply. Determining/changing DRX may involve enabling/disabling DRX. A WTRU may maintain a specific activity behavior or DRX configuration associated with the QoS information of QoS level received in the last transmission received for that link. A WTRU may maintain a specific activity behavior or DRX configuration associated with the worst case QoS transmission received for that link in a recent time period. A link may represent a unicast link, or a broadcast/groupcast L2 ID. A WTRU may change to a different DRX configuration upon reception of data with a specific QoS, or QoS information which indicates or requires the use of a different DRX configuration. Examples of such information may be:

- L1 or L2 priority information.
- QoS flow ID, PQI, QoS profile, or any indicator referring to such in a protocol layer (e.g. Packet Data Convergence Protocol (PDCP) or Service Data Adaptation Protocol (SDAP)).
  - a. For example, upon reception of data, possibly associated with a link, for which the received PQI is of higher level than the current maximum PQI, a WTRU may change its DRX configuration.
- MCR (minimum communication range).
- Other information or identifiers which implicitly indicate the QoS or worst-case QoS at the transmitter.
- Other information which may impact the ability to meet the QoS, such as:
  - a. Measurements of sidelink (e.g. CBR, CR, CSI, RSRP, etc) sent by the peer WTRU and/or measured by the RX WTRU.

For example, a WTRU may determine/change its DRX configuration upon reception of a PQI with a different QoS class, for which a different DRX configuration should be used. The WTRU may maintain such DRX configuration until possible reception of data with a different PQI/PQI class which results in change in the activity behavior based on determination mechanisms described herein (e.g. combination of QoS/DRX configurations).

(3). WTRU Determines/Changes the DRX Configuration Based on a New SLRB Configured/Created at the RX WTRU In one solution, which can be used in conjunction with the previous example, an RX WTRU may determine/change its DRX configuration upon creation of a SLRB for reception, based on the QoS information and/or SLRB configuration associated with that SLRB. For example, a WTRU may determine its DRX configuration from its SLRB configuration. For example, a WTRU may be configured with one or more DRX configurations to be used for a given established SLRB, possibly associated with only a subset of casts types and/or one or more L2 IDs. Similar to discussions herein on selection of DRX configuration and/or active time based on combination of QoS and/or DRX configurations, a WTRU may determine its DRX configurations and/or active time based on a combination of the DRX configurations associated with its established SLRBs for reception. Upon reception of a data packet, possibly associated with a L2 ID, an RX WTRU may change the DRX configuration if it creates a new SLRB configuration which is not compatible with or requires the WTRU to change to a different DRX configuration. For example, a WTRU may be configured with a default DRX configuration when it does not have any SLRBs configured. Upon creation of a SLRB for reception, the WTRU may change to activity behavior associated with the DRX configuration configured for that SLRB and/or QoS profile associated with that SLRB configuration.

The TX WTRU may have a similar behavior to be able to reach the RX WTRU. Specifically, upon creation of a SLRB for transmission, the TX WTRU may perform transmission such that it is limited to the active time defined by the DRX configuration of the SLRB created (or the QoS profile associated with the created SLRB). Furthermore, the TX WTRU may assume the use of the new DRX configuration after the first transmission associated with the SLRB, or some time/number of transmissions after the first transmission for that SLRB.

(4). WTRU May be Configured with a Default DRX Configuration Before the QoS is Known In one solution, a WTRU may use a default DRX configuration when it does not know the QoS associated with the service. Specifically, a WTRU may determine its DRX configuration from QoS information received from a peer WTRU Furthermore, a WTRU may use a default DRX configuration prior to any reception of QoS information from the peer WTRU. Such default DRX configuration may be (pre) configured at the WTRU. Additionally, the WTRU may have multiple such default DRX configurations, and may select the appropriate one based on the interested L2 ID (using similar mechanisms defined herein for associated DRX configuration with L2 ID).

(5). WTRU Sets the Value of DRX Timer(s) Based on the Priority (Ies) of Recently Received Data In another example, the WTRU may be configured with different rules for treatment of a timer associated with activity behavior based on reception of data with different L1 priority. Specifically, the WTRU may set the timer value based on the L1 priority of the SCI received while in the active time. For example, the WTRU may reset the inactivity timer upon reception of the SCI, and such inactivity timer value may be set dynamically based on the L1 priority of the SCI which reset it.

Reception Activity Behavior can Depend on Combination of L2 ID and QoS

In one example, the WTRU may be configured with an activity behavior and/or DRX configuration based on a combination of L2 ID and QoS. Specifically, a WTRU may use a combination of the L2 ID and the QoS to determine the activity behavior and/or DRX configurations.

In one example embodiment, the WTRU may be configured with a DRX configuration to be used for each pair of L2 ID and QoS parameter (e.g. PQI or group of PQI, or any other parameter defined herein). For example, the WTRU may be configured with a DRX configuration for L2 ID=x, and PQI=y. The WTRU may determine the QoS associated for a transmission from a L2 ID based on mechanisms herein. For example, the WTRU may obtain QoS information from a transmission associated with a L2 ID, to determine the possible PQI values (or QoS levels) which are allowable for that L2 ID. Alternatively, a WTRU may be configured with a DRX configuration per pair of L2 ID and SLRB configuration. The WTRU may determine the DRX configuration upon establishment of the SLRB for a specific L2 ID based on this configuration.

In another example embodiment, the WTRU may be configured with multiple DRX configurations for each L2 ID. The WTRU may select one of the multiple DRX configurations based on the QoS information received from that L2 ID. For example, for PQI values above a certain threshold, the WTRU may select a first DRX configuration, and for PQI values below a threshold, the WTRU may select a second DRX configuration.

In another example embodiment, the WTRU may be configured with a set of L2 IDs which can share a DRX configuration associated with QoS. Specifically, a WTRU may derive a DRX configuration based on QoS and apply the DRX configuration for a set of L2 IDs which are configured as interested L2 IDs. For another set of L2 IDs which may also be interested L2 IDs for that WTRU, the WTRU may apply a modified DRX configuration (e.g. changing one or more parameters of the activity behavior or DRX configuration associated with that of the first set of L2 IDs).

In another example embodiment, the WTRU may derive the full DRX configuration from a combination of parameters (DRX cycle, on duration, etc) where some parameters are configured per QoS while other parameters are configured per L2 ID. For example, the WTRU may derive the DRX configuration for a pair of QoS and L2 ID by combining the parameters configured for the L2 ID with the parameters configured for the QoS level, and deriving the DRX configuration/activity behavior.

Reception Activity of a WTRU Determined Based on Configuration Provided by Another WTRU In one embodiment, a WTRU may determine its reception activity based on a configuration provided by another WTRU. For example, a WTRU may provide a DRX configuration to its peer WTRU during unicast link establishment via PC5-RRC signaling. Such reception activity may be specific to the unicast link associated with the PC5-RRC signaling used to initiate/configure the unicast link.

Reception Activity of a WTRU Determined Based a Static Configuration Associated with Sidelink In one embodiment, a WTRU may be statically configured (e.g. via SIB, dedicated RRC signaling from the NW or other WTRU, or pre-configuration) with a reception activity. For example, a WTRU may be configured with a number of possible activity behavior/DRX configurations, each associated to an aspect of sidelink and may select from one such configuration to be applied to determine its monitoring behavior of PSCCH. Such activity may be further tied to a specific aspect of sidelink communication. Specifically, a WTRU may be (pre) configured with an activity behavior/DRX configuration associated with any of:

Sidelink service.
One or more reception resource pool(s) and/or any parameter associated with such resource pool.
  a. E.g. whether PUCCH is configured for the resource pool.
  b. E.g. whether pre-emption is allowed/not allowed on the resource pool.
One or more transmission resource pool(s) and/or any parameter associated with such resource pool.
  a. E.g. whether PUCCH is configured for the resource pool.
  b. E.g. whether pre-emption is allowed/not allowed on the resource pool.
One or more L2 source and/or destination IDs.
One or more SLRB or SLRB configuration.
QoS (received or configured).
Cast type.
Transmission mode (mode 1 or mode 2).
Sidelink process, or properties of such process (e.g. expected periodicity, whether such process/transmission has HARQ enabled/disabled, periodic or async, the maximum number of retransmissions, whether the process is associated with configured grant, etc.).
The type of SCI to monitor.
A sync source (e.g. in physical shared broadcast channel (PSBCH) or SL master information block (MIB)) and/or a configuration explicitly/implicitly indicated in the transmission of a sync signal.

(A) WTRU May Select from One or a Combination of the Multiple Configured Activity Behaviors A WTRU may further be configured with certain rules to select the appropriate activity behavior/DRX configuration when multiple activity behaviors/DRX configurations are applicable due to the WTRU having multiple of the above factors enabled. For example, the WTRU may be configured to receive data associated with multiple L2 destination IDs and each L2 destination ID may be configured with its own activity behavior/DRX configuration. A WTRU may select the activity behavior/DRX configuration to apply in the presence of multiple configurations based on any or a combination of:

A parameter that is part of the configuration itself.
  a. For example, a WTRU may select the configuration which minimizes or maximizes a specific parameter associated with the DRX configuration.
    (i) For example, a WTRU may select the applicable activity behavior/DRX configuration having the smallest value of the DRX cycle, the largest value of the on-duration, the largest value of the inactivity timer, etc.
      (1). For example, the WTRU may select based on a first rule (e.g. smallest DRX configuration) and may select based on a second rule if two configurations have the same value associated with the first rule.
    (ii) For example, a WTRU may select the applicable activity behavior/DRX configuration which corresponds to the most dense RX resource pool.

The configuration associated with the most and/or most recent receptions for that aspects, possibly within a time period.
  a. For example, a WTRU may select the configuration associated with the aspect for which it has received the most scheduling SCIs over a recent period of time or time window.
A priority associated with one of the above factors, which can be preconfigured, or may be changed dynamically (e.g. based on signaling by the NW, PC5-RRC or SCI).
  a. For example, a WTRU may receive a priority associated to each individual aspect (e.g. L2 ID) and may select the DRX configuration associated with the aspect (e.g. L2 ID) having the highest priority.
  b. For example, a WTRU may receive (e.g. in SCI) an indication to change/update the priority associated with the aspect tied to that SCI (e.g. L2 ID) and may change its selection criteria upon reception of such indication.
The configuration(s) which have been activated by the WTRU based on factors described herein.

A WTRU may be configured to select one activity behavior/DRX configuration from only a subset of the configured activity behaviors/DRX configuration only. Such determination (i.e. which subset of the configured activity behaviors can be used in selection of an activity behavior) may be made based on whether the activity behaviors/DRX configurations are considered compatible or not. A WTRU may determine compatibility of two or more DRX configurations based on:
  The pattern of resources for which the WTRU is expected to actively monitor PSSCH for scheduling allows selection of one of the configurations, where such pattern may be determined based on parameters of the DRX configurations themselves.
    a. For example, the DRX configurations have at least one common or overlapping on-duration which occurs periodically.
    b. For example, the DRX cycle of the DRX configurations are multiples of each other.
  Configuration itself.
    a. For example, a DRX configuration may be associated to a configuration group, or may be configured to allow selection of a DRX configuration from a subset of related configurations.

When a WTRU cannot select a single DRX configuration from two or more applicable configured DRX configurations, a WTRU may apply them independently, as described further herein.

A WTRU configured with multiple specific aspects of sidelink communication may further define its activity behavior based on the combination of each configured activity behaviors.

In one example, a WTRU may have a DRX configuration configured for each L2 destination ID for broadcast communication. The WTRU may perform DRX on sidelink based on L2 destination IDs configured by upper layers for which the WTRU is interested in receiving. In the case the WTRU is configured with multiple L2 destination IDs, the WTRU may be active at any of the active times defined by any of the individual DRX configurations associated with each of the interested L2 IDs.

A TX WTRU may send data in a slot within an active time (e.g., active slot) for the RX WTRU, wherein the active slot may be determined based on a destination ID (e.g., L1 or L2).

a. A set of destination IDs and its associated DRX configuration may be (pre)-configured.
  b. Sensing for resource selection may be performed in active time, On-duration, or active slots. A slot which is not within active time (e.g., non-active slot) may be precluded for sensing or not required to be included for sensing.
  c. A resource reserved for a future transmission may be valid only within the active time. For example, a WTRU may assume that the reserved resource may be not used for sidelink transmission outside active time.
  d. Active time may be determined based on On-duration only without inactivity timer.

In one example, a WTRU may determine any aspects of its active/inactive state configuration based on the reception of a sync source. Specifically, the WTRU may be configured to monitor for sync source transmissions from peer WTRUs. Once the WTRU has selected a sync source, the WTRU may determine its activity state configuration based on reception of the sync source transmission. Specifically, the WTRU's activity state configuration (e.g. the timing of one or more wakeup slots, the pattern of its wakeup, etc.) may be determined based on a combination of the following:
  The timing of the reception of PSBCH of that sync source.
    a. For example, the activity state of the WTRU may be defined relative to the timing of the WTRUs sync source transmissions. Specifically, the WTRU may define its on-period or activity period to occur at a slot that is relative to the reception slot of the sync source.
  Information provided in the PSBCH transmission by the sync source.
    a. For example, the WTRU may receive a period for activity, on-duration, timer related to DRX behavior, or any other such parameter described herein within the sync source transmission.
  Combination of the above.
    a. For example, the WTRU may obtain a slot number or slot offset relative to the timing of the PSBCH in which the WTRU should wakeup.

(B). WTRU Receives an Activity State Configuration Identity Associated with a (Pre) Configured or Predefined Activity Behavior A WTRU may determine its activity behavior based on reception of an activity state configuration identity which identifies an activity behavior which could be (pre) configured (e.g. in RRC signaling or SIB) or predefined (e.g. in a specified table). For example, a first WTRU may transmit a determined activity state configuration identity (e.g. in PSBCH) and a second WTRU may determine its activity behavior (e.g. the value of a timer) that corresponds to the received identity in the (pre) configured or predefined table.

(C). WTRU Performs Request of Activity Configuration from the Network

A WTRU may perform a request for activity configuration, possibly associated with one of the aspects of sidelink communication (e.g. L2 source/destination ID), from the network. Such request may be in the form of an RRC message (e.g. Sidelink WTRUInformation) over Uu reference link. For example, the WTRU may provide the L2 ID associated with the requested activity configuration from the network in an RRC message over a Uu reference link. A WTRU may further trigger request for activity configuration based on certain triggers/conditions below (or other triggers discussed herein), or combination thereof:

The WTRU establishes a unicast link with a peer WTRU.
The WTRU receives indication from upper layers of the establishment of a sidelink unicast, or sidelink group (e.g. the WTRU receives group information and/or group size and/or group member ID).
The WTRU does not have activity configuration for the associated aspect of sidelink communication (e.g. L2 source/destination ID), possibly associated with a configuration of a specific gNB/cell, specific group of gNB/cells.
The WTRU has not received sidelink data associated with a specific aspect of sidelink communication (e.g. L2 source/destination ID), for a (pre) configured period of time, and decides to indicate the desire to move to DRX or change activity state/behavior.
The WTRU enters a specific location which triggers such request (e.g. a preconfigured zone).
The WTRU battery power reaches a specific threshold.
The measured CBR meets some (pre) configured condition.
The WTRU has changed its activity state or activity state configuration.
A WTRU may include any of the following information in the request for activity configuration:
  a. Activity behavior/configuration obtained from a peer WTRU.
  b. The current activity behavior/configuration at the WTRU, possibly in the form an identifier.
  c. The priority, QoS, or similar attribute identifying the activity behavior at the WTRU, or associated with the last change in activity state/behavior at the WTRU.
  d. A number of received data transmissions over a period of time, possibly associated with the activity behavior configuration, and possibly per transmission type (as defined herein).

Reception Activity at the WTRU Based on Scheduling of Data by Another WTRU (Power savings behavior at a WTRU can be dictated by the transmission [pattern] of sidelink data by peer WTRU(s))

Reception Activity of a WTRU Determined Based on Information in the SCI

In one solution, the WTRU may determine or change its activity behavior based on whether information is present in the SCI or not, or based on the value of such information in the SCI. The presence or absence of, and/or the value of such field/parameter can consist of any or a combination of the following:
  A resource reservation period.
  A QoS parameter (e.g. L1 priority, range).
  Location information (e.g. zone ID).
  An index of a resource pool (e.g. identifying a TX resource pool).
  A flag, bit, or value, reserved for the use of power savings (e.g. enabling/disabling power savings, indicating an amount of time to remain awake, indicating a pattern of awake period, indicating an activity behavior configuration identity).
  A cast type.
  A demodulation reference signal (DMRS) pattern.
  A modulation and coding scheme (MCS).
  A specific pattern or set of time/frequency resource assignment.
  A HARQ process ID.
  SCI format (e.g. format of second stage SCI).
  Beta offset indicator.
  Number of DMRS ports.
  NDI (New Data Indicator).
  CSI request.
  Destination/source ID.
  Redundancy version.

A WTRU may be configured to perform a first action or have a first activity behavior when the SCI contains one or more of the above fields, and/or when one or more of the above fields has some value, and may perform a second action or have a second activity behavior when the SCI does not contain a field and/or when one or more of the above fields has a second value. Such first action, or second action, may relate to aspect of activity behavior define herein, for example:
  Whether to start, stop, or reset a timer related to defining the active time at a WTRU.
  Whether to change from one RX resource pool to another RX resource pool.
  The value of a timer related to activity behavior to use.
  Etc.

(A). Power-Savings Flag/Value May Change the Activity Behavior Associated with an Aspect of SCI A WTRU may further change the activity behavior/DRX configuration associated with one aspect of an SCI (as described herein) upon reception of information (another parameter), possibly in the same SCI or in a MAC CE/RRC contained in the data scheduled by such SCI. For example, a WTRU may receive a power savings flag or value which changes the activity behavior associated with another aspect in the same SCI, if the WTRU is supporting multiple independent activity behaviors and/or selection of a single activity behavior from a set of configured activity behaviors.

For example, a WTRU may receive a flag indicating to enable/disable the activity behavior/DRX configuration associated with any of:
  The L2 source and/or destination ID in the SCI.
  The HARQ process ID of the HARQ process indicated in the SCI.
  The cast type indicated in the SCI.
  Scheduling process associated with a periodic transmission.

A WTRU, upon enabling an activity behavior, may perform DRX based on the associated DRX configuration. A WTRU, upon disabling an activity behavior, may be required to always monitor PSCCH for scheduling, possibly for that associated aspect (e.g. L2 ID, HARQ process, etc.).

For example, a WTRU may receive a new configuration (in the form of a configuration ID, or a new parameter for an associated activity behavior/DRX configuration) in the SCI, and may change the activity behavior associated with any of the SCI aspects in the example above.

(B). A TX WTRU May Set the Power-Savings Flag/Value Based on Events Associated with the Data Transmission A TX WTRU may set the power savings flag, or any aspect associated with activity behavior in the SCI (as described herein) based on events associated with data transmission. For example, any of the events associated with activity behavior determination based on TX WTRU (described elsewhere herein) can further be used to modify or change a transmission in the SCI controlling the peer WTRU's activity behavior.

Reception Activity of a WTRU Determined Based on Forward Reservation Signal

In one embodiment, the WTRU may determine its activity behavior based on reception of a resource reservation signal (e.g. in SCI), possibly associated with a transmission intended for it.

In one example, a WTRU may receive a first SCI which reserves a resource for data to be received by the WTRU at some time in the future, indicated by the first SCI. Such reception can be for the same TB (e.g. in the case of blind retransmissions) or may be for a new TB (e.g. in the case of forward booking of future transmissions). The WTRU may perform DRX (i.e. not have active decoding on sidelink) a certain number of slots following reception of the first SCI and until (or a certain number of slots prior to) reception of the next SCI (which occurs at the reserved time). In the case the WTRU receives multiple periodic transmissions, the WTRU may perform DRX on all slots not corresponding to a planned or reserved transmission by each of the periodic transmissions received by the WTRU. In another related example, the DRX may be performed starting a number of configurable slots after the first SCI, and/or may end starting a number of configurable slots before the second SCI, where such number of slots may further depend on QoS or CBR, or other factors discussed herein.

(A). WTRU Monitors Sidelink at Predefined Times/Frequency for Changes in Reservation Period A (RX) WTRU which determines its activity behavior based on reception of a forward reservation signal may be configured or determine a set of monitoring times in which it monitors/checks for changes in the reservation period. For example, the WTRU may monitor PSCCH at predefined times relative to the reservation times in order to receive possible changes for the reservation period (e.g. due to reselection decisions made by the TX WTRU). For example, the WTRU may monitor PSCCH for a number of slots prior to and/or after the reservation time to determine a possible change in the reservation time. For example, the WTRU may monitor PSCCH for a number of slots between two reservation times to determine a possible change in the reservation time. If a WTRU detects a reselection associated with a peer WTRU's reservation, the WTRU may change its activity behavior to perform monitoring associated with the new periodic transmission and stop monitoring the old periodic transmission.

A (TX) WTRU which performs resource reselection may limit resources used for transmission to a subset of time/frequency locations (pre) configured for reservation time changes. Specifically, the WTRU which performs resource reselection may select, from the resources available for transmission based on sensing, only those resources in the (pre) configured subset of resources associated with indication of a reselection decision. A WTRU may further indicate (e.g. in SCI), when reselection is performed, which periodic sidelink process has been reselected.

A (TX or RX) WTRU may autonomously determine the allowed resources (e.g. times) in which resource reselection may be performed. The WTRU may base such determination on rules such that both TX WTRU and RX WTRU can select the same resources for transmission after reselection (at the TX WTRU) and monitoring (at the RX WTRU). The amount/set of resources to be monitored for possible reselection may depend on:

The period of the sidelink transmission.
The QoS associated with the periodic sidelink transmission.
The CBR measured on sidelink.
A slot or frame number (or offset) associated with the periodic transmission.
A (sidelink or uplink) configuration parameter.

For example, the WTRU may select a set of N equally spaced time and/or frequency resources between periodic transmissions of a periodic sidelink process in which the WTRU performs monitoring of PSCCH in the case of reselection decision (and consequently, the TX WTRU can use such resources for reselection of a periodic sidelink process). The value of N may be determined based on a (pre) configured formula which depends on the QoS and periodicity of the sidelink process.

For example, in the case of unicast transmissions, the peer WTRUs may exchange such configuration of time/frequency resources in PC5-RRC signaling during unicast link establishment.

(B). WTRU's Ability to Perform DRX Between Planned Receptions/Transmissions May Depend on:

A WTRU may be allowed to perform DRX on a given slot based on its current transmission and/or reception state and/or measurements on the sidelink channel. For example, a WTRU may perform DRX between the reception of periodic transmissions announced by a peer WTRU in SCI. For example, a WTRU performing DRX between periodic receptions (as discussed herein), may further determine its ability to perform DRX on a given slot based on other factors. A WTRU may perform DRX depending on a number of factors, such as any of the following:

CBR of the resource pool:
  a. Specifically, if the CBR of the resource pool is high, the WTRU may not perform DRX between periodic receptions. For example, the WTRU may be configured with a threshold CBR, below which, the WTRU may perform DRX between periodic receptions.

Based on information in the SCI or associated data.
  a. For example, the SCI may indicate whether the WTRU can perform DRX between the periodic receptions or should stay active. Such indication may be explicit (for example, a one-bit indicator). Alternatively, such indication may be implicit based on the value of some other field or data within the SCI or associated data, such as:
    (i) The L1 priority is above or below a threshold.
    (ii) The SCI indicates a retransmission and the time until the retransmission is below a threshold number of slots.
  a. For example, the indication in the SCI may apply to the period of time between the reception of the SCI and the next periodic reservation, or to a number of periods (possibly larger than one, possibly indicated in the SCI itself), or for an indefinite number of periods (e.g. until reception of additional information in a future SCI).
  b. For example, the SCI may contain such indication only when DRX between periodic transmissions is allowed/not allowed. Upon absence of such indication, an RX WTRU may assume it can perform DRX until the next indication, or may assume it cannot perform DRX until the next indication.

Based on a configuration from upper layers or from the peer WTRU.
  a. For example, the WTRU may be (pre) configured to perform DRX between periodic receptions.
  b. For example, the WTRU may receive such configuration from the peer WTRU during unicast link establishment.
  c. For example, the WTRU may have a capability related to whether it is allowed to perform DRX between periodic receptions.

Based on the configured services and or interested L2 IDs:
  a. For example, the WTRU may be configured with a set of interested L2 IDs, and associated DRX behavior for each L2 ID (whether to be perform DRX between reception), and the WTRU may adhere to one behavior if at least one interested L2 ID is configured with such behavior and the corresponding L1 ID is received in SCI.

Based on whether the WTRU has pending transmissions:
  a. For example, the WTRU may perform DRX between receptions if it has no pending transmissions to perform (of data or feedback). For example, the WTRU may perform DRX if the number of transmissions to perform and/or buffer status at the WTRU is below some threshold. For example, the WTRU may perform DRX between receptions depending on whether it has any and/or the timing of any feedback to the transmitting WTRU, such as HARQ feedback, channel quality indicator (CQI) feedback, etc. For example, the WTRU may perform DRX if it is not required to send HARQ feedback between the receptions, or if the HARQ feedback timing is small (e.g. below a threshold), possibly relative to the time between the receptions. For example, the WTRU may not perform DRX if it receives a CSI request, and the CSI transmission window expires between the two expected receptions.

Based on the time between any planned transmissions/receptions:
  a. For example, the WTRU may be configured with a threshold time between periodic transmissions and may perform DRX between the periodic transmissions only when the transmission period is above this threshold (i.e. for small periodicity, there may be no benefit in performing DRX between periodic transmissions).
  b. For example, the WTRU may perform DRX between an SCI reception and a planned HARQ feedback transmission (not necessarily related to the SCI reception) if the time between the SCI reception and HARQ feedback transmission exceeds a number of slots.

Based on the latency requirements of data in the WTRU buffers:
  a. For example, the WTRU may be allowed to perform DRX if there is no data (or a limited amount of data) in its buffers for which the latency requirements expire within the planned period of DRX. For example, a WTRU may be allowed to perform DRX over a set of slots if all data in its buffers can be transmitted within its latency requirements after performing DRX in the set of slots.

The presence/timing of retransmissions associated with an initial transmission.
  a. For example, a WTRU may perform DRX between an initial transmission and a retransmission, or between multiple retransmissions, possibly depending on the amount of time between such transmission/retransmission.
  b. For example, a WTRU performing DRX between periodic transmissions may monitor PSCCH for scheduling on the slots associated with the initial transmissions and retransmissions associated with the periodic transmissions.

Based on whether a WTRU is configured with a set of resources (e.g. defined set of resources, or another activity behavior configuration whose active resource can be used) that can be used for reselection.

Based on whether the WTRU is expecting feedback (e.g. HARQ feedback, CQI feedback, RSRP, etc.) at one or more slots between the planned receptions, and the timing of such feedback.
  a. For example, the WTRU may perform DRX if it is not expecting HARQ feedback, CQI feedback, or RSRP.
  b. For example, the WTRU may perform DRX if the time between any of the planned transmissions and expected feedback and/or the time between feedback is larger than a threshold.
  c. A WTRU may not perform DRX (i.e. may be required to monitor PSCCH associated with scheduling) on slots in which:
    (i) The WTRU expects HARQ feedback from its own transmissions (i.e. slots corresponding to expected PSFCH timing associated with any of its HARQ-based transmissions).
    (ii) The WTRU expects periodic RSRP measurements.

WTRU has Different Activity Behavior for SCI with or without Forward Reservation and/or Reservation Period In another related example, (which can be used in conjunction with other examples herein), a WTRU may determine its activity behavior based on whether the SCI reserves (or not) a future resource. Specifically, a WTRU may have a first activity behavior when the SCI indicates a forward reservation and it may have a second activity behavior when the SCI does not indicate a forward reservation. Such may allow the WTRU to remain in active state when periodic transmissions are expected, while allow DRX when no periodic transmissions are expected. For example, the WTRU may start an inactivity timer upon any of the following events (or combination of events) related to reception (or as described elsewhere herein):

Reception of an SCI. The WTRU may further start an inactivity timer only upon reception of an SCI which does not reserve a future resource. Reception of SCI with future reservation may reset such timer and/or may not start the timer.

A WTRU may further start such inactivity timer only upon reception of the SCI without reservation if it does not have any other pending periodic sidelink processes.

A WTRU may further start such inactivity timer only upon transmission of HARQ feedback (e.g. ACK, NACK) associated with a SCI/data transmission for which HARQ feedback is enabled.

Reception of a CSI feedback request. Specifically, a WTRU may change from a first activity state to a second activity state (e.g. monitoring a pool associated with an inactive state to monitoring a pool associated with an active state) upon reception of a CSI feedback request. A WTRU may further reset an inactivity timer upon such reception.

A WTRU may further start such inactivity timer only upon transmission of a CSI feedback following a reception of a CSI request.

The WTRU may enter DRX following expiry of such inactivity timer if it does not receive any additional transmissions (SCI) intended for it before expiry of the timer. For example, the WTRU may start such timer if it has received an SCI which does not reserve a future resource (for retransmission or for new transmission), and the WTRU has no pending future transmissions, and the WTRU has no pending HARQ feedback transmissions to make. On the other hand, the WTRU may start such timer following transmission of an ACK to a HARQ feedback enabled reception of SCI, if the WTRU has no pending/expected future reserved resources associated reception from any sidelink processes. On the other hand, the WTRU may start such timer following transmission of a CSI feedback if the WTRU has no pending/expected future reserved resource associated with reception from any sidelink processes, and has no HARQ feedback to send, and no expected retransmissions from any sidelink reception processes (i.e. sidelink reception processes have been ACK'd or have reached the maximum number of retransmissions, and/or the WTRU has flushed its RX HARQ buffers associated with each sidelink process).

Reception Activity of a WTRU Determined Based on Amount of Received Transmissions.

In one solution, a WTRU may determine its activity behavior based on the amount of received transmissions at the WTRU, possibly over a preconfigured or predetermined period of time. Specifically, a WTRU may perform any action described herein related to activity behavior (e.g. reset an inactivity timer, move to/from DRX-based monitoring to active monitoring, change from monitoring of a first pool to a second pool, etc.) if the number of received sidelink transmissions at a WTRU within a time period is larger than a threshold. The number of transmissions measured may further be limited to those associated with a specific type (e.g. asynchronous, periodic), a specific cast (unicast, groupcast, or broadcast), or having a specific property related to HARQ (e.g. HARQ enabled/disabled).

In one example solution, a WTRU may be configured to monitor on a first pool as long as the number of transmissions received on the first pool over a configured time period is below a threshold. When the number of transmissions over the last configured time period exceeds the threshold, the WTRU may start monitoring the second pool. The WTRU may continue to monitor the second pool as long as a second condition is satisfied. When the second condition is no longer satisfied, the WTRU may move back from monitoring the second pool to monitoring the first pool. Such second condition may be any or a combination of the following:

Expiry of a timer.
  a. The WTRU may monitor the second pool for a period of time following change to the second pool.
Condition related to activity on the first and/or second pool.
  a. The WTRU may monitor the second pool as long as the number of transmissions received on the first and/or second pool within a configured timer period stays above a threshold.

Activity Behavior at WTRU Determined Based on an Activity Inactivity Command Received from Another WTRU.

In one scenario, an RX WTRU may change from one activity behavior to another activity behavior based on the reception of an inactivity command from another WTRU. Such command may be in the form of a SL MAC CE, or an SCI including such command, for example. Specifically, the RX WTRU may be configured with a first resource pool and a second set of resource pool(s). Both the first and second resource pools may be used for the reception of PSCCH and Physical Sidelink Shared Channel (PSSCH) associated with the same L2 ID. The WTRU may activate the monitoring of the second resource pool(s) only upon the reception of SCI (i.e. in PSCCH) on the first resource pool to minimize energy consumption at the WTRU. In another example, to further minimize energy consumption, the first resource pool may only be configured for a narrowband reception of the SCI while the second resource pool may be used for a wider band reception of both the PSCCH and PSSCH. After the activation of the second resource pool(s), the activity timers (i.e. on-duration timer and inactivity timer) may be started and maintained. Prior to the expiry of the activity timers, if the WTRU receives an inactivity command (e.g. SL MAC CE) indicating the termination of activity (e.g. due to transmission of last data), the RX WTRU may stop the corresponding activity timers and deactivate the monitoring of the indicated resource pool(s). The inactivity command may indicate the following:

The resource pool(s) to stop monitoring: the inactivity command may indicate the termination of the activity on at least one resource pool.
The resource pool(s) to switch monitoring to: The inactivity command may indicate a change from one second (active) resource pool to another second (active) resource pool.
The timing associated with when the change of the monitoring behavior:
  a. For example, the inactivity command may also indicate a DRX duration for which the RX WTRU may apply to deactivate the monitoring of the resource pools so long as the DRX duration is running. The RX WTRU may re-activate the resource pools and the associated activity timers after the expiry of the indicated DRX duration.
  b. For example, the inactivity command may indicate a delay (time) until the WTRU should change its activity behavior (e.g. switch to the inactive time of the DRX configuration, or to monitoring the inactive pool)
The specific decoding parameters associated with the change of activity behavior, where such decoding parameters may be the L1/L2 IDs, the L1/L2 priorities, or any other aspect specific to decoding of PSCCH.
  a. For example, the inactivity command may stop active monitoring (e.g. on the active pool) associated only with the L2 IDs provided in the inactivity command.

If the RX WTRU is configured to receive from multiple TX WTRUs and receives multiple inactivity commands indicating the termination of at least one active resource pool common to multiple TX WTRUs, the RX WTRU may use other criteria (e.g. priority) to determine on whether to deactivate the indicated resource pool(s) and transition to DRX. Alternatively, the RX WTRU may transition to DRX as long as all TX WTRUs have indicated termination of activity on the common resource pool.

Activity Behavior at WTRU Determined Based on an Inactivity Command Received Implicitly from Another WTRU.

In one scenario, an RX WTRU may change from one activity behavior to another activity behavior based on the inactivity command that is implicitly received from another WTRU. Such command may be in the form of the presence of padding bits in the MAC PDU, for example. Specifically, when detecting the presence of one or multiple padding bits after the data bits in the received MAC PDU, the RX WTRU may perform the following:

Stop the activity timers (e.g. on-duration timer, inactivity timer) in at least one of the configured resource pool(s) and transition to DRX.
If (pre) configured with a DRX timer, the detection of the inactivity command may be used by the RX WTRU to start the DRX timer and remain in DRX so long as the DRX timer is running. After the expiry of the DRX timer, the RX WTRU may activate and start monitoring in the configured resource pool(s).

If (pre) configured with the resource pool(s) to deactivate, the detection of the inactivity command may be used by the RX WTRU to deactivate the monitoring in the pre-configured resource pool(s).

WTRU Reception of Physical Sidelink Feedback Channel (PSFCH) is Treated Independently of RX Activity Behavior In one embodiment, a WTRU may perform reception of PSFCH based on its scheduled timing, without impacting the activity behavior of reception. Specifically, the WTRU which is already in DRX may wakeup to perform only PSFCH reception at scheduled times (as dictated by the timing of its own transmission) and may continue DRX following such reception. In addition, reception of PSFCH may not increase and/or reset any timers associated with reception-based activity time. The WTRU may simply perform reception of PSFCH in such symbols. In an example application of the above, a WTRU in SL-DRX performs PSFCH reception only on SL associated with slots where HARQ-feedback reception is expected (with respect to transmission).

Alternatively, the WTRU may also perform PSCCH and/or Physical Sidelink Shared Channel (PSSCH) reception/decoding on slots where the WTRU is expected to receive PSFCH (or a certain number of slots before/after a WTRU is expected to receive PSFCH), even if the WTRU is currently in DRX for that specific slot. A WTRU, upon reception of an SCI scheduling it during such a slot, may perform similar behavior to reception of an SCI during a normal on-duration. A WTRU may move to active state upon reception of an SCI during such a slot. Specifically, the WTRU may start an inactivity timer and/or start active monitoring of PSCCH, and/or start active monitoring of an active resource pool, upon reception of an SCI during such a slot.

Activity Behavior at WTRU after Transmission of PSFCH.

In one solution, an RX WTRU may further increase power savings by transitioning into DRX after the transmission of PSFCH. Specifically, the RX WTRU may be configured with a first resource pool and a second set of resource pool(s). Both the first and second resource pools may be used for the reception of PSCCH and PSSCH associated with the same L2 ID. The second resource pool is activated only upon the reception of SCI in the first resource pool to improve power efficiency. For a given HARQ process, the WTRU may send the PSFCH to the TX WTRU and start the SL RTT HARQ timer. The WTRU may then transition to DRX by deactivating either both the first resource pool and second resource pool or only the second resource pool. A WTRU may further transition to DRX as long as the SL RTT HARQ timer for each HARQ process is running. Upon the expiry of the SL RTT HARQ timer, the WTRU may re-activate the corresponding resource pools and start an activity timer (i.e. on-duration timer, inactivity timer) for the subsequent reception of PSCCH and PSSCH. The duration of the SL RTT HARQ timer may be determined by a combination of factors that include QoS attributed to the HARQ process or L2 ID.

WTRU Ignores Certain Sidelink Transmissions when Determining/Updating its Activity Behavior.

In one solution, a WTRU may ignore specific sidelink transmissions when determining its activity behavior. Specifically, the WTRU may determine the rules for activity behavior based on the reception of sidelink transmissions using methods described herein. However, the WTRU may ignore certain "special" transmissions in such determinations. For example, specific "special" transmissions may cause a WTRU to not reset an activity timer. For example, specific "special" transmissions may not be used in the computation of density of transmissions used in determining the activity behavior. For example, specific "special" transmissions may not be used as part of the rule(s) for determining the change in the reception resource pools and/or resetting a timer (e.g. inactivity timer).

A WTRU may ignore any of the following when determining/updating its activity behavior:
  CSI feedback reception.
    a. Such may be conditioned on receiving only CSI feedback. For example, the WTRU may ignore a reception of CSI feedback from a peer WTRU if such is not multiplexed with other data transmission.
  PC5-radio resource control (RRC) message.
    a. Such may be conditioned on the contents/type of PC5-RRC message. For example, the WTRU may ignore any PC5-RRC message (possibly which is not also multiplexed with data) whereby such message is for a configuration change only (e.g. not for establishment of a unicast link).
  Transmissions where the WTRU is located outside of the minimum communication range (MCR) associated with the transmission.
    a. For example, a WTRU may ignore any groupcast transmissions received whereby the WTRU located outside of the minimum communication range (MCR) sent in the SCI for that transmission.
  Priority is below a threshold.
    a. For example, a WTRU may be configured with a priority threshold, and may ignore all transmissions whereby the received priority is below (lower priority) such threshold.
  Discovery messages, or similar messages intended for relay discovery/selection.
    a. For example, a WTRU may ignore reception containing (possibly only) a discovery message intended for relay discovery/selection.
  HARQ feedback.
    a. For example, a WTRU may ignore reception of any HARQ feedback (ACK/NACK) or a specific HARQ feedback (e.g. ACK only) when determining whether to reset an inactivity timer with respect to reception of a transmission from a peer WTRU.

WTRU Counts PSFCH Reception (Possibly Containing ACK or NACK Only) as an Activity Event.

In another embodiment, a WTRU may consider PSFCH reception as a reception event which determines its activity behavior (e.g. it may reset an inactivity timer). A WTRU may further associate a type of feedback received (e.g. ACK or NACK) as a reception event, while the other type of feedback may not be associated with an activity event. For example, a WTRU may reset an activity timer and/or stay in active channel monitoring upon reception of an SCI intended for it (e.g. with a specific L1/L2 ID of interest) or upon reception of a PSFCH containing NACK. Reception of a PSFCH containing ACK may not cause resetting of the inactivity timer. Upon expiry of such timer, the WTRU may perform DRX.

WTRU Performs Active Monitoring (Non-DRX) Following CSI Feedback Request.

In one embodiment, a WTRU may disable DRX (e.g. perform normal active monitoring of PSCCH, or change reception pool) following transmission of a CSI request to a peer WTRU. Specifically, a WTRU may have any of the following behavior following transmission of a CSI request to a peer WTRU:

The WTRU may disable or move out of DRX, if the WTRU was currently in DRX.

The WTRU may reset any timer (e.g. inactivity timer) associated with transition to DRX if the WTRU is currently in active monitoring state.

The WTRU may extend any timer (e.g. inactivity timer) associated with transition to DRX by an amount related to the CSI feedback window if the WTRU is currently in active monitoring state.

The WTRU may remain in active monitoring state until reception of CSI feedback.

The WTRU may remain in active monitoring state until expiry of the CSI feedback window associated with the CSI request. The WTRU may then move to DRX if it is allowed to do that, based on possible other rules described herein.

The WTRU, if in active monitoring state, may determine the time it can move to DRX based on the time in which the last of the following events occurs: 1) a running inactivity timer expires; 2) the WTRU receives CSI feedback prior to expiry of the CSI feedback window; 3) the CSI feedback window expires without reception of CSI feedback.

Example Embodiments

WTRU Determines/Changes HARQ RTT Timer Behavior Based on Sidelink Characteristics A WTRU may perform different handling of the HARQ RTT based on sidelink characteristics such as the following, or any other sidelink characteristic mentioned herein that may affect activity behavior:

Whether HARQ is enabled/disabled for the transmission.
Whether the grant is a configured grant.
Whether the transmission reserves a retransmission resource, and how many retransmission resources.
The time between the transmission and retransmission resource.
Whether PUCCH is configured or not for the resource pool.
Whether the process (on which HARQ RTT is being considered) is for unicast, groupcast, broadcast.
Whether mode 1 or mode 2 transmission is being used.
Priority/QoS of the transmission (possibly tied to the LCH ID, or priority of the LCH).
Measured CBR.
Whether pre-emption is configured/allowed or not.

Any of the following behavior can be changed depending on the above:
When the HARQ RTT timer is started.
The value of the HARQ RTT timer to use.
Whether HARQ RTT is used (i.e. whether the WTRU can sleep following transmission of NACK).

Starting Time:

For example, a WTRU may start the HARQ RTT timer at different time instances depending on whether HARQ is enabled/disabled in the transmission. If HARQ is enabled, the WTRU starts HARQ RTT upon transmission of PSFCH. If HARQ is disabled, the WTRU may start HARQ RTT:

Upon reception of the data for which the WTRU determined such data was not decoded properly.
Some (pre) configured time after reception of such data.
  a. which depends on the priority of the data in the transmission
  b. which may depend on the measured CBR.

Duration:

For example, a WTRU may determine the value of the HARQ RTT timer depending on the characteristics above. Specifically, the WTRU may be configured with different HARQ RTT timer values, depending on the characteristic. Specifically, the WTRU may extend/reduce the HARQ RTT value by an amount depending on the characteristic. Specifically, the WTRU may stop the HARQ RTT timer prematurely upon an event related to one of the above.

For example, if the WTRU receives a mode 1 transmission, it may use a first value of the HARQ RTT, and if it receives a mode 2 transmission it may use a second value of the HARQ RTT. For example, if the resource pool is configured with PUCCH, it may use a first value of the HARQ RTT. If the resource pool is configured without PUCCH it may use a second value of the HARQ RTT. For example, if the WTRU receives a retransmission resource, it may set the HARQ RTT to the time until the retransmission resource, otherwise, it may set the HARQ RTT to a (pre) configured value. For example, the WTRU may receive different HARQ RTT times to be used (possibly in the examples above) for different values of the transmission priority.

Whether to use HARQ RTT (i.e. whether sleep is allowed after a transmission that is received in error):

For example, a WTRU may be allowed to use HARQ RTT if pre-emption is not configured/allowed. For example, a WTRU may be allowed to use HARQ RTT if the priority of the transmission is above/below a threshold. For example, a WTRU may be allowed to use HARQ RTT if the CBR is below a threshold.

Determination of Reception Activity from a TX WTRUs Own Transmissions (Power savings behavior at a WTRU can be dictated by a WTRU's own transmissions)

SL Activity Behavior May be a Function of the WTRUs Own Data Transmissions.

In one embodiment, a WTRU may determine and/or change its activity behavior based on the timing and/or nature of its own transmissions, which may include the pattern or timing of any sidelink data arriving at the WTRU or scheduled by the WTRU for autonomous transmission. For example, the WTRU may determine the pattern of sidelink control channel monitoring, the value of a timer related to DRX, or extend/change some time DRX-related timer based on the timing and/or property related to its own transmission, such as any or a combination of:

resources selected for its own transmission.
the frequency of (or time between) its own transmissions.
whether the WTRU has transmissions to make or not, and any properties related to such transmissions such as:
  a. periodicity.
  b. QoS.
  c. Amount of data to be transmitted (size of transmissions).
  d. Number of (re) transmissions to be made.
the time in which its own transmission occurs, potentially relative to the monitoring time.
the frequency of or time associated with the WTRUs feedback transmissions (e.g. PSFCH transmissions).
any property associated with a feedback transmission (e.g. the CSI feedback window).

In another solution, a WTRU may determine and/or change its activity behavior based on the conditions dictating the use of multiple configured resource pools. Specifically, the WTRU may be configured with a first resource pool and a second resource pool, where the second resource pool is used to support its activity behavior (e.g. transmission, sensing) only when at least one of the conditions affecting the use of the first resource pool is satisfied. The conditions that trigger the usage of the second resource pool can be any or a combination of the following:

- Inadequacy of resources in first resource pool after performing logical channel prioritization (LCP) procedure to satisfy the QoS requirements of subsequent transmission.
- Expiry of an activity timer for usage of the first resource pool.
- Reception of a trigger in first resource pool (e.g. PFSCH, upper layer indication).

(A). SL Activity Behavior May be Determined by Pending Transmissions at the WTRU In one family of solutions, a WTRU may define its SL activity behavior based on the presence of pending data to be transmitted by the WTRU. Specifically, one or multiple factors affecting SL activity behavior may be determined by any or a combination of the following:

- Presence or absence of data in the WTRUs buffers.
- The act of transmission of data on sidelink, specifically for a mode 2 WTRU.
- The QoS and/or LCH associated with data in the WTRUs buffers or data recently transmitted by the WTRU.
- Transmission and/or reception of a SL radio link control (RLC) or Packet Data Convergence Protocol (PDCP) status report.
- Transmission and/or reception of SL HARQ feedback, and/or the type of HARQ feedback (ACK/NACK/DTX).
- Pending CSI feedback to be provided by the WTRU, and its properties (e.g. the CSI feedback window).
- Periodicity of the data to be transmitted or the SL TX HARQ processes created for each data process.
- Exchange of control signaling associated with connection control, L2 ID update, SL unicast reconfiguration, or SL unicast capability signaling.
- Number of configured blind or HARQ-based retransmissions.

In one example, the WTRU may consider itself active during periods of sidelink transmission and/or reception of feedback associated with such transmission (e.g. HARQ feedback). A WTRU may further remain active for some time (e.g. defined by a timer) following transmission/retransmission of some data and/or reception of the feedback. Such transmission/retransmission may further be restricted to the last transmission/retransmission of any data in the WTRU's SL TX buffers, possibly associated with a specific logical channel. Specifically, the WTRU may start a timer upon the transmission/retransmission of any data, or the last data in the WTRU's buffers and stay active (i.e. decoding SL Physical Sidelink Control Channel (PSCCH)) while the timer is running. If the WTRU does not receive any new data for transmission before expiry of the timer, the WTRU may enter DRX. Alternatively, the WTRU may restart such timer upon transmission of new data and/or reception of data from the peer WTRU. The WTRU may be configured with possibly different such timers for a transmission event and a reception event. In another example, the WTRU may start a timer upon reception of an ACK associated with transmission/retransmission of the last data in the WTRU's buffers and stay active while the timer is running. In such examples, the timer may be determined based on any or a combination of the following:

- Measured Channel Busy Ratio (CBR) of the transmission resource pool.
- QoS and/or logical channel (LCH) associated with the last data transmission or a number of recent data transmissions.
- May be configured per L2 ID.
- May be statically configured by upper layers.

In another example, the WTRU may start a timer upon removal of the last periodic SL process associated with transmission and move to DRX upon expiry of that timer. The timer may be based on aspects mentioned in the previous example. Additionally, the timer may be determined as a function of the periodicity of the last sidelink process removed or of multiple sidelink processes removed recently.

In another example, the WTRU may consider itself active during periods of sidelink transmission. Following a last transmission (no data in the buffers), the WTRU may initiate transmission of an RLC/PDCP request and may move to DRX (inactive) upon reception of such a status report.

In another example, the WTRU may initiate control signal exchange (e.g. PC5 RRC) with the peer WTRU as a result of a request from upper layers (e.g. L2 address change request from upper layers, reconfiguration request for unicast link configuration, etc.). The WTRU may be active following transmission of the initial PC5-RRC message (e.g. SL reconfiguration message), until reception of the response message (e.g. SL reconfiguration response message).

(B). SL Activity Behavior for Reception can be Changed by Presence of SL Transmissions (Objective: Due to half-duplex, a WTRU performing SL DRX based on SCI reception may miss certain transmissions from the peer WTRU, resulting in not being aware of the presence of activity).

In one embodiment, the SL activity behavior for reception may further depend on the occurrence of a transmissions by the WTRU, or by other WTRUs. Specifically, the WTRU may change or define any of the aspects related to SL activity behavior that is based on reception (e.g. DRX based on SCI reception) based on any or a combination of the following properties of its transmissions, or transmissions of other WTRUs:

- The occurrence of one or more transmissions at the WTRU, possibly at specific time(s) with respect to the reception-based activity time (e.g. during reception-based on-duration).
- The amount or frequency of such transmission(s).
- The time/frequency of such transmission(s).
- The congestion on the resource pool (e.g. CBR or similar).
- A property of the sensing results associated with the resource pool (e.g. number/percentage of available resource).
- The number of expected retransmissions from the peer WTRU.
- The expected QoS of transmissions from the peer WTRU and/or the SLRBs configured at the WTRU or at the peer WTRU.
  a. Such may be a function of the services active at the WTRU in question.
  b. Such may be determined by the SLRB configuration exchanged during unicast link establishment.

In one example, a WTRU performing SCI-based DRX and configured with a specific on-duration and/or inactivity timer (determined using any of the methods described herein) may increase its on-duration and/or inactivity timer by a (pre) configured amount for each data transmission during its reception-based active time. Alternatively, a WTRU may be configured with a set of on-duration and/or inactivity timers. The WTRU may select an appropriate on-duration and/or inactivity timer to be used for each of any of:

The number of transmissions it reserves during the active time.

The density of transmissions it makes during the active time (e.g. CR).

The number of sidelink processes it has active (with data to be transmitted) during the active time.

The buffer status during the active time.

Similar measures of sidelink transmission or sidelink resource usage.

In another example, a WTRU performing reception-based DRX or similar may be configured with an activity behavior (e.g. a timer related to SCI-based DRX) which is dependent on the congestion (e.g. CBR) of the resource pool. For example, a WTRU may be configured to use a first timer or set of timers (e.g. on-duration timer, inactivity timer, etc.) for a first CBR or range of CBR and may use a second timer or set of timers for a second CBR or range of CBRs. The WTRU may be (pre) configured with a mapping of CBR range to timers or activity behavior.

In another example, a WTRU performing reception-based DRX or similar may be configured with an activity behavior (e.g. an on-duration timer or an activity timer) which is dependent on the sensing results at the WTRU. Specifically, the WTRU may be configured with an on-duration time, inactivity time, or other activity behavior for each value or range of values of:

Amount, percentage, or density of available resources in a time/frequency window (e.g. the initially configured on-duration or inactivity timer period).

Amount, percentage, or density of resources for which received signal strength indicator (RSSI) is above/below a threshold.

For example, the WTRU may determine the percentage of available resources in a first configured on-duration. If the percentage of resources is below a threshold, it may then increase the on-duration to a second value. Alternatively, the WTRU may select an on-duration such that the absolute amount of resources available is above a threshold.

(C). Resource Selection can be Performed to Avoid the On-Duration

In another solution to the problem of half-duplex, a WTRU may perform resource selection for transmission in order to avoid or reduce potential collisions with its reception-based activity time (e.g. on-duration). For example, a WTRU may perform resource selection for its own transmission by removing resources associated with its own on-duration (for RX-based), the active time, etc. For example, a WTRU may perform resource selection for its own transmissions by selecting resources associated with its on-duration (for RX-based) with lower priority.

A WTRU may further extend its on-duration, if it requires selection of resources for transmission during the said active period. Specifically, a WTRU may select resources for transmission during the active period in order to satisfy the timing requirements of its data transmissions. If resources are selected during the active period, the WTRU may extend the active period by a (pre) configured amount. The amount may further depend on the amount of resource selected by the WTRU which fall during the active period, or during the extended active period.

(D). WTRU Combines Independent Transmission Activity Behavior and Reception Activity Behavior to Determine Active Time A WTRU can be configured to perform transmission activity behavior only (i.e. its active time may be influenced by its own transmission on sidelink), reception activity behavior only (i.e. its active time may be influenced by reception of data on sidelink), or both transmission and reception activity behavior. For example, a WTRU which performs transmission activity behavior only can be beneficial for a WTRU performing only transmission (i.e. no reception). For example, a WTRU which performs reception activity behavior only, when in DRX configured, will perform transmission upon the arrival of data or reception of a SL grant from the network, but may determine its activity behavior following such transmission based on reception of SCI. It may, for the slots on which it is performing transmission, also perform reception (e.g. on a different carrier).

A WTRU configured to perform both transmission activity behavior and reception activity behavior may determine its active time based on a combination of the transmission-based rules/activity behavior and reception-based rules/activity behavior, where each may be as defined herein. For example, a WTRU may be configured with a DRX configuration defining its rules for active time with respect to reception of SCI. In addition, a WTRU may be configured with a set of rules for active time based on its pending transmission, as defined herein. A WTRU may determine its active time for PSCCH decoding based on the "or" operation between RX-based DRX active time, and transmission-based active times. In other words, the WTRU is active if it is required to be active for DRX defined for reception, or is required to be active based on rules related to pending transmissions. Alternatively, the WTRU may be in DRX if it is determined to be in DRX for transmission-based activity "and" determined to be in DRX for reception-based activity.

(E). WTRU Considers Transmission and Reception Events as Equivalent in Activity Behavior Determination In another example, a WTRU may consider any transmission event (e.g. transmission of HARQ feedback, transmission of data, or transmission of CSI feedback) as an activity event that is used (in conjunction with reception events) to control a single set of timers related to activity behavior. Specifically, a WTRU may start an inactivity timer. Such timer may be reset by any event associated with either reception (e.g. reception of SCI) or transmission (e.g. transmission of data). The WTRU may set the timer value (e.g. the value of the timer after which the WTRU moves to DRX) the same, regardless of the event. Alternatively, the WTRU may set the timer values based on the event itself (e.g. a transmission event may have a different value compared with a reception event). A WTRU may further set a different timer depending on the transmission or reception event itself (e.g. transmission of data results in setting timer to T1, while transmission of HARQ feedback results in setting timer to T2).

In considering transmission events in the evaluation of activity behavior, the following events (and the exact timing of these events) can be considered (treated the same or differently, as discussed above):

Transmission and/or retransmission of an CSI and/or TB (in either mode 1 or mode 2).

Reception, by the WTRU, of a SL DCI scheduling mode 1 sidelink transmission.

Transmission of any or a specific HARQ feedback (i.e. ACK, NACK and/or DTX-due to MCR requirements not met).

Transmission of CSI feedback.

Transmission of a CSI request from peer WTRU.

(F). WTRU can Perform DRX Based on Expiry of the Latency Associated with a Transmission/Reception.

In one embodiment, a WTRU can determine whether it can perform DRX based on a number of conditions being met, whereby one such condition is the expiry of the latency (time requirement) associated with an initial transmission received/transmitted by the WTRU for one of its SL HARQ processes. For example, an RX WTRU may receive an initial transmission with a priority/latency parameter in the SCI.

The RX WTRU, possibly upon meeting all other possible conditions for DRX as described herein, may move to DRX if the initial transmission was not decoded properly, and the latency indicated in the SCI has expired (relative to the timing of the initial transmission). Alternatively, the latency indicated in the SCI relative to a (pre-configured) offset from the initial transmission can also be considered for determining when the WTRU can move to DRX.

Similarly, a TX WTRU, possibly upon meeting all other possible conditions for DRX as described herein, may move to DRX if a NACK was received from an initial transmission, and the latency associated with the packet in the initial transmission has expired (relative to the timing of the initial transmission). Alternatively, the latency associated with the packet in the initial transmission relative to a (pre-configured) offset from the initial transmission timing can also be considered for determining when the TX WTRU can move to DRX.

(G). WTRU can Perform DRX Between Data Transmission/Reception and Associated PSFCH Resource In one solution, a WTRU may perform DRX between its data transmission and the associated PSFCH resource associated with that transmission. Specifically, a TX WTRU may perform transmission on sidelink, and potentially if other conditions related to DRX are met, may perform DRX in the slots between the transmission and the associated PSFCH resource for the feedback (as determined by configuration/calculation).

Similarly, an RX WTRU may perform DRX between reception of a transmission indicating feedback is required, and the corresponding PSFCH resource in which the RX WTRU performs HARQ feedback transmission.

In another embodiment, a WTRU may perform DRX during or after the PSFCH resource if the MCR requirements of the received data are not met and the RX WTRU is not required to transmit PSFCH.

(H). WTRU can Perform DRX Between Data Transmission/Reception and Blind Retransmission Resource In one embodiment, a WTRU may perform DRX between its data transmission and the blind retransmission of that data. Similarly, an RX WTRU may perform DRX between reception of a transmission for another WTRU, and the scheduled blind retransmission.

TX WTRU Behavior when Communicating with WTRUs which May be Active/Inactive

Objective: Given possibility of a WTRU being inactive [e.g. in a DRX-like context at the RX WTRU], how a transmitting WTRU can ensure it can reach such a WTRU.

Adaptation of WTRUs Transmissions Based on Known Reception Activity at the Peer WTRU A WTRU may dynamically adapt its transmission opportunities (time and/or frequency, resource pool, etc), its transmission format (e.g. type of SCI, number of subchannels, subchannel format, etc) and possibly transmission parameters (e.g. modulation and coding scheme (MCS), HARQ, etc), based on the known activity behavior and/or activity time of the receiving WTRUs, possibly of the WTRUs associated with the same group. Such adaptation of transmission opportunities may consist of any or a combination of the following behavior:

A WTRU may buffer traffic intended for one or more WTRUs or for a group (e.g. for an L2 ID) until a later time instant associated with the active time.

A WTRU may buffer CSI feedback transmission intended for another WTRU until a later time instant.

A WTRU may restrict the LCHs which can be multiplexed into a PDU transmitted at a given time and/or pool of resources to a subset of LCHs (e.g. possibly associated to intended recipients which are known to be active).

A WTRU may change or adapt its HARQ retransmission behavior (e.g. increase or decrease the number of retransmissions, change the encoding associated with each HARQ transmission, enable/disable HARQ).

Change or adapt its transmission parameters, such an MCS, the number of slots used for a single TB transmission.

Change or adapt the frequency/carrier/BWP on which the transmission is performed.

Change or adapt its resource selection decision, such as selecting time/frequency resources which meet a certain criterion which may adapt to the activity behavior of the receiving WTRU(s).

Choose between periodic or asynchronous transmissions.

Change the type or format of SCI transmission (e.g. transmit to a WTRU using single stage SCI rather than 2 stage SCI).

Change the subchannel format used for transmission.

Change/adapt/or decide whether to request feedback (e.g. CSI feedback) from the peer WTRU depending on the activity behavior of the peer WTRU.

(A). WTRU Transmits on Resources Associated with the RX WTRU Activity Behavior Based on Certain Conditions In one embodiment, a WTRU may restrict its SL data transmissions, possibly associated with a particular peer WTRU, group of WTRUs or L2 ID, such that its SL data transmissions are limited to the time/frequency resources associated with sidelink activity at the peer WTRU. Such resources may represent the time/frequency resources for which the peer WTRU(s), possibly associated with an L2 destination ID, are guaranteed to be monitoring PSCCH (i.e. in active time). The active resources may consist of a set of slots within a DRX cycle of the peer WTRU which correspond to the on-duration of the peer WTRU or set of WTRUs, possibly associated to an L2 ID, possibly associated with the cast type, possibly associated with other factors herein which may change the activity behavior of an RX WTRU. Alternatively, the active resources may be a set of time/frequency/beam resources (which may or may not be contiguous) within the resource pool for which WTRUs, possibly associated with the L2 ID, cast type, etc., are guaranteed to monitor a sidelink control channel. Alternatively, the guaranteed active resources may consist of a first resource pool, while a second resource pool may be monitored by the WTRU only under certain situations (e.g. inactivity or similar timer running). In an example application of the above, a transmitting (TX) WTRU may change the destination IDs allowed to be transmitted on a grant associated with a resource pool based on an inactivity timer associated with the last transmission on that resource pool.

A TX WTRU may determine the set of such resources:

By (pre) configuration.

a. For example, a WTRU may be (pre) configured (e.g. in system information block (SIB) or dedicated signaling) with a set of time/frequency resources for which the intended recipient is known to be active (e.g. similar to a SL DRX configuration described herein).
b. For example, such resources may be indicated as part of the TX pool configuration.
c. For example, such resources may further be specific to:
   (i) The destination L2 ID—i.e. each destination L2 ID may be configured with an active set of resources on which a WTRU interested in the L2 ID must monitor when configured in DRX.
   (ii) The unicast link or intended peer WTRU.
   (iii) The group of WTRUs.

Obtained from the peer WTRUs.
a. For example, a WTRU may receive the active resources of the peer WTRU(s) from one or another WTRU. For example, a WTRU in a unicast link may sends its DRX configuration, or pattern of active resources for itself and/or the peer WTRU to the peer WTRU during PC5-RRC signaling exchange during or after unicast link establishment.
b. For example, a WTRU may periodically broadcast its active resources such as:
   (i) In a PC5-RRC message transmitted to the L2 ID to which it applies, or to a special L2 ID.
   (ii) In an SCI, where the SCI may contain an index to a predefined or (pre) configured set of active resources, and where the L1 ID may be a special L1 ID, or the L1 ID to which the active resource applies.
   (iii) In a SL MAC CE, where addressing and indexing may be similar to the above examples.

A WTRU may further restrict its SL transmissions to such a set of resources only for a subset of resources/transmissions, determined based on any of the following conditions/behavior:

1. Conditions Related to Time
   Based on a timer, or an amount of time related to a previous transmission performed by the WTRU. For example, a WTRU may restrict its transmissions to only a subset (corresponding to the monitoring resources for inactive RX WTRU) of resources if the last transmission made to the same destination occurred at least some amount of time in the past. For example, a WTRU may start/restart a timer associated with transmissions to a particular destination following a transmission to that destination. As long as the timer is running, the WTRU may perform transmissions to that destination without any restriction on the time frequency resources. After expiry of the timer, the WTRU may perform transmission to that destination only on the set of active resources for that destination.
   Based on a timer, or an amount of time related to a previous transmission performed by another WTRU (which may possibly include also the intended destination WTRU, in the case of unicast), whereby such transmission may indicate that the intended destination can receive transmissions outside of the active resources.
   a. Similar to, or in conjunction with the previous solution, the timer may be reset following reception of a transmission from another WTRU to the same destination (e.g. same L2 ID). Such resetting of the timer may further be dependent on a property of the received transmission which may reflect the likelihood of reception of such a message, such as:
      (i) The configured MCR.
      (ii) Whether and the number of retransmissions configured.
      (iii) Whether HARQ feedback is configured with the transmission.
      (iv) The received power (e.g. RSRP) of the transmission (e.g. the PSCCH, PSSCH, RS, etc.).
   b. In another example, a WTRU in a unicast link with a peer WTRU may perform transmission to the peer WTRU outside of the active resources for some period of time (timer) following reception of a transmission from that peer WTRU. Such timer may be independent of the timer associated with its own transmissions, or transmissions from another WTRU.
   c. In another example, the intended destination WTRU may provide its list of interested L2 destinations (for which it is actively decoding data). The TX WTRU may then transmit on a resource outside of the active resources of the destination following the reception by the TX WTRU of data addressed to one of these interested destination (based on a similar timer behavior to the previous two examples).
   d. In another example, a first WTRU may perform data transmissions to a second WTRU when such transmissions coincide with the timing of HARQ feedback resources use by the first WTRU to send HARQ feedback to the second WTRU's transmissions. Specifically, the first WTRU may determine the timing of HARQ feedback (PSFCH) to be transmitted to the second WTRU following transmissions by the second WTRU. The first WTRU may determine such slots containing PSFCH (or a number of slots before/after the PSFCH resource) to be allowed and/or part of the restricted set of active resources that can be used to transmit to the second WTRU when the second WTRU is in DRX.

2. Conditions Related to Quality
   Based on a QoS requirement/aspect of the data to be transmitted.
   a. For example, a WTRU may be configured to transmit data with certain QoS requirements only on active resources. For example, a WTRU may be configured with a SLRB or LCH configuration associated with whether a WTRU should transmit data on an active resource, or whether it is able to transmit data from that LCH on other resources (provided possibly other conditions discussed as part of this solution—e.g. timer—is also satisfied).
   b. A WTRU may further be configured with a logical channel prioritization (LCP) restriction such that it cannot multiplex the data/LCHs which allow transmission outside of the active resources and data/LCHs which are required to be transmitted on active resources.
   c. Such LCP restriction may further be applicable as long at the TX WTRU has not received indication from the RX WTRU that it has started its inactivity timer. For example, such LCP restriction may be applicable until the TX WTRU has received an indication from the peer WTRU (e.g. HARQ feedback, CQI request/report, RRC message, MAC CE, etc.) which may indicate that the RX WTRU is no longer in DRX or is monitoring resources outside its normal DRX active period (e.g. inactivity timer is running).

Based on the presence/absence of feedback received from one or more peer WTRUs.
  a. For example, a WTRU may perform a transmission on an active resource following a one or more transmissions to the destination such that the WTRU did not receive HARQ feedback.

3. Conditions Related to Cast Type

A WTRU may determine its available resources for transmission, or the transmission resources which will allow it to reach the peer WTRU(s) based on the cast type of the transmission in question. Specifically, a WTRU may assume a first set of resources can be used to reach WTRUs for broadcast/groupcast transmissions and a second set of resources can be used to reach WTRUs for unicast groupcast. Based on differences in the DRX mechanism applicable to cast type described further herein, a WTRU may also determine the resources in which a unicast WTRU is reachable differently than the resources for transmission of broadcast/groupcast. For example, a WTRU may use a separate resource pool for transmission of some (e.g. possibly the first transmission in a set of transmissions, possibly transmissions with higher QoS) or all transmissions. For example, a WTRU may use a dedicated set of "active" resources in a resource pool for transmissions of broadcast/groupcast, where such set of resource may be statically allocated in the resource pool. Alternatively, a WTRU may transmit to a unicast peer WTRU according to a pattern of resources which may change dynamically based on its own transmission pattern/activity. Specifically, a WTRU may transmit to a unicast peer WTRU in resources which may be outside of the "active" resources of the unicast (or broadcast/groupcast) but in which the inactivity timer associated with the specific peer WTRU (as described herein) is running.

(B). WTRU Tailors its Resource Selection and/or Logical Channel Prioritization (LCP) when the Conditions are Met When a WTRU restricts its transmission to the active resources, the WTRU may perform resource selection and TB transmission/LCP in consequence of such active resources. Specifically:
  a WTRU may exclude or deprioritize resources which are not part of the active resources for a destination when transmitting to a destination, possibly only when one of the conditions described above is met.
  a WTRU may determine all of its transmission and retransmission resources (e.g. for blind retransmission) such that they all fall within active resources, possibly only when one of the conditions described above is met. Alternatively, the WTRU may determine its transmission/retransmission resources such that the first x transmissions of the same TB fall within the active resources, possibly only when one of the conditions described above is met.
    a. For example, the WTRU may perform an initial transmission within a first pool (the guaranteed active resources) and select resources for retransmission in a second pool (the non-guaranteed active resources). Alternatively, a WTRU may select resources for an initial transmission and the following x retransmissions from the first pool, and the remaining retransmissions from the second pool.
  A WTRU may select a number of processes or resources such that a number x of resources, possibly associated with distinct TBs, occur within the guaranteed active set of resources or resource pool.
  Given a sidelink grant, if the sidelink grant is associated with a resource which falls within the active resources for a specific destination L2 ID, the WTRU may select the associated destination L2 to be transmitted for that grant, otherwise, the WTRU may not use the grant for the associated destination L2 ID. The WTRU may perform such restriction possibly only when one of the conditions described above is met.
  A WTRU may select the periodicity of a sidelink process to match the periodicity of the active resources, possibly associated with a specific destination. The WTRU may then apply a restriction on the destination(s) selected such that the sidelink process is used to transmit data to the destination associated with the active resources. The WTRU may perform such period selection and/or restriction possibly only when one of the conditions described above is met.

(C). WTRU Performs TB Repetition or Retransmission at Different Offsets Associated to a Destination In one example embodiment, a WTRU may perform transmission of the same data in different resources, where each of these resources may be associated with different possible configurations of the same destination. For instance, a groupcast or broadcast L2 destination ID may be associated with a DRX configuration having different slot offsets (e.g. configured differently depending on the gNB in which the group members are being controlled). A WTRU may be (pre) configured with the possibly different configurations for the destinations (e.g. based on dedicated signaling of system information block (SIB) from the network). The WTRU may perform retransmission of a TB in each of the active resources associated with the different configurations. Specifically:
  In mode 2, the WTRU may select transmission and retransmission resources such that each transmission/retransmission is associated with one of the different configurations received by the WTRU.
  In mode 1, the WTRU may receive a single sidelink grant (e.g. via a DCI) which corresponds to physical resources in sidelink which occur in each of the active resources (e.g. one transmission resource per configuration or offset). The WTRU may perform transmissions of the same TB in each of the associated physical resources. Alternatively, the WTRU may receive individual grants in each of the active resources associated with the different configuration and may perform transmission of the same TB in each of these resources.

(D). WTRU Increases the Reliability of Transmissions within the Active Resources Objective: In the timer-based condition, if the RX WTRU experiences half duplex, subsequent transmissions which are not within the active resources may be missed.

In one embodiment, a WTRU may increase the reliability of a transmission occurring within the active resources to increase the probability that subsequent transmissions are successfully received by the destination WTRU(s). Such increase in reliability may apply to (possibly only to) a transmission which is made in the active resources as a result of the WTRU not being able to transmit in the non-active resources (e.g. based on expiry of the transmission timer described within this solution family). Specifically, a WTRU may perform transmissions with increased reliability when an inactivity timer at the TX WTRU (possibly associated with a L2 source/destination) is not running. Specifically, a WTRU may perform such transmissions only in the active resources associated with the L2 source/destination. The WTRU may perform any of the following to increase the reliability of such transmission:
  Perform blind or HARQ-based retransmissions within the active resources.

Perform a larger number of retransmissions than required/configured.
  a. Specifically, a WTRU may determine the number of retransmissions to a L2 source/destination ID based on whether the inactivity timer for the L2 ID is running or not.
Transmit multiple pending TBs to the same destination within the active resources.
Select a large number of resources for transmission (in resource selection) within the active resources.
  a. Specifically, a WTRU may determine the number of resources in the active time (for transmission and/or retransmission) based on whether the inactivity timer for the L2 ID is running or not.
Use a different MCS (e.g. more conservative MCS) for transmissions within the active resources.
Use a different MCR for a transmission.
  a. Specifically, a WTRU may use the MCR configured from upper layers when the transmission is made with the inactivity timer running, and may not use the MCR (or may use a different or larger MCR) when the inactivity timer is not running, For example, a WTRU may be configured with a maximum number of retransmissions that can be performed for a transmission of a TB while the peer WTRU(s) are assumed to be in inactive state. For example, a WTRU may be configured with a maximum number of retransmissions that can be used when the activity timer at the TX WTRU corresponding to an RX WTRU is not running. Such maximum number of retransmissions may be different from the maximum number allowable when the peer WTRU is active and/or the inactivity timer at the TX WTRU corresponding to the RX WTRU is running. The WTRU may select the number of retransmissions depending on the state of the inactivity timer.

For example, a WTRU may be configured to use a maximum number of retransmissions for transmission to a peer WTRU in inactive state which does not depend on CBR (e.g. WTRU selects a maximum value of retransmissions, regardless of the measured CBR). When the peer WTRU(s) are assumed to be active (i.e. inactivity timer running), the WTRU may determine the maximum number of retransmissions based on CBR.

For example, a WTRU which performs resource selection for transmission to an inactive WTRU (e.g. while the inactivity timer is not running) may be configured to perform blind retransmissions such that the resources selected for the blind retransmissions fall within the active time (e.g. on-duration or activation resource pool) of the peer WTRU. When the peer WTRU is assumed to be active, the WTRU may select any resources for retransmissions. Alternatively, when the peer WTRU is assumed to be inactive, the WTRU may select a subset of resources for the transmissions/retransmissions to fall in the active time (e.g. on-duration or activation resource pool) of the peer WTRU.

For example, a WTRU may be configured with a different number/percentage of resources to be selected within the active resources of the peer WTRU(s)/L2 ID(s) depending on whether the inactivity timer is running for that peer WTRU(s) and/or the value of the inactivity timer at the time of transmissions/resource selection.

For example, a WTRU may be configured to initiate transmission in the non-active resources only after it has performed at least N transmissions in the active resources. The WTRU may further restrict transmissions in the non-active resources, as described, when the inactivity timer for the peer WTRU is not running or has a value that meets some preconfigured condition. The WTRU may further determine such a value based on other factors described herein, such as QoS of transmission(s), CBR, etc.

(E). WTRU Prioritizes/Restricts Transmissions to Peer WTRU(s) in Grants which Fall in/Out of the Active Time of that Peer WTRU In one solution, a WTRU may prioritize transmission to a specific peer WTRU when selecting data to transmit in a grant if such grant is associated with the active time of the peer WTRU. Specifically, a TX WTRU may receive a grant (e.g. from the network in mode 1, or from resource selection procedure in mode 2). When selecting the L2 destination ID of the pending data for transmission to be occupied by the grant, the TX WTRU may prioritize L2 destination ID(s) associated with a peer WTRU for which the grant is associated with (i.e. falls within) the active period of a DRX pattern. For example, a TX WTRU may communicate with two peer WTRUs in unicast, where the first peer WTRU is configured with DRX and the second peer WTRU is not configured with DRX. If the WTRU receives a grant which occurs within the active time of the first peer WTRU, the TX WTRU may prioritize/restrict transmission of data destined to the first peer WTRU in such grant. Conversely, the TX WTRU may prioritize/restrict transmission of data to the second peer WTRU for grants which occur outside the active period of the first peer WTRU. Specifically, a TX WTRU may restrict selection of a L2 source/destination when the grant does not fall within the active time of that L2 source/destination, and that L2 source/destination is configured with DRX.

A TX WTRU may achieve such prioritization/restriction based on any of the following:
  An LCP restriction associated with the grant.
    a. For example, a grant which occurs during the active time of a particular WTRU may not be allowed for transmission of data associated with another WTRU which
      (i) Does not have DRX configured.
      (ii) Does not have the same or overlapping active time of the particular WTRU.
    b. For example, a grant which occurs during the non-active time of a particular WTRU may not be used for transmission of data associated with that particular WTRU.
  A separate prioritization step in the LCP procedure.
    a. For example, when determining the destination L2 ID to associate with a grant that occurs in the active time of one or more particular peer WTRU, the TX WTRU may determine the L2 destination ID(s) having the highest priority logical channel with data available for transmission among all L2 destination ID(s) which have DRX configured and in which the grant falls into the active time of that L2 destination ID(s).
    b. If there are no such L2 destination IDs with data available, the TX WTRU may select another L2 destination ID with data available based on legacy LCP (i.e. the L2 destination ID with the highest LCH priority have data available for transmission).
    c. For example, if two destinations have the same or similar priority, the WTRU may select the destination which is configured with DRX and for which the grant falls in the active time of that source/destination/WTRU.
  A bias applied to the LCH priority in the LCP procedure.
    a. For example, the priority associated with L2 destination ID(s) which are configured with DRX may be increased by a bias when the grant being considered falls in the active time of the specific L2 destination ID. Specifically, the WTRU may add a bias to a specific LCH priority when considering the highest priority LCH for selection of the L2 destination ID for a grant during the LCP procedure.

In another related solution, a TX WTRU may further determine whether to perform the prioritization described above for a specific grant based on a combination of one or more factors such as:

The priority of data pending for transmission, possibly associated with the L2 destination ID(s) of the WTRUs which are configured with/without DRX and/or for which the grant falls in the active period or non-active period.
  a. For example, the WTRU may perform such prioritization/restriction if the priority associated with the peer WTRU associated with DRX is above a threshold.

The DRX cycle value (i.e. periodicity of the active time) associated with the peer WTRU configured with DRX.

The amount of time which data intended to the peer WTRU in DRX has been pending for transmission.

The PDB (required transmission latency) of the data intended for the WTRU configured in DRX which is pending for transmission at the TX WTRU.

The remaining PDB (i.e. the remaining required latency for transmission of data) measured at the time of the grant.

The measured CBR.

In one example, a TX WTRU may apply the above prioritization rule when the remaining PDB is smaller than the DRX cycle value associated with the peer WTRU. Otherwise, the TX WTRU may not apply the prioritization rule.

In another example, a TX WTRU may apply the above prioritization rule when the highest priority of data pending for transmission to the WTRU with DRX configured is above a threshold, where such threshold may further depend on the other factors, such as DRX cycle value and/or the measured CBR.

In one example of LCP procedure, a TX WTRU may select the source/destination for transmission in a grant by selecting the L2 source/destination having the highest priority logical channel with data available for transmission among the L2 source/destinations which are not configured with DRX, or which (if configured with DRX) have an active time which overlaps with the grant. If multiple destinations have the same priority, or fall within a range of priority, the TX WTRU may select the destination which is configured with DRX and for which the grant is occurring in the active time.

(F). WTRU Prioritizes/Restricts Transmissions to Peer WTRU(s) Based on Grant Location within the Active Time In one solution, a WTRU may prioritize/restrict transmission to a peer WTRU on a grant based on the moment in time of the grant within the active period. Specifically, a WTRU may prioritize/restriction transmissions to a peer WTRU when the grant is located at the end of the active period. Such may further depend on the remaining PDB of the data pending for transmission to the WTRU. Such may further depend on the time of occurrence of the next active period (e.g. the DRX cycle), possibly relative to this remaining PDB.

For example, a WTRU may prioritize/restrict a grant which occurs in the last n slots of the active time (on duration) or a particular peer WTRU, the last n % slots of the active time of a particular peer WTRU, or after some amount of time has elapsed within the active period of a particular peer WTRU, such that the WTRU may prioritize/restrict transmission to that particular peer WTRU in such grant. The WTRU may also perform prioritization/restriction, or may change the prioritization, based on whether a subsequent DRX active period falls within the remaining PDB of the data to be transmitted.

In one example embodiment, a TX WTRU may enable a restriction in the LCP procedure such that a grant which falls in the last N slots of the DRX active time of a specific WTRU must be used for data transmissions to that particular WTRU, if the TX WTRU has pending data to be transmitted to that peer WTRU.

In one example embodiment, a TX WTRU may enable the restriction described in the previous example embodiment if the data which is pending at the TX WTRU has a remaining PDB that is smaller than (possibly a function) of the DRX cycle of the RX WTRU.

In one example embodiment, a TX WTRU may bias the priority of a LCH during destination selection in LCP, whereby the bias is a function of the position/location of the grant within the active time. Specifically, a WTRU may increase the priority of the LCH by some amount when the LCH is associated with transmission to a peer WTRU and the grant is located within the last N slots of the active time of that peer WTRU. The WTRU may further apply such bias or not, depending on the relative size of the remaining PDB and the DRX cycle, as described in the above examples.

(G). WTRU Changes/Adapts an LCP Restriction on Resource Pool Based on Elapsed Time Since the Last Data Activity A WTRU may be configured with an LCP restriction associated to a resource pool. Specifically, a WTRU may be configured with a restriction to allow a certain LCH to be multiplexed to a resource grant during LCP as long as the resource is associated with a first pool. With such a restriction, a WTRU may not be allowed to multiplex data from such logical channel to a grant associated with a second pool.

A WTRU may change such LCP restriction (enable/disable restriction) based on a condition related to the elapsed time since the last data activity. Data activity may consist of any of:

A data transmission, possibly associated with the L2 source ID and/or L2 destination ID of the LCH.

A data transmission, possibly containing data from one or more of the restricted LCHs in question (e.g. the LCH in question).

An acknowledgement or feedback (e.g. HARQ feedback, CSI feedback, RSRP, etc), possibly associated with one of the data transmissions above.

The transmission/reception of an activity command, as discussed herein.

Such restriction that can be changed may be configured only for certain LCHs, while other LCHs may be configured with a static restriction (i.e. configuration is per LCH).

For example, a WTRU may restrict an SLRB/LCH to use resources from a first pool only when the when the last transmission associated with the L2 ID associated with the SLRB/LCH occurred sometime T1 in the past, where T1>threshold. For example, a WTRU may maintain an individual timer per L2 destination ID and/or L2 source ID. The WTRU may start such timer upon transmission to the L2 source and/or destination ID. Upon starting such timer, the WTRU may cancel/disable an LCP restriction associated with one or more LCHs. The WTRU may reset such timer upon transmission to the destination ID and/or source ID. When the timer expires, the WTRU may enable the LCP restriction.

In another example, a WTRU may restrict an SLRB/LCH to use resources from a first pool. Upon reception of feedback (e.g. HARQ ACK feedback) a WTRU may initiate a timer and disable the restriction during the running of the timer. Specifically, the WTRU, while such timer is running, may allow multiplexing data from the said LCH on grants from either the first pool or the second pool. The WTRU may reset such timer on each reception of HARQ feedback from the peer WTRU. Upon expiry of the timer, the WTRU may re-enable the LCP restriction and allow the LCH to be multiplexed on grants only associated with one of the pools.
(H). WTRU Changes/Adapts an LCP Restriction on Resource Pool Based on Amount of Data being Transmitted in a Pool In one solution, a WTRU may adapt an LCP restriction to a resource pool based on the amount of data being transmitted on that pool. Specifically, a WTRU may enable/disable such restriction (for a particular logical channel) based on the amount of data being transmitted on a first pool, measured by any of:
  The number of sidelink process on the first resource pool.
  The Channel occupancy Ratio (CR) on the first resource pool.
  The periodicity of one or more processes on the first resource pool.
  The number of subchannels selected for a grant on the first resource pool.

Specifically, an LCH may be allowed to be transmitted on a first resource pool or a second resource pool. When any of the above measures of data amount exceeds or does not exceed a threshold, the WTRU may restrict such LCH to be allowed only on a second pool (not allowed on the first pool) or only on the first pool (not allowed on the second pool).
(I). WTRU Tailors Feedback Request (e.g. CSI) to the Activity Time of the Peer WTRU A WTRU may adapt the timing of the CSI feedback based on the known activity time of the peer WTRU. For example:
  a WTRU may request CSI feedback only within a certain portion of the activity time (e.g. the first N slots of the DRX on time, or a specific subset of the inactive monitoring resource pool).
  a WTRU may request CSI feedback only when the inactivity timer of the peer WTRU is expected to be below a threshold.
  a WTRU may only transmit CSI feedback request in the first transmission to the peer WTRU associated with the DRX on time, or some preconfigured or predetermined resource(s) associated with the inactive resource pool.

WTRU Transmits an "Activity Signal" to Indicate Sidelink Transmissions in an Upcoming Time/Frequency Period In one embodiment, a WTRU may be configured to transmit an activity signal, possibly at a predefined time/frequency resource in order to schedule/signal the intention to transmit a sidelink transmission over a future period of time and/or set of frequency resources. An activity signal may be an explicit signal (e.g. an SCI, MAC CE, or SL RRC message that acts explicitly as an activity signal). Alternatively, an activity signal may consist of a normal sidelink transmission on a set of resources set aside for the activity signal (e.g. normal SCI transmission on a set of sidelink resources associated with an activity signal). The activity signal may be linked to a set of "associated resources" whereby transmission of an activity signal indicates usage of the "associated resources" for transmission. Detection of an activity signal by an RX WTRU may require monitoring of the "associated resources" linked to the activity signal. Absence of an activity signal determined by a WTRU may indicate the possibility to perform DRX in the "associated resources" for the RX WTRU.

WTRU Transmits an Inactivity Command or DRX Flag/Indication for Assisting Peer WTRU to Minimize Energy Consumption to Change the Activity Behavior/DRX Configuration at the Peer WTRU.

In one solution, the TX WTRU may send an inactivity command (as described elsewhere herein) to change the activity behavior at the receiving peer WTRU. Such a command may be in the form of a PC5-RRC message, a SL MAC CE or a SL MAC sub-header (i.e. containing only the LCID). Alternatively, such a command may be transmitted as an SCI, or as one of the fields in the SCI (e.g. power savings flag, described further herein). Similarly, a WTRU may transmit a flag, command, or indication (in PC5-RRC, MAC CE or MAC header, or SCI) to trigger a change in the activity behavior/DRX configuration at the peer WTRU(s). Such command may indicate:
  A DRX configuration to be applied (possibly in the form of a DRX configuration ID or activity behavior ID).
  One of more parameters of the DRX configuration to be applied/changed.
  Whether to enable/disable DRX at the RX WTRU, and a possibly a time for which it should be enabled/disabled.
  A resource pool index to be used for further reception by the RX WTRU.
  The termination of the activity on at least one resource pool with the intention of stopping the activity timers (i.e. on-duration timer, inactivity timer) and deactivate monitoring of the resource pool(s) at the peer WTRU.
  A change from one (active) resource pool to another (active) resource pool at the peer WTRU.
  A period of time (e.g. number of slots, or cycles of "associated resources" as described herein), in which the peer WTRU can perform DRX, or abstain from monitoring of PSCCH for data and/or activity signal.

As an example, consider a case where a TX WTRU may be configured to perform transmission in a first resource pool and a second resource pool. For a given L2 ID, since the TX WTRU is aware of the active resource pools monitored at the peer WTRU, the TX WTRU may send an inactivity command to stop the activity timers (i.e. on-duration timer and inactivity timer) and deactivate the monitoring of the indicated resource pool(s) in the peer WTRU. Consequently, the peer WTRU can transition to DRX in the indicated resource pool(s) and achieve further power savings. The transmission of the inactivity command/indication, and possibly the information included in the inactivity command, may be triggered and/or the information in the command determined by a combination of factors at the TX WTRU such as:
  Factors associated with the SLRB/LCH configuration at the TX WTRU.
    a. For example, a TX WTRU may determine a DRX configuration to be transmitted in the DRX flag/indication based on the configured SLRBs or LCH at the TX WTRU. Specifically, a WTRU may be (pre)configured with a required RX WTRU activity behavior for a specific configuration of SLRB/LCH. For example, a TX WTRU may receive an activity behavior ID/DRX configuration ID/enable/disable flag with each SLRB configuration. The WTRU may determine the information in the DRX flag/indication to a peer WTRU(s) based on the set of SLRBs established at the TX WTRU for that peer WTRU(s).
  b. For example, a TX WTRU may trigger transmission of such a command (or include such command with pending data transmissions) upon change of the SLRB/LCH configuration.
Factors associated with data in the buffers, or buffer status of the transmitter, possibly associated with each LCH:
  a. For example, the command may be sent when the TX WTRU has no pending transmissions in its buffers, possibly associated with the corresponding RX WTRU possibly associated with one or more LCHs only.
    (i) For example, the WTRU may receive an SLRB/LCH configuration indicating whether the WTRU can send an inactivity command while configured with such LCH. The WTRU may send an inactivity command when the TX WTRU has no pending data transmissions in its buffers as long as each of the configured LCHs at the TX WTRU allow transmission of such a command.
  b. For example, the command may be sent when the amount of data in the TX WTRU's buffers, possibly associated with the corresponding RX WTRU, is below a threshold.
  c. For example, the command may be sent when the TX WTRU has no data in its buffers, possibly associated with the RX WTRU, for a period of time.
    (i) A WTRU may determine such period of time based on (pre) configuration.
    (ii) The period of time may further be configured per QoS and/or per LCH. For example, a WTRU may send an inactivity command if the WTRU has no data in its buffers and the period of time in which the WTRU has no data in its buffers for each LCH exceeds the period of time configured for that LCH.
  d. For example, the WTRU may determine the inactivity period to be transmitted in the inactivity command based on the LCHs configured at the WTRU and/or the last LCH to have data available for transmission at the WTRU before emptying the WTRU's buffers.
  e. For example, the WTRU may determine an activity configuration to be transmitted based on the amount data in the WTRU buffers. Specifically, the WTRU may be configured with an amount of data (or range of amount of data) in the buffers for each activity configuration and may select the activity configuration to be transmitted based on the buffer status
  f. For example, the WTRU may send a DRX flag indicating disabling of DRX upon reception of new data in its buffers possibly associated with one or more LCHs
  g. For example, the command may be sent to an RX WTRU with pending data in the associated LCHs after following the LCP procedure. Specifically, if the LCHs selected for a grant based on the LCP restrictions do not include any of the LCHs associated with the RX WTRU, and the TX WTRU does not have any additional grants until the next active period of the RX WTRU, the command can be sent to RX WTRU to transition to DRX. The rule applied as per the LCP procedure when determining the grant may include setting a higher priority to the SL data than to the inactivity command such that all remaining data in the buffers can be included in the grant before including the inactivity command. In this case, the command may be sent when assembling the last TB containing data from all LCHs associated to an RX WTRU, and possibly no further transmission is intended to the RX WTRU for a time duration. The command may be sent as an end-marker along with last TB by using the remaining resources in the grant.

Factors associated with HARQ feedback status from the RX WTRU.
  a. For example, the WTRU may send the command following reception of a specific HARQ feedback status (e.g. ACK) on a data transmission.
    i. e.g. ACK following last data transmitted in the buffer.

Factors associated with the latency requirement (PDB) of the data to be transmitted.
  a. For example, expiry of a timeout value associated with the PDB (packet delay budget) of one of more pending transmissions in its buffers. For example, the WTRU may send the command if all pending data to be transmitted has exceeded its PDB.
  b. For example, a WTRU may send such command upon reception of data with a latency requirement (PDB) which is smaller than some function of the currently configured activity behavior parameter (e.g. DRX period) at the RX WTRU(s).
  c. For example, a WTRU may set the value of the DRX command based on the PDB of the data in its buffers.

Indication from upper layers.
  a. For example, the WTRU may send the command following upper layer request to initiate/release a unicast link.

Factors associated with the presence/type of sidelink processes at the TX WTRU.
  a. For example, the WTRU may send the command if it has no sidelink processes active, possibly associated with one type of transmission (periodic vs asynchronous transmissions).

Factors associated with sidelink channel congestion.
  a. For example, the WTRU may send the command if, or determine the value of the command/flag depending on whether the CBR associated with the sidelink carrier, containing the configured resource pool(s) associated with the peer WTRU, is above/below a threshold.
  b. For example, the WTRU may send the command if, or determine the value of the command/flag depending on whether the CBR associated with the sidelink carrier containing the configured resource pool(s) remains above/below a threshold value for longer than a time duration.
  c. For example, the amount of time indicated in the inactivity timer may depend on the measured CBR.

Factors associated with the TX WTRU location.
  a. For example, the WTRU may send the command if it moves into a (pre) configured location or zone for which DRX is enabled, or transmission of the inactivity command is allowed.
  b. For example, the WTRU may send the command if it detects transmissions from the peer WTRU for which it has moved out of the minimum communication range of such transmissions.

Indication from the network.
  a. For example, the WTRU may receive an indication from the network (e.g. while in mode 1) and may send the command upon reception of such indication. The indication may be received explicitly as a field in the DCI, a MAC CE or RRC message from the network. The WTRU may further receive, from the network, a period of time to be sent in the inactivity command and may include such time in the command. Alternatively, the WTRU may transmit the command as a result of other signaling from the network such as:
- (i). Reconfiguration of the SLRBs (for example, if such SLRB reconfiguration enables DRX-like behavior).
- (ii). Release of the Uu connection (for example, the command may be sent following release by the network of the RRC connection, if the IDLE mode configuration allows for DRX behavior).
- (iii). Release of one or more SLRBs (for example, the command may be sent if the network releases one or more SLRBs associated with a unicast link when the WTRU had only buffered data associated with the SLRBs that were released.

A WTRU that receives an inactivity command may perform any of the following:
- Change from one activity behavior/DRX configuration to another activity behavior/DRX configuration.
- Switch from an active resource pool to an inactive resource pool.
- Stop all timers/counters etc. with respect to active monitoring and move to an activity behavior associated with DRX and/or inactivity.
- Avoid monitoring PSCCH for data and/or activity command for a period of time indicated in the inactivity command.
- Confirm reception of the inactivity command.
- Send an indication to another WTRU or another unicast link (e.g. another pair of source/destination ID), where such indication may further include information in the received inactivity command.
- Forward the inactivity command to a set of WTRUs possibly configured at the WTRU (e.g. a destination ID that the WTRU is configured to be a relay for).
- Change the activity configuration/DRX configuration, as described further herein.

In a groupcast scenario, it may be possible for a first subset of receiving WTRUs in the group to have successfully received the transmission of a TB while for a second subset of WTRUs to require retransmissions. The first subset of WTRUs that have successfully received the TB may select to deactivate the monitoring in the corresponding resource pools and transition to DRX in subsequent slots while the second subset of WTRUs that sent feedback may continue monitoring for retransmissions. In this case, the inactivity command can be sent by the TX WTRU to the first subset of WTRUs to transition to DRX while waiting for the retransmission to the second subset of WTRUs to complete. The inactivity command may include a DRX duration for which the WTRUs in the first subset may apply to deactivate the monitoring of the resource pools so long as the DRX duration is running. The WTRUs in the first subset may re-activate the resource pools and the associated activity timers after the expiry of the indicated DRX duration. The inactivity command containing the DRX duration may be sent individually to each WTRU in the first subset via unicast transmissions.

(A) WTRU Indicates in a Periodic Reservation SCI Whether DRX is Permitted by the Peer WTRU In one example embodiment of the above solution, a WTRU may include a flag/indication to the peer WTRU in a periodic reservation SCI (i.e. an SCI reserving a resource in the future) indicating whether the peer WTRU(s) may perform DRX in any/all of the slots between the current SCI and the future resource. A WTRU may determine whether to include such flag and/or the value of this flag (i.e. whether the peer WTRU should monitor PSCCH for scheduling or not between periodic SCI transmissions) based on any of the following:

Whether an asynchronous transmission is planned/scheduled prior to the future schedule resource.
- a. Specifically, a WTRU may decide to perform resource selection for one-shot/asynchronous transmission in one of the resources between the SCI and the future reserved resource, and may indicate to the peer WTRU to perform PSCCH decoding for scheduling between the periodic transmissions.

Whether resource reselection is required/triggered.
- a. Specifically, a WTRU may trigger resource (re) selection for the same periodic process (or another periodic or aperiodic process) and may indicate to the peer WTRU(s) to monitor PSCCH for scheduling between the periodic transmissions.

Based on the arrival of new data, possibly associated with a specific LCH and/or QoS requirement.
- a. For example, a WTRU may indicate that PSCCH monitoring for scheduling is required by the peer WTRU(s) if data has arrived for a specific LCH (e.g. a LCH configured with such property, or an LCH configured with a specific priority/latency and/or other Qos parameter).
- b. For example, a WTRU may indicate that PSSCH monitoring for scheduling is required by the peer WTRU(s) if data has arrived and the PDB requires such data to be transmitted between the periodic transmissions.
- c. For example, a WTRU may indicate that PSSCH monitoring for scheduling is required by the peer WTRU(s) if data has arrived such that the priority of such data meets a criteria related to other data in the WTRUs buffers, some preconfigured condition, any data reported in a previous BSR, or a combination of such.
  - (i) E.g. priority higher than (or equal to) any of the existing data in the WTRUs buffers.

Based on the need to perform a CSI request.
- a. For example, a WTRU may indicate that PSCCH monitoring for scheduling is required by the peer WTRU if the TX WTRU intends to transmit a CSI request (or has a pending CSI request).

A WTRU may further provide a set of resources (explicitly or based on an index to a predefined configuration) for which the peer WTRU should perform PSCCH monitoring between the SCI and the future reserved resource, and may restrict such SCI transmissions (based on resource selection) to such resources. Alternatively, the WTRU may provide the selected resource for an asynchronous transmission (following resource selection) in the SCI. The RX WTRU, upon reception of such additional information, may perform DRX on all slots between the SCI and the future reserved resource except for those indicated in the selected/restricted resource list in the SCI.

WTRU Transmits Padding to Indicate the Ability of the Peer WTRU to Perform DRX

In one solution, the TX WTRU may send an implicit inactivity command indicating an RX WTRU to stop the monitoring of the configured resource pool(s) and transition to DRX. As an example, the inactivity command may be sent in the form of one or multiple padding bits, which constitute the remaining bits after the initial data bits are assembled in the MAC PDU. The inactivity command may be sent implicitly by the TX WTRU when the following conditions are satisfied:

Data in the buffers in all prioritized LCHs and MAC CEs associated with the RX WTRU can be included within a grant.

Further remaining resources are available within the grant for including the padding bits.

No transmissions are required in at least one subsequent period corresponding to the activity period of the RX WTRU to any of the configured resource pool(s) monitored by the RX WTRU.

The inactivity command may be pre-configured to also implicitly indicate the following information:

DRX duration: For example, the inactivity command indicates implicitly the duration for which the RX WTRU remains in DRX so long as the DRX duration is running. After the expiry of the pre-configured DRX duration the RX WTRU may re-activate the resource pools and the associated activity timers.

Active resource pools: For example, the inactivity command indicates implicitly the resource pool(s) which the RX WTRU may activate and monitor after transitioning from DRX.

(A). WTRU Determines the Set of Resources for the Activity Signal and Associated Resources A WTRU may be configured with a specific or dedicated set of resources for transmission/reception of an activity signal. Such dedicated set of resources may consist of any combination of:

A preconfigured time/frequency resource within a resource pool.

A preconfigured SL frame/subframe/SFN number.

A WTRU may determine the activity signal resources using identification of resources obtained from any of the following sources:

SIB or dedicated signaling—For example, the WTRU in coverage may determine a frame/slot number from system information. Each WTRU may then be configured (also in SIB or dedicated signaling) with the time/frequency resources for the activity signal resources and the associated resources. Such configuration may further be determined based on other factors described further below (e.g. L2 destination ID).

SL-MIB, SL SSB, SL-PBCH, or similar sidelink broadcast channel—For example, a WTRU out of coverage may determine a frame/slot number from a sidelink broadcast channel. Each WTRU may then be configured (in preconfiguration) with the time/frequency resources for the activity signal resources and the associated resources. Such configuration may further be determined based on other factors described further below (e.g. L2 destination ID).

GNSS or similar satellite signal—For example, a WTRU in coverage or out of coverage may determine a frame/slot number from GNSS. Each WTRU may then be configured (in SIB or (pre) configuration) with the time/frequency resources for the activity signal resources and the associated resources. Such configuration may further be determined based on other factors described further below (e.g. L2 destination ID).

PC5-RRC—For example, a WTRU may configure the peer WTRU with a set of resources used for the activity signal and the associated resources, when such activity signal is being used specifically for the unicast link.

A set of dedicated resources for transmission of an activity signal may further be associated with a set of time/frequency SL resources for which, when a WTRU detects a transmission of an activity signal, it should further perform active monitoring of such associated resources. A WTRU may abstain from (i.e. perform DRX) monitoring a set of associated resources when it does not detect any transmissions in the activity signal resources for that set of associated resources. A WTRU may further depend on other rules described herein to determine whether it can perform DRX in the associated resources under the absence of an activity signal.

The set of resources for activity signal may be defined in terms of the first N set of resources in the associated set of monitoring resources. For example, a resource pool or a set of time/frequency resources for transmission of sidelink, may be divided into multiple sets of resources and each set of resources may be associated with an active monitoring period. The resources associated with the activity signal may be the first N resources of each active monitoring period.

A set of resources for an activity signal, and possibly the associated resources where active monitoring is guaranteed following reception of the activity signal, may further be associated with (or dedicated to):

A cast type (i.e. an activity signal resource and associated monitoring resources for each cast type).

A L1/L2 destination ID (i.e. an activity signal resource and associated monitoring resources for each L2 ID).

A TX or RX resource pool.

A unicast link.

A QoS or priority value or set of values (i.e. an activity signal resource and associated monitoring resources for each priority value or set of values).

With such association, the TX/RX WTRU behaviors below may further be specific to each of the above factors.

(B). TX WTRU Behavior

A TX WTRU, when configured to use an activity signal for transmission may:

If the WTRU has new transmissions to perform, perform transmission in the resources for the activity signal before performing any additional transmissions on any associated resources.

If the WTRU has already transmitted in the resources associated with the activity signal, or in the activity signal itself, be allowed to perform transmission in any of the associated resources.

If the WTRU has detected transmission from another WTRU in the resources associated with the activity signal, the WTRU may transmit in any of the associated resources.

(C). RX WTRU Behavior

An RX WTRU, when configured to use an activity signal, may:

If the WTRU has received a transmission in the resources associated with an activity signal, may be required to perform active monitoring/decoding in the associated monitoring resources.

If the WTRU has not received a transmission in the resources associated with an activity signal, and possibly, if the WTRU does not meet other conditions described herein for maintaining active monitoring (e.g. CSI feedback reception expected), may perform DRX in the associated monitoring resources. The WTRU may monitor the SL resources again at the resources associated with next activity signal.

(D). A TX WTRU/RX WTRU May Prioritize the Transmission/Reception of an Activity Signal The transmission/reception of an activity signal may be prioritized over other transmissions/receptions. This may be achieved by any of the following examples:
- A TX WTRU may assign a highest priority value to the transmission of an activity signal or within the resources for an activity signal, regardless of the priority value of the actual data (if any) associated with the transmission.
- A TX WTRU may prioritize transmission of an activity signal over UL transmissions/receptions.
- A TX WTRU may preempt its own transmission, or transmission by another WTRU, in order to transmit an activity signal.
- A TX WTRU may avoid resources of the activity signal for transmission of data not intended to be for transmission of an activity signal.
- An RX WTRU may prioritize receptions of an activity signal resources over UL transmissions/receptions.
- A TX WTRU may add an offset to the priority of transmission of the activity signal and/or reception of SCIs in sensing when determining whether the resources available for transmission are available (assuming such transmission is associated with the transmission of the activity signal).

(E). Example Embodiment

Figure 3:
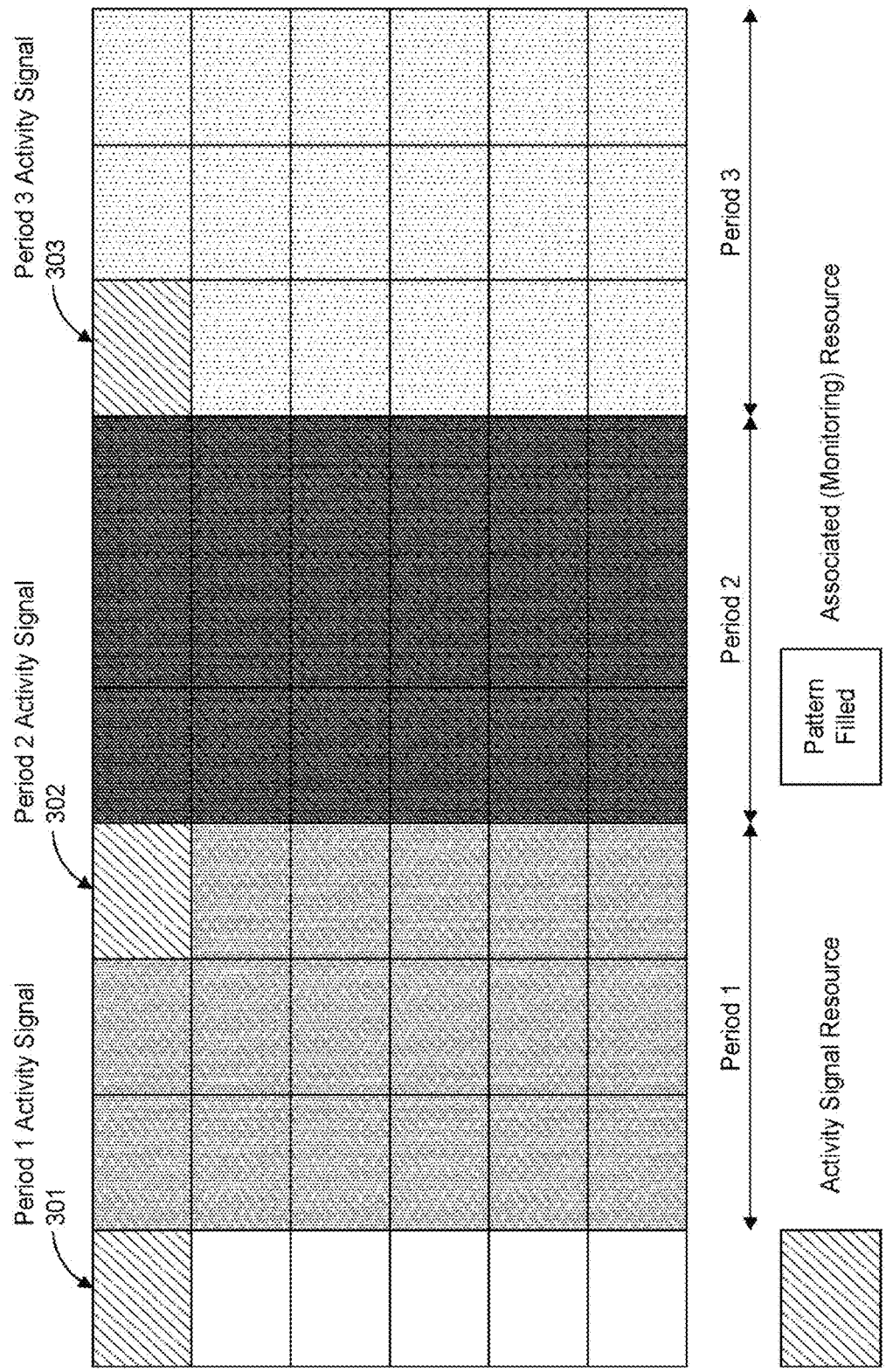
FIG. 3 depicts an example configuration of activity resources and associated resources for a L2-ID 1.

FIG. 3 shows an example embodiment of the solution/embodiment described. Activity signal transmission is performed by transmission of normal SCI/data in the resources configured as such. In FIG. 3, activity signal 301 is a transmission that is received by a WTRU for the Period 1. Activity signal 302 is a transmission for Period 2. Activity signal 303 is a transmission for Period 3. Activity signal resources are defined per L2 destination ID. The WTRU receives the activity resource configurations, and the configuration of the associated resources, via SIB, and further calculates each of these resources specific for each L2 destination ID it is currently configured to receive by upper layers.

The TX WTRU, when performing transmissions to a L2 destination ID, ensures that for each period of associated resources it wants to use for transmission, it performs transmission within the activity resources for that L2 destination ID. The RX WTRU, when it detects transmissions addressed to the L2 destination ID in the activity signal resources, will ensure it performs monitoring in the associated resources.

Figure 4:
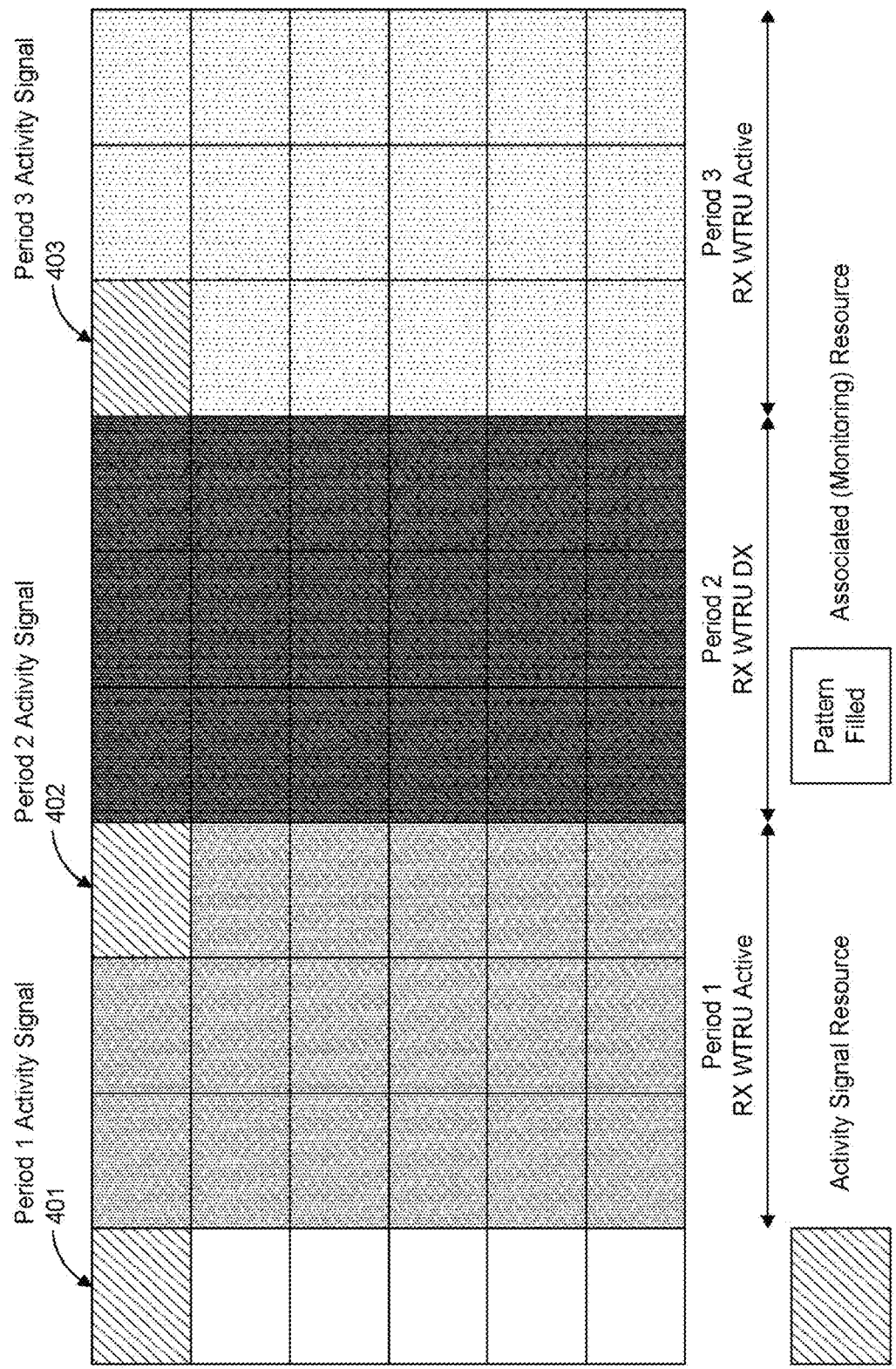
FIG. 4 depicts an example active monitoring and DRX for RX WTRU.

As shown in the example of FIG. 4, a TX WTRU performs transmissions 401 and 403 in the activity signal resource for period 1 and period 3. The RX WTRU performs active monitoring in the associated resources for these two periods. In period 2, no TX WTRU transmission occurs in the activity signal 402 for the resources for period 2. The RX WTRU, given the absence of any transmissions in the active signal resource for this period, (i.e. no TX transmission at 402) performs DRX in the associated resources of period 2.

Dynamic Resource Pool Determination
Resource Pool as a Function of the Activity

DRX and/or some algorithm (such as any of the mechanisms for power savings described herein) could further control other power savings aspects. Such aspect may include resource pool and/or one or more characteristic thereof. Such aspect may include the amount of resources maintained for sensing (e.g. sensing window). Such control may be applied only for a resource pool associated with one or more V2X group(s).

Dynamic Adaptation of Resource Pool for as a Function of Transmission Activity

For example, the WTRU may dynamically adapt the resource pool (e.g., in time and/or frequency) as a function of the scheduling activity and/or resource usage, possibly for the specific V2X group (e.g. L2 ID) over a given period of time. The WTRU may use a first resource pool when timer T is running, start or restart the timer when it determines that control and/or data is transmitted (by the WTRU, or by another WTRU) on a resource associated to the resource pool it is currently using, and use a second resource pool Y upon expiration of the timer. Possibly, the WTRU starts or restarts the timer only if it determines that the transmission is for a session of the WTRU's configuration (e.g. associated with one or more specifically configured L2 ID). Possibly, the WTRU makes such determination using transmissions in only one of the resource pools e.g., if the other resource pool is used only for the purpose of restarting the timer (e.g., if transmissions in one of the pool does not enable the WTRU to determine whether or not the transmission is for a session of the WTRU's configuration e.g., a wake-up signal). Possibly, the WTRU may additionally use the first resource pool according to a fixed, possibly configured, period.

WTRU is Configured to Activate a Second (Active) Resource Pool Based on Activity on a First Pool A WTRU may be configured with a first reception or transmission pool and a second reception or transmission pool, whereby the WTRU's monitoring activity (e.g. PSCCH decoding, sensing, use of the pool for resource selection, etc.) on the second pool is determined based on the activity on the first and/or the second pool. Monitoring activity may consist of any of the following:
- Whether or not the WTRU performs decoding of PSCCH and/or PSSCH on the second pool.
- Whether the WTRU performs monitoring/decoding of PSFCH, PSBCH, SL master information block (MIB).
- Whether or not the WTRU is allowed to transmit on the second pool.
- Whether or not the WTRU performs sensing, or stores/collects sensing results, on the second pool.
- The amount of sensing results collected for the second pool (e.g. sensing window, whether to use partial sensing or full sensing, the configuration of partial sensing, etc.).

A WTRU, during the active time, may monitor the second pool only. Alternatively, the WTRU may monitor both the first pool and the second pool.

The WTRU may determine whether to start/stop decoding on the second (active) pool based on any of the following (shown in the examples below). In certain cases, combinations of specific examples to determine the condition for activating the monitoring on the second pool are possible.

A WTRU monitoring the first pool may be configured with a first condition. The first condition may trigger the WTRU to start monitoring on the second pool, possibly in addition to the first pool. A WTRU monitoring the second pool may be configured with a second condition. The second condition may trigger the WTRU to stop monitoring the second pool and monitor only the first pool.

Possible First Condition:

The WTRU may be configured with any or a combination of the following as a first condition:

Reception of a specific L2 ID (source and/or destination).
   a. For example, the WTRU monitoring only the first pool, may start to monitor the second pool if it receives a transmission, possibly only periodic, associated with one or more specific L2 destination ID. Such L2 destination ID may be any of the L2 destination IDs the WTRU is interested in. Alternatively, such L2 destination IDs may be a subset of one or more configured L2 destination ID which trigger the start of monitoring of the second pool.

Reception of a specific amount or density of receptions in the first pool and possibly also the second pool.
   a. For example, a WTRU monitoring only a first pool may start to monitor a second pool if it receives two or more SCIs on the first pool whereby the time difference between such SCIs is below a threshold.
   b. For example, a WTRU monitoring only a first pool may start to monitor a second pool if receives a number of SCIs (above a threshold number) within a particular time period, where such time period may be further defined by the configuration of the first resource pool.

Reception of data of a specific type/nature (e.g. periodic versus asynchronous).
   a. For example, the WTRU monitoring only the first pool, may start to monitor the second pool if it receives a transmission, possibly associated with an interested L2 ID, which indicates a periodic transmission. If the WTRU monitoring only the first pool receives an asynchronous (non-periodic) transmission, the WTRU may continue to monitor only the first pool.

Reception of data, whereby at least some of the data is associated with a QoS which is configured to allow triggering of the monitoring of the second pool.
   a. For example, the WTRU may initiate monitoring of the second pool if the received PDU contains data from a logical channel configured to allow triggering the WTRU to monitor the second pool (e.g. above/below a threshold).
   b. For example, the WTRU may initiate monitoring of the second pool if the receive SCI contains a priority which is configured to allow monitoring of the second pool.
   c. For example, the WTRU may initiate monitoring of the second pool if the received data is associated with an MCR which is below a threshold, possibly relative to the estimated distance with the peer WTRU. For example, the WTRU may initiate monitoring of the second pool if it receives data and if the WTRU is located within the MCR of the data received.

Reception of an explicit command/indication to start monitoring the second pool, either from the network or from a peer WTRU. Such explicit command may be in the form of:
   a. MAC CE, RRC message, possibly transmitted together with data, possibly transmitted periodically by the peer WTRU.
     (i). For example, the message may be an indication to start monitoring the second pool.
     (ii). For example, the message may be an indication to monitor the second pool for a period of time, a number of periods (related to the data periodicity, the monitoring periodicity of the first pool, or some periodicity associated with or configured with the first or the second pool). For example, the command may contain mapping to a preconfigured time period or set of slots/subchannels in the second pool for which the WTRU is expected to measure.
     (iii). For example, a WTRU may monitor the second pool as long as it receives such a message (possibly in a periodic fashion) in the first pool and/or the second pool. Specifically, a message may be a "keep monitoring" indication. Such indication may trigger the WTRU to monitor the second pool for the time associated with the periodicity of the first pool and/or the "keep monitoring" indication. Such indication may be piggybacked with data in the first or second pool.
     (iv). For example, a WTRU may be configured with DRX enabled and may monitor a first (inactive) pool. The WTRU may be (re) configured to disable DRX and may start to monitor the second (active) pool. The WTRU may be (re) configured to enable DRX and may return to monitoring the first pool (inactive).
   b. New SCI, explicit indication within the SCI, or an SCI scheduling data in the second pool.
     (i). For example, the SCI may be a standalone SCI, or may be an SCI which schedules data.
     (ii). For example, the SCI may further be an SCI which schedules data in the second pool.
     (iii). For example, the SCI may initiate a periodic transmission on the second pool.
     (iv). For example, the SCI may provide scheduling information which indicates a resource associated with the second pool. The WTRU may start monitoring of the second pool upon reception of such scheduling.
   c. Some value of field in the SCI which is not expected for proper reception in the first pool.
     (i). For example, the WTRU may start monitoring the second pool if it receives a reservation interval which is not supported by the WTRU, or by the first pool, or which is associated with an indication to start monitoring the second pool. For example, the first pool may be configured with one or more "triggering" reservation intervals (e.g. 20 ms, 50 ms). The WTRU may start monitoring the second pool if it receives scheduling on the first pool with one of these triggering reception intervals.
     (ii). For example, the WTRU may start monitoring the second pool if it receives a reservation interval which cannot be used in the first pool based on the resource configuration of the first pool.

Possible Second Condition:

The WTRU may be configured with any or a combination of the following as the second condition:

Expiry of an inactivity timer, as discussed herein, and possibly associated with transmissions in either the first pool, or the second pool, or both the first pool and second pool.

Lack of transmissions within the MCR.
   a. For example, the WTRU may stop monitoring the second pool following expiry of an inactivity timer wherein the WTRU did not receive any transmissions which were within the MCR.

Detection of the absence of any of the first condition (either immediate or following some inactivity timer from the absence).
  a. For example, the WTRU may stop monitoring the second pool following the last transmission of a periodic process in the first pool, where the start of such periodic process may have initiated monitoring of the second pool.
  b. For example, the WTRU may stop monitoring the second pool if it does not receive the explicit command associated with the first condition, possibly in a period of transmission, or possibly with a period associated with the resources in the first pool.
  c. For example, the WTRU may stop monitoring the second pool if it does not receive the "keep monitoring" indication described further herein for the first condition.

Detection of an explicit command, transmitted in either the first pool or the second pool
  a. For example, the WTRU may receive an SCI, MAC CE, RRC message, or similar, explicitly indicating that the WTRU can stop monitoring the second pool.
  b. For example, such explicit command or message may come as an explicit indication in the SCI.
  c. For example, such command may be transmitted using similar implicit methods discussed above under section "WTRU transmits padding to indicate the ability of the peer WTRU to perform DRX".

(A). WTRU Assumes all Scheduling in the First Pool is Associated with Resources in the Second Pool In one example, a WTRU may start monitoring resources in the second pool upon reception of a scheduling SCI or command message (e.g. MAC CE, RRC). The WTRU may further assume that all transmissions in the first pool are associated with one or multiple resources (e.g. subchannel and/or slots) in the second pool. Such association may be preconfigured and/or may be indicated in the SCI/command message from the first pool itself. The WTRU may monitor the second pool for the duration of the associated resources only, and may then stop monitoring the second pool. A WTRU may continue to monitor the second pool as long as it receives an SCI or command in the first pool with some associated in the second pool.

(B). WTRU Provided with Two Different Configurations of One or More Resource Pools to be Used for Each Active/Inactive Time In one example, a WTRU may be provided with multiple (e.g. two) configurations for a resource pool. The WTRU may change from using a first configuration of a resource pool to a second configuration of a resource pool upon the occurrence of the first condition described above, or any other conditions described herein for moving from inactive RX behavior, to active RX behavior. A WTRU may further change from using a second configuration of a resource pool to a first configuration of a resource pool upon the second condition described above, or any other conditions described herein for moving from active behavior to inactive behavior. A WTRU may change any of its configuration aspects of the resource pools, which include:
Configuration of PSCCH, PSSCH, and/or PSFCH (e.g. configuration of DMRS, betaOffset for second SCI, etc.).
Subchannel size.
Number of subchannels.
Numerology.
Starting resource block for a subchannel.
MCS table.
Zone configuration.
Time window for measurements related to sensing, CBR, CR, etc.
Resource pool period and/or time resource.

For example, a WTRU may be configured with a set of parameters or a configuration of one or more of the above aspects to be used with active period, and another such configuration to be used with inactive period. The WTRU may use the first configuration when it determines it is in active period as described herein and may use the second configuration when it determines it is in inactive period as described herein.

(C). Example Embodiments (C1). Activity on the First Pool is Measured by Reception/Absence of Reception For example, a WTRU may be configured with a first RX resource pool (e.g. default pool) and a second RX pool (activity pool). The WTRU may be configured to start/restart a timer upon reception of data (possibly intended for the WTRU's interested L2 ID) within the first RX pool. While such timer is running, the WTRU may perform PSCCH decoding on the second RX pool (and possibly also the first RX pool). Following expiry of such timer, the WTRU may only perform PSCCH decoding on the first RX pool (the default pool). Such timer may be reset upon reception of PSCCH on the first and/or second RX pool.

(C2). Activity on the First Pool is Measured by Density of Receptions

For example, a WTRU may be configured to monitor the activity density (e.g. the number of received transmissions, possibly intended to the WTRU, received over some unit time) on a first pool. When the activity density of the first pool exceeds some threshold, the WTRU start monitoring the second pool (and possibly also the first RX pool). The WTRU may stop monitoring the second RX pool when such activity density of the first pool and/or second pool drops below a (possibly different) threshold. Alternatively, initiation of monitoring of the second pool may start a timer at the WTRU, and the WTRU may stop monitoring the second pool upon expiry of such timer. Such timer may be further reset upon the occurrence of a similar event associated with initiation of the monitoring of the second pool.

(C3). Activity on the First Pool is Measured by Priority of Transmissions

For example, a WTRU may be configured to monitor the priority of the transmissions, possibly intended to it, on the first pool, and may initiate monitoring of the second pool, when the priority of one or more transmissions exceeds (i.e. higher priority) a threshold. Such condition of priority may further be combined with any other examples for this solution. For example, reception density may be measured for transmissions associated with a priority above a threshold. The WTRU may stop monitoring the second RX pool when all transmissions (possibly for some time) are below a threshold. Alternatively, initiation of monitoring of the second pool may start a timer at the WTRU, and the WTRU may stop monitoring the second pool upon expiry of such timer. Such timer may be further reset upon the occurrence of a similar event associated with initiation of the monitoring of the second pool (i.e. reception density associated with a specific priority exceeds a threshold).

(C4.) Activity on the First Pool is Measured Based on the WTRU Location

For example, a WTRU configured with a first RX pool and a second RX pool may also be configured with the corresponding location information. Specifically, when the RX WTRU receives transmission in the first pool from a TX WTRU, the RX WTRU identifies the location of the TX WTRU from the location information (e.g. zone ID) indicated in the SCI. While the location information (e.g. zone ID) of the TX WTRU remains unchanged, the RX WTRU may perform PSCCH decoding on the second RX pool and possibly the first RX pool. When the location information of the TX WTRU changes due to mobility or for another TX WTRU transmitting from a different location, the RX WTRU may perform decoding of the PSCCH only on the first RX pool. The criteria at the RX WTRU for determining the location information (i.e. zone ID(s)) for which the second RX pool is monitored or not monitored may be preconfigured.

This scenario may be applicable in the case of an energy constrained public safety WTRU with the capability to select the RX pools to monitor based on the location of the TX WTRU. For example, the RX WTRU may choose to monitor the first and second RX pools associated with a TX WTRU located in a critical zone of high relevance. Alternatively, the RX WTRU may conserve energy by monitoring only the first RX pool associated with a TX WTRU located in a non-critical zone of low relevance.

Figure 5:
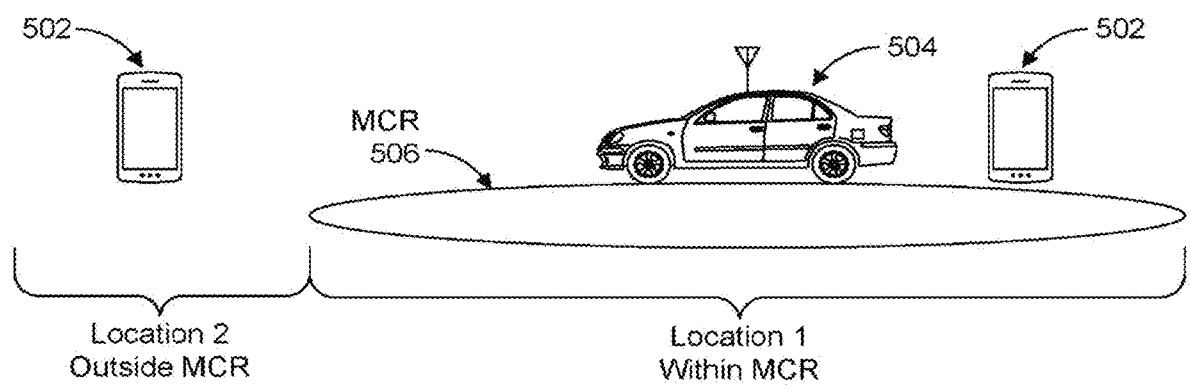
FIG. 5 depicts a WTRU in a minimum communication range for resource pool monitoring.

(C5.) Activity on the First Pool is Measured by Reception of Data within the MCR For example, a WTRU configured/having a first RX pool (representing a low level of activity) and a second RX pool (representing a higher level of activity) may move from monitoring of a first resource pool to monitoring of a first and second resource pool upon reception of data for which the WTRU is within the minimum communication range (MCR) signaled in the SCI. The MCR may be an information element received via an SCI. Priority information may be included in the SCI. The WTRU may (re) start the inactivity timer upon reception of data in the first and/or second resource pool for which the WTRU is within the MCR signaled in the SCI. The WTRU may set the value of the inactivity timer based on the QoS of the last received transmission. Following this, the WTRU may change from monitoring of the first and second resource pool to monitoring of the first resource pool when the inactivity timer expires. This embodiment is illustrated in FIG. 5. When the WTRU 502 in FIG. 5 is within the minimum communication range (MCR 506) of vehicle 504 at location 1, the WTRU 502 can monitor a resource pool associated to the low data activity (a first resource pool) and another resource pool associated with the high data activity (a second resource pool). In this configuration, the WTRU 502 may start and maintain an activity timer. When the WTRU 502 in FIG. 5 moves outside of the MCR 506 of a vehicle 504 at location 2, then the WTRU 502 does not receive data from the vehicle 504. Outside of the MCR space and possibly after the activity timer expires, the WTRU 502 can then monitor the resource pool associated to the low data activity instead of both the resource pools. In this instance (WTRU 502 at location 2 outside of the MCR 506) there is no need to monitor the resource pool associated with the high data activity.

(C6). Activity on the First Pool is Measured by Transmission Type on the First Pool A WTRU may decide whether to monitor the second pool based on a combination of any of the examples, as well as the type of transmission, where type of transmission may be any of:
Cast (i.e. unicast, groupcast, broadcast).
Data/control.
 a. E.g. whether data is associated with signaling radio bearer (SRB) or data radio bearer (DRB).
 b. E.g. whether transmission is an SCI with data, or an SCI only transmission.
Periodic vs asynchronous.
Feedback nature of the transmission.
 a. E.g. whether HARQ is enabled or not.

For example, upon reception of data in a first pool, a WTRU may start monitoring of a second pool, as long as the received transmission in the first pool is associated with an asynchronous transmission. A WTRU may not start monitoring of the second pool if the received transmission in the first pool indicates a future reserved resource (e.g. indicated by a reservation period in the SCI). A WTRU may further determine whether to monitor the second pool upon reception of a periodic transmission in the first pool depending on the indicated period. Specifically, if the next transmission indicated in the SCI is associated with a slot associated with the first pool, the WTRU may continue to monitor only the first pool, otherwise, the WTRU may monitor the second pool following the transmission in the first pool.

(D). Thresholds in the Above Examples May Further be Dependent on Channel Busy Ratio (CBR)

In any of the examples above, thresholds or conditions for determining when to start/stop monitoring of the second pool may further depend on the measured CBR. For example, the WTRU may be configured with a set of thresholds for such conditions, where each threshold is associated with a range of CBR, and the WTRU uses that threshold when the measured CBR falls within the associated range.

(E). Thresholds in the Above Examples May Further be Dependent on Priority of Transmissions which Triggered the RX Pool Changes In any of the examples above, thresholds or conditions for determining when to start/stop monitoring of the second pool may further depend on the received priority of the transmissions. For example, the WTRU may be configured with a set of thresholds for such conditions, where each threshold is associated with a priority, and the WTRU uses that threshold when the received priority matches the priority associated with the said threshold.

(E1). Two Level Monitoring Frequency of the Activation Trigger on the First Pool For example, a WTRU may be configured with two level monitoring frequency of the first pool, where the monitoring frequency is associated with the number of instances in a given time duration in which the RX WTRU monitors the second pool activation trigger (e.g. periodic signal, SL MAC CE, SCI). In this case, the first monitoring frequency can be configured to a certain value that ensures that the RX WTRU is able to detect the activation trigger sent by the TX WTRU with high probability. Likewise, a second monitoring frequency can be configured with a frequency value lower than the first monitoring frequency. While using the first monitoring frequency, an inactivity timer may be started in the first slot after the detection of an activation trigger and is reset if another activation trigger is received while the inactivity timer is running. If the inactivity timer expires without any detection of the activation trigger, the first monitoring frequency is changed to the second monitoring frequency.

(E2). Reception of the Activity Command in the First Pool Based on the WTRU Location For example, a WTRU may be configured with a first resource pool for monitoring and may also be configured with associated location information (e.g. zone ID). Specifically, the first resource pool used by the WTRU for monitoring the activation trigger to activate the second resource pool is determined based on the geographical zone in which the WTRU is located. In this case, the WTRU may be (pre) configured with one or many first resource pool(s) that can be used for monitoring for each corresponding zone ID. Since the same first resource pool configuration may be applied by multiple WTRUs at a given time and location, the RX WTRU may also be configured with additional location-based triggering condition for alleviating potential congestion in the first resource pool. As an example, the triggering condition may be to activate one or many first resource pools associated with the neighboring zones when the WTRU is close to the boundary of the current zone. The WTRU can use the activated first resource pools of the neighboring zones for monitoring the presence of the activation trigger until it moves away from the boundary region of the zone and reaches a center region of another zone, for transitioning back to monitoring a single first resource pool. In another example, if the TX WTRU is aware of the location of the RX WTRU (e.g. based on upper layer indication indicating that the RX WTRU is at the zone boundary), the TX WTRU may send the activation trigger both in the first resource pool associated with its own zone and the first resource pool associated with the neighboring zones to improve the probability of the RX WTRU receiving the activation command. In another example, if the TX WTRU is aware that it is close to the boundary of a neighboring zone, in may send the activation trigger both in the first resource pool associated with its own zone and the first resource pool associated with the neighboring zone.

TX WTRU Determines Whether to Transmit (to the RX WTRU) Using the First or Second RX Pool In one solution, the TX WTRU is configured to perform transmissions in a first resource pool and a second resource pool. The second resource pool is used, possibly in addition to the first resource pool, for transmitting data when a first condition is triggered. The WTRU may stop transmitting in the second resource pool and fallback to transmitting in the first resource pool if a second condition is triggered.

As an example, consider a sidelink process that is initiated when new data arrives in the buffer associated with one or many LCHs, which is intended for transmission to one or more peer WTRUs. The TX WTRU may determine the amount of data associated with the LCHs that can be multiplexed and assembled in one or many TBs for a given number of grants based on LCP procedure. Next, based on the awareness of the resource availability in the first and second resource pool, and the resource pool monitoring configuration applied in the peer WTRU, the TX WTRU may determine if the transmissions can be performed using the first resource pool or second resource pool or both the first and second resource pools. The use of the second resource pool is determined based on satisfying the first condition, which in turn may be dependent on several factors. Likewise, the TX WTRU may also determine if the second condition can be satisfied by identifying the triggers that may be applied to terminate use of the second resource pool for transmission.

If the first condition, and possibly the second condition, for transmitting in the second resource pool are satisfied, the TX WTRU may identify an activation trigger to send to the peer WTRU(s) to indicate the activation and monitoring of the second resource pool. The activation trigger may also contain the conditions that the peer WTRU may apply to terminate the monitoring of the second resource pool. Consequently, the activation trigger to activate the second resource pool is sent in the first resource pool before sending the data in the second resource pool, and possibly in the first resource pool. When the second condition is satisfied, the TX WTRU stops data transmission in the second resource pool and returns to transmitting only in the first resource pool.

The condition for transmitting in data in second resource pool can be one or a combination of the following factors:

LCP procedure for determining the use of first resource pool and second resource pool: For example, following the LCP procedure, the TX WTRU may determine if the data in the buffer associated with certain LCHs can be assembled in a MAC PDU for a grant associated with the first resource pool. If the grant in the first resource pool is insufficient to accommodate the data in the buffer for the LCHs, and another grant associated with the second resource pool is available for the LCHs, the resources in the grant associated with the first resource pool can be used to send the activation trigger in the first resource pool. The grant associated with the second resource pool may then be used to send the data in the buffer associated with the LCHs. For example, if transmissions are to be performed using a first resource pool and a second resource pool, the activation trigger is generated and is assigned to a priory value that is higher than the priority value assigned to all LCHs with data in the buffer. Next, the activation trigger and data in certain high priority LCHs may be multiplexed based on the order of priority in the grant associated with the first resource pool. The data in the other remaining LCHs may be multiplexed as per the order of priority into the grant associated with the second resource pool.

Data traffic type of the sidelink process (periodic/non-periodic): For example, if the data traffic type of the sidelink process is periodic, where a TB is sent to the peer WTRU with a certain periodicity, the TX WTRU may determine an activation trigger that may possibly match the periodic transmission of the data. The activation trigger can then be sent in the first resource pool, followed by the transmission of the periodic data in the second resource pool. In another example, if the sidelink process is non-period (e.g. single shot transmission or bursty transmission of multiple TBs in a short duration), the TX WTRU may determine an activation trigger that may indicate the duration for which the second resource pool is to be activated. The activation trigger may be a periodic signal where the period indicates the on-duration of the second resource pool, as an example.

Packet Delay Budget (PDB) requirement: For example, following the LCP procedure, the TX WTRU may determine if the data in the buffer can be sent using a grant associated with the first resource pool within the PDB time limit. If the grant in the first resource pool is insufficient is accommodate the data in the buffer, and another grant associated with the second resource pool can satisfy the PDB requirement, the resources in the grant associated with the first resource pool can be used to send the activation trigger in the first resource pool. The grant associated with the second resource pool may then be used to send the data in the buffer associated with the LCHs.

The amount of data in the buffers: For example, if the amount of data in the buffers intended for a specific L2 ID is larger than a threshold, the WTRU may send the activation trigger in the first pool. The WTRU may send some of the data in the first pool and some of the data in the second pool. A WTRU may continue to transmit data in the first pool as long as the data in the buffers is above a threshold.

The activation trigger that the TX WTRU may send in the first resource pool for indicating the activation and monitoring of the second pool may be any of the following:

Transmission of a periodic signal with a certain periodicity, where the periodicity may be associated with the rate/frequency at which the data is transmitted for a periodic process.

Transmission of an explicit command, which may be of the following:
  a. MAC CE, RRC message, possibly transmitted together with data, possibly transmitted periodically by the peer WTRU.
  b. New SCI, explicit indication within the SCI, or an SCI scheduling data in the second pool.
  c. Some value of field in the SCI which is not expected for proper reception in the first pool.

The WTRU may determine whether to perform one or any combination of the in the first resource pool.

Establish a sidelink process for semi-persistent reservation.

Transmit the explicit indication (e.g. a new SCI, an SCI scheduling data in the second resource pool, or MAC CE, or an RRC message) based on one or any combination of the following:
  a. The QoS of the data.
  b. The traffic type of the expected data.
  c. The cast type of the data.
  d. The CBR of the first and/or second resource pool.

As an example, the TX WTRU may send in the activation trigger the type of the scheduling mode used for using the resources in the second pool for a sidelink process. Specifically, the TX WTRU may use activity level of the data traffic in the sidelink process, and possibly other attributes described above under "TX WTRU behavior when Communicating with WTRUs which may be active/inactive" to determine the scheduling information to be indicated in the first resource pool and consequently transmitting in the second resource pool. For a sidelink process that may have both periodic and non-periodic (bursty) data arrival, the TX WTRU may monitor the data arrival in the buffer associated with an LCH for a certain duration and determine the scheduling mode to be indicated in the activation trigger. In this case, if the data arrival in the buffer is regular with a certain duration during a monitoring interval, the TX WTRU may perform the transmission periodically, with a certain periodicity. The TX WTRU may indicate in the activation trigger a semi-persistent reservation consisting of the start/offset timing information and the periodicity for accessing the second resource pool. Alternatively, if the data arrives in the buffer irregularly within the monitoring interval, the TX may perform the transmission non-periodically. The TX WTRU may indicate in the activation trigger a dynamic grant consisting of the slots/subchannels for accessing the second resource pool. Essentially, the TX WTRU may dynamically change the scheduling mode (i.e. semi-persistent reservation to dynamic grant and vice-versa) for the using the second resource pool based on the change in the data traffic activity.

In one example, a WTRU may select a TX pool for transmission based on knowledge of the activation state(s) of other RX WTRU(s). Specifically, the WTRU may select a TX pool associated with the first RX pool when it expects that one or more or all WTRUs are decoding according to a first RX pool. The WTRU may select a TX pool associated with the second RX pool when it expects that one or more or all WTRUs are decoding according to a second RX pool.

The WTRU may determine when to transmit using a first TX pool or a second TX pool based on "conditions related to time", as defined above in section "TX WTRU behavior when Communicating with WTRUs which may be active/inactive", where active resources may be associated to resources of the second RX/TX pool, and inactive resources may be associated to the first RX/TX pool.
  a. For example, a TX WTRU may perform a transmission using a first TX pool, and may start a timer. While such timer is running, the TX WTRU may transmit using the second TX pool (and possibly also the first TX pool). The WTRU may reset such timer following transmission on the second TX pool. Alternatively, or in addition, the WTRU may reset such timer following transmission on first TX pool. When the timer expires, the WTRU may, for any subsequent transmissions following timer expiry, transmit on the first pool.
  b. For example, the TX WTRU may perform a transmission on the first pool or resources periodically or occasionally while it is performing transmissions on the second pool of resources. Such transmissions may be performed to avoid timer expiry at the RX WTRU (i.e. to keep the RX WTRU active on the second pool of resources).

The WTRU may further restrict transmission on the second pool as defined as defined above in section "TX WTRU behavior when Communicating with WTRUs which may be active/inactive" based on QoS ("conditions related to quality"). The WTRU may further tailor resource selection and/or LCP transmitting on the second pool.

(A). WTRU Limits Transmissions on the First Resource Pool

The WTRU may be configured to limit transmissions in the first resource pool to avoid congestion on this pool and allow for multiple WTRUs to use it to reach WTRUs in DRX.

In one example, the WTRU may have a limit in the number of and/or non-periodic resources it is allowed to use on the first resource pool. For example, the WTRU may have a limit on any or a combination of the following on the first resource pool:

The number of TX sidelink processes it can use on the first resource pool.

The maximum usage ratio (CR) it can have on the first pool.

The maximum number of subchannels that it can select for a grant on the first pool.

The minimum periodicity of transmissions on the first pool.

A WTRU may, upon reaching any of these limits, ensure that further data transmissions which exceed such limits are performed on the second pool.

In another example, a WTRU may perform transmissions on the first resource pool only during periods of time where the RX WTRU is assumed to be inactive. Following transition of the RX WTRU from the inactive state to the active state, the TX WTRU may be allowed to perform transmissions only on the second resource pool. For example, the TX WTRU may maintain an inactivity timer associated with its transmissions to a peer WTRU. Upon expiry of such timer, the TX WTRU may be allowed to perform transmissions in the first resource pool. Such restriction may further be applicable to a subset of transmissions (e.g. subset of LCHs) based on, for example, the QoS of the data associated to such transmissions.

In another example, which may be used in conjunction with the previous example, the WTRU may use the second pool for lower priority data, as long as the resources in the first pool meet the latency requirements of the high priority data. Specifically, a WTRU, when it is performing transmissions on the first pool with the intent of also transmitting on the second pool, may restrict LCH with certain QoS (e.g. low priority) to be sent only on the second pool. Such restriction may take effect when the WTRU has any transmissions ongoing on the first pool meant for allowing transmissions on the second pool (as described herein). Additionally, such restriction may further take effect when the WTRU has reached any of the limits in the first pool described in the previous example. When the conditions allowing the WTRU to transmit on the second pool are not met, all logical channels may be restricted to using the first pool.

(B). Dynamic Change of Resource Pool Only, as a Function of the Activity Associated with the WTRUs Configuration In one example realization, the WTRU may determine that control and/or data is transmitted on a resource of a pool based on the presence (e.g., reception only, or also transmission) of control signaling, possibly only if the control signaling indicates a data transmission associated to the V2x session of the WTRU's configuration (e.g. the interested L2 IDs). A transmission performed by the WTRU may further be considered as a transmission of control and/or data in both the above cases. Possibly, the WTRU starts or restarts the timer only if it determines that the transmission is for a session of the WTRU's configuration (e.g. the interested L2 IDs).

(C). Dynamic Change of Resource Pool, One for Normal Operation and One for Wake-Up In another example realization, the WTRU may determine that control and/or data is transmitted on a resource of a pool based on a sensing procedure e.g. on a resource of the second pool Y. The WTRU may determine that control and/or data is transmitted on a resource of a pool based on the presence (e.g., reception only, or also transmission) of control signaling e.g. on a resource of the first pool X, possibly only if the control signaling indicates a data transmission associated to the V2x session of the WTRU's configuration. A transmission performed by the WTRU may further be considered as a transmission of control and/or data in both the above cases e.g. the WTRU would first perform sensing and then transmit and/or would include control information to indicate a session of the WTRU's configuration for the purpose of the above logic.

WTRU Behavior in the Presence of Grants Associated with and without Sensing

WTRU Grant May have an Associated Sensing Level

A WTRU may perform transmission, potentially to the same or different WTRUs and/or for any of unicast, groupcast, or broadcast, in the presence of grants which are derived with or without sensing results and/or with a varying amount of sensing intensity/reliability. Specifically, a WTRU may have a grant obtained using random selection and another grant obtained using sensing results. Specifically, a WTRU may have a grant which is obtained using a first level of sensing results, and a second grant obtained using a second level of sensing results. The level of sensing results may be determined by any of:

- The number of resources monitored to derive the sensing results.
- The number of different periodicities of resources with which the WTRU monitored PSCCH.
- The amount of time the WTRU has monitored PSCCH to derive the sensing results.
- The thresholds used to determine occupancy of the resources when deriving the availability.
- Whether or how many times the thresholds were increased (e.g. by 3 dB) during resource selection to obtain an acceptable amount of resources to perform resource selection.

A WTRU may quantify/indicate/differentiate a grant with no sensing, or a grant with sensing, possibly with a given level. Specifically, the PHY layer may indicate to the MAC layer whether a grant is associated with no sensing, or with sensing, possibly of a specific level.

WTRU Selects Data for Transmission Based on the Association of the Sensing Level and a Characteristic of the Data A WTRU may select data for transmission onto a grant depending on the association with sensing or the sensing level. A WTRU may prioritize certain transmissions to use on transmissions having sensing results, or having a specific level of sensing results. A WTRU may make such prioritization based on any or a combination of:

- QoS of the data, such as the priority, reliability, etc. or any associated parameter in the SLRB/LCH configuration
  a. For example, a WTRU may prioritize the use of grants having sensing results when the transmission has a high priority
  b. For example, a WTRU may prioritize the use of grants using random selection when the transmission has high priority
  c. For example, the SLRB/LCH configuration may allow transmission of a LCH onto a grant with a specific sensing level or subset of levels
- The cast type of the transmission (unicast, groupcast, broadcast)
- Whether a transmission is configured with HARQ feedback or not
  a. For example, a WTRU may allow a transmission with HARQ feedback to be performed using a grant without sensing (random selection only)
- The remaining PDB associated with a transmission
  a. For example, a WTRU may be allowed to use grant with random selection if the remaining PDB is below a threshold
- Whether a transmission is performed to an RX WTRU configured in DRX or not and/or whether such WTRU falls in the scheduled active time
  a. For example, a TX WTRU may perform a first transmission to a WTRU in DRX (i.e. to force the WTRU to start its inactivity timer) using sensing Whether an alternative grant is available with sensing results
  a. For example, a TX WTRU may transmit data on a grant with random selection if a grant with sensing results in not available to meet the latency requirements of the data for transmission (A). WTRU is Configured with SLRB Configuration Associated with Sensing and/or LCP Restriction on LCHs Having Different Sensing Requirements/Configuration In one example solution, a WTRU may be configured with an LCP restriction on multiplexing LCHs together with respect to their sensing requirements/characteristics. Specifically, an LCH may be configured with a specific/required sensing characteristic such as, but not limited to:

Full sensing required
(at least) partial sensing required
Random selection allowed
A minimum set of parameters required for sensing (e.g. a minimum number of sensed slots, a required value of K, k, N, etc. as described herein, etc)
A sensing level, as described herein A WTRU performing mode 2 transmissions may transmit data on a grant according to the sensing requirements/characteristics defined in the LCH/SLRB configuration. For example, a TX WTRU may transmit data for which the LCH is configured with "random selection allowed" using random selection. For example, a TX WTRU may only transmit data from a LCH configured with "full sensing required" on a grant selected using full sensing procedure. For example, some LCH configurations (e.g. random sensing allowed") may be transmitted on both grants associated with random selection and grants associated with partial sensing and/or full sensing.

A WTRU may be configured with LCP restrictions associated with mapping a specific LCH to grants associated with different sensing characteristics. Specifically, a grant may allow certain LCH, but not allow other LCHs, based on the sensing characteristics associated with that grant.

In an alternate solution, such LCP restriction to the type of sensing for a grant may be configured (implicitly) based on other parameters configured in the SLRB/LCH configuration and/or measurements at the WTRU. Specifically, such LCP restriction may be based on:

The L2 priority of the LCH, or any related QoS parameter
The HARQ configuration (e.g. HARQ enable/disable) associated with the LCH,
Etc.
Specifically, such LCP restriction may further depend on:
The measured CBR, CSI, RSRP or similar of the sidelink For example, a WTRU may be configured with a list of priorities for which transmission using random selection is allowed. Such list of priorities may further depend on the measured CBR.

Interaction Between DRX and Sensing Activity
WTRU Performs Combined Monitoring of RX Slots/Pools for DRX and Sensing Slots/Pools, Possibly with Different Behavior/Rules A WTRU may determine a number of resources in which the WTRU should monitor sidelink. A WTRU may be configured to monitor a group of resources (either in the form of a set or pattern of time/frequency resources within the reception/transmission resource pool, or a separate pool of resources for monitoring) for any or a combination of the following configurations:

Each WTRU it has a unicast link with, or groupings of such WTRUs it has a unicast link with.

Each group or groupcast communication (e.g. configured by upper layers).
Each L2 ID configured for transmission.
Each SLRB.
Each independent configuration of sensing resources used for resource selection when transmitting to that WTRU or WTRU(s), possible determined by coordination with other WTRU(s) or selected by the said WTRU.

The WTRU may monitor sidelink on slots associated with its reception activity behavior, and in addition to such, may monitor sidelink on slots (or in resource pool(s)) associated with one or more of the above. The WTRU's overall sidelink monitoring may consist of the combination of the sidelink resources which are associated with its RX activity behavior, as well as sensing slots/pools associated with one or more of the above. A WTRU may determine a set of time/frequency resources within the TX resource pool for each of the above. Alternatively, a WTRU may be configured with and/or determine a separate resource pool for each of the above.

A WTRU may perform sensing and collect sensing results also during the RX activity behavior of its configured RX active time. A WTRU may further determine, based on the amount and/or timing of the sensing performed during the RX active time, whether it needs to perform additional sensing (outside of the RX active time) to perform additional sensing for transmission to a peer WTRU. Such determination may be made using mechanisms described further herein.

A WTRU may perform monitoring for resources which are associated with its RX activity behavior differently than resources which are associated with sensing (i.e. resources in the TX resource pool, or separate resource pool for sensing), as further described herein. Specifically, a WTRU may perform monitoring of PSCCH and PSSCH for slots associated with its RX activity behavior, while the WTRU may monitor only PSCCH for slots associated with sensing only. Specifically, a WTRU may monitor SCI1 only for slots associated with sensing only, and may further decode SCI2 (when SCI1 matches the WTRUs L1 destination ID) only on slots associated with the WTRU's activity behavior. Alternatively, a WTRU may have a different behavior with respect to reception and/or activity behavior (e.g. timers, such as activity timer, or other DRX related behaviors described herein) for slots associated with RX activity behavior and slots associated with sensing, such as:

A WTRU may assign a different priority to the slot (e.g. whereby the priority may be used to decide whether to monitor a different carrier, different link—e.g. Uu— etc. on that slot or subsequent/related slots).
A WTRU may use a different threshold for detection of SCI.
A WTRU monitor a different number of frequency resources on that slot.
  a. For example, a WTRU may monitor all resources associated with a slot for its RX activity behavior, and may only monitor a subset of frequency resources for sensing slots.
A WTRU may use different DRX-related timers such as inactivity timer, on-duration timer, etc.
A WTRU may use different triggers for starting/restarting such timers:
  a. For example, for the RX pool, the timers may be triggered by reception triggers as described above, while for the TX pool, the timers may be triggered by transmission triggers (e.g. arrival of a packet from upper layers for transmission) and/or sensing related triggers (e.g. the number of available resources reaches a threshold).

The WTRU may monitor sidelink on slots associated with its reception activity behavior, and in addition to such, may monitor sidelink on slots (or in resource pool(s)) associated with one or more of the above. The WTRU's overall sidelink monitoring may consist of the combination of the sidelink resources which are associated with its RX activity behavior, as well as sensing resources/pools associated with one or more of the above configurations.

In the following solutions, each configuration associated to sensing is assumed to be in the form of a separate set of time frequency resources in the TX resource pool. However, the same ideas can be applied to the case that each configuration is in the form of a different resource pool, and the solutions should also apply to such a case as well.

WTRU Activity Behavior on Sidelink can be Defined by the Resources in which a WTRU Decodes SCI-2

Activity behavior, as defined herein, may be defined by the resources (slots, subchannels, etc) in which the WTRU performs decoding of SCI-2. Specifically, a WTRU in DRX, or with activity behavior configured may perform SCI-1 decoding on all of the resources configured in the RX pool. Such WTRU may perform SCI-2 decoding (associated with SCI-1) possibly only on the resources defined by the activity behavior (e.g. DRX configuration) as described herein.

SCI-1 decoding only may be associated with the following WTRU behavior:

The WTRU may monitor SCI-1 (PSCCH) and store the information about reserved resources and their associated priority (i.e. sensing results carried in SCI).

The WTRU may ignore SCI-2 decoding (i.e. does not monitor control information in PSSCH) corresponding to any control information decoding on SCI-1. Alternatively, the WTRU may ignore SCI-2 decoding except for specific transmissions in SCI-1 which may be associated with specific content of the SCI-1, such as:
  a. A specific value of the reserved field in SCI-1, or a new field created by SCI-1.
  b. A specific value of the SCI-2 format.
  c. A specific value for the time/frequency allocation in SCI-1.
  d. A specific value of the reservation period in SCI-1.

WTRU Determines the Resources for Partial Sensing Based on the DRX/Activity Behavior In one solution, a WTRU may be configured to perform partial sensing when configured with DRX or a reduced PSCCH monitoring behavior (activity behavior) as defined herein. A WTRU may further determine the resources for partial sensing from the configured activity behavior. Specifically, a WTRU may determine the resources for which it can perform sensing based on the activity behavior or a function of the activity behavior of the WTRU itself, or of one or more other WTRUs (e.g. other WTRUs in which the said WTRU has a configured unicast connection. Specifically, a WTRU may perform sensing on slots associated only with DRX wakeup timers or a number of slots surrounding the DRX wakeup times, or a number of slots spaced a certain period from the DRX wakeup time, where such number of slots may further depend on:

The QoS of any active transmissions of data in the WTRU buffers.

The LCH(s) or SLRBs configured at the WTRU and/or having data available for transmission.

QoS (e.g. priority) of recently received data at the WTRU.

The measured CBR.

The WTRU battery power.

The WTRU type (e.g. pedestrian WTRU, wearable, etc) or any capability configured at the WTRU.

For example, a WTRU may determine its partial sensing slots (i.e. the slots in which the WTRU performs sensing) as the slots associated with its DRX on-duration. For example, a WTRU may determine its partial sensing slots (i.e. the slots in which the WTRU performs sensing) as the slots corresponding to active reception on its currently configured power savings RX resource pool. Specifically, a WTRU may determine the sensing slots as the slots for which sensing results need to be collected in order to have sufficient sensing results to perform transmission during the active time of a WTRU or set of WTRUs.

(A.) WTRU Determines the Slots in the DRX Active Period of the Peer WTRU(s) which it can Use for Transmission A WTRU may first determine the slots in the DRX active period of the peer WTRU(s) which it can use for transmission. Such WTRU may then determine the sensing slots as a function of slots in the active period—as further described herein.

A WTRU may determine the number (e.g. a minimum number) and/or actual slots (subset of slots) in the DRX active period based on any or a combination of the following:

The measured CBR:
  a. For example, a WTRU may be configured with a first number of slots it can use for transmission for a first range of CBR, and a second number of slots it can use for transmission for a second range of CBR.
  b. For example, a WTRU may be configured with multiple different resource patterns (which includes the actual number of usable slots within the active period of the peer WTRU), as well as rule for selecting between the resource patterns depending on the measured CBR.

Whether data is pending for transmission to the peer WTRU, possibly a certain time before the start of the active period of the peer WTRU.
  a. For example, a transmitting WTRU may be configured with a first number of slots and/or configuration of allowable transmission slots in the active time of the peer WTRU to use when the transmitting WTRU has data available in its buffers for transmission to the peer WTRU, and a second number of slots and/or configuration of allowable transmission slots in the active time of the peer WTRU to use when the transmitting WTRU has no data available in its buffers for transmission of the peer WTRU. Such decision may further be made at a specific time instant prior to the start of the active time of the peer WTRU (e.g. a configurable number of slots prior).
  b. For example, a transmitting WTRU may not be configured with any slots allowable for transmission in the active period of the peer WTRU, and therefore with no associated resources to perform sensing on, possibly associated with that specific peer WTRU.
  c. For example, a transmitting WTRU may make such determination at a time instance related to the active SLRBs at the WTRU.
    (i) For example, the WTRU may be configured with a number of slots prior to the active time on which to perform such decision, where such number of slots is determined based on the priority of the highest/lowest logical channel.

QoS (e.g. priority) of the data to be transmitted, and/or SLRB configuration:
  a. For example, a WTRU may be configured with a number or range of number of slots it can select based on QoS of data it may transmit, possibly to a specific peer WTRU. For example, a WTRU may be configured with a maximum/minimum number/percentage of slots that it can select from within the DRX active period of the peer WTRU(s) in each SLRB configured with such peer WTRU; the WTRU would then assume the largest/smallest value of maximum/minimum number of slots configured across all SLRBs for that peer WTRU(s).
  b. For example, a WTRU may be configured with a pattern of resources in the SLRB configuration, where such pattern of resources indicates the resources within the active period of the peer WTRU(s) in which the said WTRU can select resources for transmission.
  c. For example, a WTRU may determine the number or pattern of the resources in the active time of the peer WTRU based on the QoS/priority of the data pending at the WTRU for transmission to that WTRU. Specifically, a WTRU may determine which slots in the active time of the peer WTRU, or the amount of slots that can be considered for transmission, based on the priority of the data that arrives at the WTRU some time prior to the active time (e.g. while the peer WTRU is in DRX and non-reachable).

The WTRU type (which may be tied to a WTRU capability, sensing capacity, etc.):
  a. For example, a WTRU may determine its number of resources and/or pattern of resources in the active period of the peer WTRU(s) based, possibly in part, to the configuration of the peer WTRU.
  b. For example, one WTRU type may allow all slots in the on duration to be selected, while another WTRU type may limit the number of slots to a configured number or percentage of slots in the on duration.

The amount of sensing results available.
  a. For example, a WTRU may have sensing results associated with the monitoring of resources (for sensing) required for transmission to other WTRUs. Additionally, or alternatively, a WTRU may have sensing results associated with the monitoring of its own RX active times. A WTRU may determine whether a slot in the active time of a peer WTRU should be monitored based on whether or not the WTRU has sufficient number of sensing slots (sensing results) to be able to perform transmission at this slot. The WTRU may determine what "sufficient amount" is based on:
    (i). (Pre) configuration.
      1. For example, the WTRU may be (pre) configured with the number of different periodicities, number of periods, number of consecutive resources leading up to the transmission resource, etc. required for the WTRU to be able to transmit on the resource.
    (ii). QoS.
      1. For example, the amount/configuration of the resources sensed by the WTRU to determine that the WTRU has sufficient sensing results for transmission may depend on the QoS of the transmission.
    (iii). Channel Busy Ratio (CBR).
      1. For example, the amount/configuration of the resources sensed by the WTRU to determine that the WTRU has sufficient sensing results for transmission may depend on the measured CBR.
  b. In another example, a WTRU may determine whether to include the resources in the active time of a DRX cycle depending on whether the WTRU will be able to collect sufficient sensing resources for transmission during that active time. For example, if the number of sensing results that the WTRU may be able to collect from the time of data arrival to the active time is below a threshold, the WTRU may delay transmission to the following DRX cycle. In such case, a WTRU may:
    (i). Not collect any sensing results until the following DRX cycle, or until a defined time period after the current DRX cycle.
    (ii). Perform sensing on fewer resources (minimum number of resources) for the current and/or next DRX cycle, and/or possibly sensing on a larger number of resources for the following DRX cycle.

The active time associated with other peer WTRUs for which the transmitting WTRU has unicast links.
  a. For example, a WTRU may communicate with multiple peer WTRUs, each in a unicast link/connection, and each WTRU having its own active time. A transmitting WTRU may select the number and/or allowable slots for transmission to a specific peer WTRU by taking into account the active time of one or more other WTRUs. For example, a transmitting WTRU may select or prioritize slots which:
    (i). Fall into the active time of multiple or a maximum number of peer WTRUs the transmitting WTRU is communicating with.
      1. For example, a WTRU may select slot x for transmission to WTRU A and WTRU B (both peer WTRUs) if slot x is within the active time of both WTRU A and WTRU B, and it may exclude slot y for transmission to WTRU A if slot y is in the active time of WTRU A, but not also in the active time of WTRU B.
      2. For example, a WTRU may first select the slots which are common to multiple WTRUs active times, before it selects the slots which are not common, when determining the set of candidate slots for which sensing slots need to be selected.
    (ii). Are located a fixed/(pre) configured distance away from the active slots associated with another WTRU's active time.
      1. For example, if slot x is located in the active time of the peer WTRU (WTRU A), and x+k is located in the active time of another peer WTRU (WTRU B), the transmitting WTRU may select slot x for a candidate slot for transmission to peer WTRU (WTRU A). Alternatively, the transmitting WTRU may exclude slot x as a candidate for WTRU A if x+k is not located in the active time of WTRU B.

Negotiation/Configuration by the peer WTRU.
  a. For example, a WTRU may receive from the peer (RX) WTRU, the subset of slots in its active period in which the said WTRU should select resources from. The peer (RX) WTRU may select such resources based on known resources used by other WTRUs also in unicast with it. For example, the peer (RX) WTRU may allocate non-overlapping resources to each of its TX WTRUs transmitting to it within the active period, based on methods described herein.

b. Alternatively, the TX WTRU may receive (e.g. from the peer WTRU or the network) a set/pool of resources representing the specific resources on which the TX WTRU should perform sensing. The TX WTRU can derive the resources on which it can perform transmission to the RX WTRU (while the RX WTRU is configured in DRX) based on the specific resources in which the TX WTRU has sensing results, and the associated DRX configuration. For example, a TX WTRU may be configured with values of periodicity (e.g. k) or number of consecutive sensed slots prior to an active time (e.g. N), as described herein, and the WTRU may derive the usable transmission slots in the active time of the peer WTRU based on the received set/pool of resources.

The latency and/or value of T2.

a. For example, a WTRU may consider only the slots of the active time which fall within the T2 window (PDB), possibly associated with any pending or potential transmission at the TX WTRU.

b. Specifically, the slots which may be considered for transmission may span over a single DRX active time, or multiple DRX active times, depending on the latency (PDB) of the transmission, the DRX cycle of the peer WTRU, and the arrival time of a packet for transmission. The WTRU may consider only the slots in the active time which fall in the latency budget of the WTRU, as per these factors.

The expected or buffered amount of traffic at the TX WTRU for the specific peer WTRU.

a. For example, a WTRU may select a larger number of potential transmission resources in the on duration if the amount of traffic (either expected, or already buffered at the TX WTRU) is larger. A TX WTRU can determine the expected amount of traffic to be transmitted based on:
  (i). The QoS of the active flows.
    1. For example, a WTRU may compute the amount of expected traffic from the data rate requirements of each or combination of the active/configured QoS flows.
  (ii). The SLRB configurations of each configured SLRB.
    1. For example, each SLRB may be configured with a separate expected data rate parameter which the WTRU uses to compute the expected amount of traffic that may be pending during the active time.
  (iii). The number of SLRBs configured.
  (iv). The number of periodic SL processes active for transmission to a particular peer WTRU.
  (v). The pattern and/or amount of past traffic arrival from upper layers intended for the peer WTRU.
    1. For example, the TX WTRU may predict the expected amount of traffic based on the average amount of traffic received from upper layers over a past time period. For example, a TX WTRU may determine the expected amount of traffic as a function of the time difference between recent packet arrival from upper layers.

Based on WTRU location.

a. For example, a WTRU may determine the pattern of slots or subset of slots in the DRX active time for which transmission is allowed based on its own location (e.g. determined by its geolocation, or a zone ID in which the WTRU finds itself).

(B.) WTRU Determines Whether to Select a Set of Sensing Resources Associated with a Peer WTRU (i.e. Whether to Perform Sensing Associated with a Peer WTRU)

In one solution, a WTRU may determine whether to select a set of sensing resources and/or a set of potential transmission resources within a peer WTRUs active time (on which sensing should be performed). In the case a WTRU selects a set of sensing resources, the TX WTRU may monitor such resources for collection of sensing results. In the case the WTRU does not select a sensing resources, the TX WTRU may not collect sensing results, possibly associated with a specific peer WTRU. Such determination may be made at each active period of the peer WTRU, or some time (pre) configured or predefined time prior to the active time (e.g. once per DRX cycle).

Such determination may be made per peer WTRU (i.e. per unicast link). In one example, if the TX WTRU determines to not select a set of sensing resources associated with a peer WTRU, the TX WTRU may perform transmission by random selection. In another example, if the TX WTRU determines not to select a set of sensing resources associated with a peer WTRU, the TX WTRU may delay transmission to the next active period (i.e. next DRX cycle) for that peer WTRU (or at a later time when sensing results may be available). The determination and/or the time instant when the determination is made may depend on any or combination of the factors defined above for determining the number of slots. Specifically, any or a combination of:

The measured CBR:

a. For example, the time in which the TX WTRU determines whether to perform sensing for a particular peer WTRU may depend on the measured CBR.

b. For example, whether sensing is to be performed for a particular peer WTRU (or for example, whether no sensing is performed and the TX WTRU uses random selection) may depend on the measured CBR.

Whether data is pending for transmission to the peer WTRU, possibly a certain time before the start of the active period of the peer WTRU, and/or the arrival time of such data for transmission.

a. For example, the TX WTRU may decide to select sensing resources and start sensing upon the arrival of data at the TX WTRU for transmission. Alternatively, the TX WTRU may start sensing upon the arrival of data if such data arrives prior to a (pre) configured or predetermined time prior to the active time. Otherwise, the TX WTRU may decide to not perform sensing, or start sensing at a future (pre) configured or predetermined time (e.g. associated with the next DRX cycle. Such (pre) configured or predetermined times may further depend on the same factors for determining whether to perform sensing.

QoS (e.g. priority, latency) of the data to be transmitted, and/or SLRB configuration:

a. For example, the TX WTRU may decide to perform sensing if the priority of the data to be transmitted to the peer WTRU is above a threshold. For example, the TX WTRU may be configured (in the SLRB/LCH) with rules related with whether to perform sensing for transmissions containing data from that SLRB. The WTRU may perform sensing if expected transmission to be performed at the active time of the peer WTRU will contain data from a LCH for which sensing is required/configured and/or for which other conditions configured in the SLRB are met.
b. For example, the TX WTRU may determine to perform sensing if the latency (e.g. remaining PDB) associated with a pending transmission is larger than some value, possibly where such value may depend on the DRX configuration of the peer WTRU (e.g. a function of the DRX cycle). For example, if the TX WTRU determines that the remaining PDB is larger than a function of the DRX cycle, the TX WTRU may initiate sensing for that peer WTRU at a later time.

The WTRU type (which may be tied to a WTRU capability, sensing capacity, etc.):
a. For example, the rules for determining whether to perform sensing or not may further depend on the WTRU type, whereby a WTRU with reduced sensing capability may initiate sensing in more limited number of cases.

The size of the active time and/or the number of resources, possibly associated with the peer WTRU.
a. For example, the WTRU may perform sensing if the active time, or the portion of the active time which falls in the PDB of one or more transmissions, is smaller than a threshold The active time associated with other peer WTRUs for which the transmitting WTRU has unicast links.
a. For example, a TX WTRU may determine to not perform sensing specific to the peer WTRU if it has enough sensing results associated with a different peer WTRU for which the active times are related. Specifically, a TX WTRU may determine a minimum amount of sensing results required for a peer WTRU. If such minimum is achieved based on the sensing decision associated with another WTRU, the TX WTRU may not initiate additional sensing configuration and selection of sensing slots for the said peer WTRU.

Negotiation/Configuration by the peer WTRU.
a. For example, the peer WTRU may turn on/off sensing at the TX WTRU and/or modify the decision criteria by sending a PC5-RRC message to the TX WTRU.
b. For example, the peer WTRU may send a reconfiguration to the TX WTRU changing the resources associated with sensing for the peer WTRU.

The expected or buffered amount of traffic at the TX WTRU for the specific peer WTRU.
a. For example, if there is no data pending for transmission to the peer WTRU, or if the amount of data pending for transmission to the peer WTRU is below a threshold, the TX WTRU may decide to not perform sensing on slots for the TX WTRU.

In one example embodiment, a TX WTRU may be configured with a threshold CBR. If the measured CBR is above a threshold, the TX WTRU performs selection of a set of sensing resources and/or candidate resources within the peer WTRUs active time. Otherwise, the TX WTRU performs random selection to transmit data within the active time of the peer WTRU.

In another example embodiment, a TX WTRU may be configured with a set of SLRBs on which sensing is required. If the TX WTRU receives data associated with one or more such SLRB at some time period prior to the active time, the TX WTRU may initiate sensing and select a set of sensing resources. Otherwise, the TX WTRU may perform random selection. Alternatively, a TX WTRU may perform sensing as long as it has at least one configured SLRB which requires sensing. Otherwise, the TX WTRU may perform sensing.

In another example, a WTRU may determine whether to select a set of sensing resources associated to the peer WTRU depending on whether it received (from upper layers) data for transmission to the peer WTRU for some time period. Specifically, a WTRU may reset a timer upon reception (from upper layers) of data intended to a peer WTRU. When such timer is running, the TX WTRU may determine to select a set of candidate resources and corresponding sensing resources associated with those candidate resources. If the timer has expired, the TX WTRU may determine not to perform sensing associated with that peer WTRU. In the case of data arrival while the TX WTRU has not selected specific sensing resources associated with the TX WTRU (i.e. the WTRU did not perform sensing associated with the active time of the specific peer WTRU), the TX WTRU may perform any of the following:

It may delay transmission of the data to the next active period of the peer WTRU.
a. The WTRU may select such action, for example, if the PDB associated with the data is not expired at the next active period.

It may limit transmission to a resource in the active period for which a WTRU has sensing results (possibly associated with the active period of a different WTRU).

It may perform transmission based on random selection.
a. The WTRU may select such action depending on other factors mentioned herein (e.g. CBR is below a threshold, or based on the QoS of the data to be transmitted).

It may drop the packet to be transmitted.

In another example embodiment, the TX WTRU may determine the time instant (e.g. a number of slots prior to the start of a future active period of the peer WTRU) in which it should decide whether to select a set of candidate resources and corresponding sensing resources for that specific WTRU (associated with the corresponding active period) based on the SLRB configuration and/or QoS and/or expected priority of transmissions to the peer WTRU. At such determined slot, the TX WTRU may determine whether to perform sensing on slots associated with that TX WTRU, potentially until the next active time, based on any criteria described above/herein. For example, if the TX WTRU does not have any data buffered for transmission to the peer WTRU at that time, the TX WTRU may assume it does not perform selection of sensing resources for that TX WTRU.

Combinations of the above example, either in condition for determination, or in determining whether to check one condition, when another has been satisfied, are also possible.

(C.) RX WTRU Determines the Subset of the Active Slots to be Used by Each TX WTRU In one solution, the subset of the active slots to be considered by a TX WTRU for transmission to a particular peer WTRU may be provided by the peer WTRU (i.e. the RX WTRU). An RX WTRU may determine such subset of resources and provide such subset to each of its corresponding TX WTRUs.

In one example, an RX WTRU may split its active period into one or more subsets of slots (possibly non-overlapping) and provide a particular subset to a given WTRU using any or a combination of the following rules:

The RX WTRU can be configured with a maximum number of TX WTRUs which can be configured with the same subset of slots (where such configuration may depend further on QoS and/or CBR).

The RX WTRU can assign a subset of slots to multiple WTRUs having similar QoS/SLRB configuration, while WTRUs with different QoS can be assigned to different subsets.

The RX WTRU can assign the number of slots in each subset based on the QoS level associated with the WTRUs assigned to that subset.

The RX WTRU can determine the number of subsets, the number of WTRUs per subset, or the number of slots per subset based on the measured CBR.

The RX WTRU can determine the specific slots for a TX WTRU based on the TX WTRUs own active time for reception.
  a. Specifically, the TX WTRU can select the slots which overlap with the TX WTRUs active time, or which are the shortest time difference compared with the TX WTRUs active time for reception (assuming they do not overlap).

(D.) WTRU Determines the Minimum Number/Set of Candidate Transmission Resources for which to Derive Sensing Resources/Sensing Slots, when Communicating with Multiple Peer WTRUS In one solution, a WTRU may determine the minimum number of candidate resources and/or the candidate resource set when performing unicast transmissions to multiple peer WTRUs, possibly having different active times. In one example, a WTRU may be configured with a minimum number of candidate resources to respect for each WTRU. Such minimum number of candidate resources may vary for each WTRU based on factors mentioned herein (e.g. QoS, SLRB, L2 ID, service, amount of data pending for transmission to that WTRU, etc.). A TX WTRU may select the number of candidate resources, potentially within a (pre) configured or (pre) determine time period, such that the minimum number of candidate resources for each peer WTRU is respected. The TX WTRU may then derive the sensing slots based on such derived set of candidate resources.

(E.) WTRU Determines the Sensing Slots from the (Possibly Subset) of Slots Associated with the Active Period In one solution, a WTRU may determine its sensing slots (possibly for a specific peer WTRU, or for all peer WTRUs) as a function of the slots associated with the active time of the peer WTRU(s) or the minimum set of candidate resources. A WTRU may further consider only a subset of the active time of the peer WTRU, as determined in the previous solution, and may derive the sensing slots from this subset. The sensing slots may be determined as a function of time relative to the time of one or more of the (possibly subset) of slots associated with the active time. The sensing slots may occur earlier in time with respect to the (possibly subset) of active slots of the peer WTRU. A transmitting WTRU may determine one or multiple related sensing slots associated with each active slot. Alternatively, a transmitting WTRU may determine one or multiple related sensing slot for a specific slot in the active period (e.g. first slot of the active period) a group of slots in the active period, or all slots in the active period.

A WTRU may determine the sensing slots to be the slot or set of slots which:

Occur contiguously in time for some period prior to one or more of the active slots:
  a. For example, all slots which occur prior to a particular active slot, up to a (pre) configured or defined time value (e.g. N slots) prior to a particular active slot.

Occur periodically in relation to a particular active slot (or multiple such active slots), or integer multiples of periodic slots that occur prior to a particular active slot.
  a. For example, all slots k×m, where k may be a (pre) configured or predefined periodicity (e.g. 100 ms) and m may be an integer multiple (1, 2, 3, . . . ).
    (i). For example, a set of R periodicities (100 ms, 400 ms, 500 ms) can be configured, and the WTRU may determine all k×m slots for the different periodicities given by R.
  b. For example, the WTRU may consider, as sensing slots, all possible sets of k×m slots derived from each of the selected (subset) of active slots in the active time of the peer WTRU.

Occur a number of slots before or after a particular multiple of periodic slots, as determined above.
  a. For example, a WTRU may consider the p slots before, and/or the p slots after the slots k×m to be sensing slots.

A WTRU may determine any of the above parameters (e.g. k, m, N, p, R-set) as a function of any or combination of:

Configuration of the unicast link.
  a. For example, the WTRU may receive such parameters from the peer WTRU as part of the unicast link/SLRB configuration and/or DRX configuration.

QoS (e.g. priority) of the data pending for transmission, or QoS of any active services configured for transmission.

SLRB (Sidelink radio bearer) configuration.
  a. For example, a WTRU may be configured with such parameters in the SLRB configuration. For a configured SLRB, the WTRU may apply such parameters for determination of the sensing slots. For example, a WTRU may determine the parameters to apply for a specific peer WTRU based on one of (e.g. worst case) SLRB configurations, or may determine the sensing slots as a combination of the each of the SLRB configurations.

Channel Busy Ratio/Channel occupancy Ratio (CBR/CR).
  a. For example, a WTRU may be configured with one or more of the above parameters to be used for a given range of CBR/CR.

(F.) WTRU Determines the Sensing Slots by Considering all Peer WTRUs

In one solution, which can be used in conjunction with deriving the sensing slots from the timing of the active period, a WTRU may determine a set of sensing slots, possibly for a period of time (e.g. a DRX cycle) by considering the required sensing times associated with multiple peer WTRUs. Specifically, a WTRU may be configured to select the set of sensing slots such that (for example):

A sensing slot can be used to determine availability of resources in the active time of multiple peer WTRUs, or a maximum number of peer WTRUs.
  a. For example, a WTRU may perform sensing on a slot if it allows determination of availability of resources within the active time of at least S WTRUs, where S may be configured.
  b. For example, a WTRU may prioritize selection of a slot over another slot for determination of the set of sensing slots if it results in determination of the availability of resources in the active time of more WTRUs.

A sensing slot or set of sensing slots leads to the maximum number of active occasions when considering all of the active times of the peer WTRUs.

a. For example, a WTRU may be configured with a maximum number of slots (within a predefined period) on which it can perform sensing. The WTRU may select the sensing slots according to the rules defined by any of the parameters above (k, m, N, p, R-set) such that the resulting transmission occasions in the active times of all peer WTRUs for which the TX WTRU has sensing results is maximized. The WTRU can consider a transmission slot which is common to the active period of two WTRUs to count as two separate transmission occasions in such determination.

b. For example, a WTRU may select a set of sensing slots, possibly within a DRX configuration. The selection of such sensing slots may be left to WTRU implementation or may follow certain rules. Following selection of such slots, a WTRU may perform transmission on the subset of resources of the active time of one or more WTRUs based on the rules defined by the parameters above (k, m, N, p, R-set). Furthermore, a WTRU may be allowed to include a resource as a potential transmission resource if the number of sensing slots associated with such transmission resources (based on the parameter set) meets a (pre) configured/predefined condition, where such condition may further depend on other factors mentioned herein (e.g. SLRB, QOS, etc.).

In such a solution, a WTRU may limit or restrict the allowable transmission occasions in the peer WTRUs active period by considering the determined sensing slots. Specifically, if a given slot in the active period has been sufficiently sensed (i.e. a sufficient number of associated slots to that slot have been monitored), the transmitting WTRU may select the resource in the active period. Associated slots may be defined in terms of the rules described herein (i.e. based on parameters k, m, N, p, R-set).

(G.) WTRU Requests Sensing Results from a Peer WTRU Based on Triggers Related to DRX In one solution, a WTRU may request sensing results from a peer WTRU based on triggers related to DRX and/or lack of sensing results resulting from DRX. Specifically, the WTRU may request sensing results upon any or a combination of the following:

The WTRU receives data for transmission to a peer WTRU, while the WTRU and/or peer WTRU is in DRX.

The WTRU does not have sufficient sensing results for transmission in the peer WTRU's active time.

The WTRU does not have sufficient candidate resources within the peer WTRU's active time in which the WTRU has sensing results.

The WTRU cannot accumulate sufficient sensing results by the time the instant of transmission will occur.

The DRX configuration of the peer WTRU(s) and/or of the said WTRUs require the request of sensing results.

The WTRU may determine sufficient sensing results based on criteria described herein (e.g. QoS, CBR, etc.). In one example, a TX WTRU may receive a PDU for transmission to a peer WTRU to be made within the peer WTRU's active time. The WTRU may further determine that the number of candidate resources in the peer WTRU's active time for which the TX WTRU has sufficient sensing results is below a (pre) configured threshold, where such threshold may be dependent on CBR, and/or QoS. In such case, a TX WTRU may trigger a request for sensing results from a peer WTRU.

In another example, a TX WTRU may determine to request sensing results based on its own DRX configuration and/or the DRX configuration of a peer WTRU, such as, based on a criteria derived from:

The value of any of its DRX configuration, such as the length of the on-duration, the DRX cycle, the offset of its active time (potentially with respect to the active time of a peer WTRU), etc.

The amount of overlap between its DRX active time and/or the DRX active time of the peer WTRU(s) and/or of different peer WTRUs.

The amount of overlap between its DRX active time and resources required for sensing needed to transmit in the peer WTRU's active time.

(H.) WTRU Transmits Sensing/Assistance Information to a Peer WTRU Based on Triggers Associated with DRX In one solution, a WTRU may transmit sensing/assistance information to a peer WTRU at specific times, or based on triggers related to DRX. Such triggers may be any or a combination of the following:

At the start of, or any specific time relative to the start of the RX active time of the WTRU.

At the expiry of a timer, or when a counter reaches some preconfigured value, where such timer/counter may measure.

a. A period of time over which the WTRU has not received or performed transmissions, potentially from/to a specific peer WTRU.

b. A period of time over which the WTRU has received or performed a number of transmissions which is below a threshold, specifically from/to a peer WTRU.

c. An inactivity time (e.g. an inactivity timer), or a period of time following the expiry of such inactivity timer.

At the change from one type of DRX behavior to another type of DRX behavior (e.g. short DRX to long DRX).

In one example embodiment, a WTRU may transmit sensing/assistance information to a peer WTRU at the start of its RX active time whenever the WTRU has not received any data from its peer WTRU following a (pre) configured number of active times (e.g. DRX cycles).

(I.) WTRU Releases a Set of Sensing Resources Associated with a Peer WTRU

A WTRU may release a set of sensing resources or a sensing resource pool associated with a peer WTRU. In such cases, the WTRU may stop monitoring the said resources or pattern of resources. Such release can occur:

Upon reception of a link release message (PC5-RRC connection release) from the peer WTRU.

Upon reception of a link release message from upper layers.

Upon triggering of SL RLF associated with the unicast link.

Following a timer associated with transmission such as a timer which is restarted upon the arrival of data (from upper layers) for transmission to the peer WTRU associated with the unicast link.

(J.) Sensing Configuration can Depend on the Activity Behavior/State Associated with the Arrival of Data for Transmission In one solution, a WTRU may change the sensing configuration, possibly associated with a specific peer WTRU or multiple peer WTRUs, based on the activity behavior of the arrival of data from upper layers for transmission, possible associated with a specific peer WTRU, possibly associated with a specific QoS and/or SLRB. A change of the sensing configuration may consist of any of the following:

- Changing (increasing, decreasing, etc) the amount of resources sensed by the TX WTRU. For example, this may consist of changing values of k, m, N, p, R-set described herein. For example, an event associated with activity behavior of the transmission may result in increasing/decreasing the value of one such parameter from a first value to a second value, or increasing/decreasing the value by some fixed amount.
- Changing (increasing, decreasing, etc) the amount of candidate resources for transmission, possibly to a specific peer WTRU, possibly within the active resources of the peer WTRU. For example, an event associated with activity behavior of the transmission may result in increasing/decreasing the number of candidate resources for a peer WTRU from a first value to a second value, or by a fixed amount.
- Starting/stopping the monitoring of TX pool for the purposes of sensing.
- Changing the type of resource selection to be performed by the TX WTRU, such as between random selection, partial sensing, and full sensing.
- Changing the number of resources, possibly consecutive, possibly occurring at some time (e.g. immediately prior to, or some number of subframes prior to) a specific subframe in the active period of the peer WTRU (e.g. the beginning of the active period, or the first candidate subframe for transmission in the active period).

The conditions, or specific configurations/configuration changes occurring as a result of the activity behavior may further depend on any of the following:

- The QoS or LCH/SLRB of the data associated with data triggering the change in configuration
- The measured CBR.
- Measurements at the peer WTRU, such as RSRP or CQI measurements, or similar such measurements performed at the said WTRU itself.

Activity behavior associated with transmission may consist of any event associated with the arrival of data for transmission, possibly to a peer WTRU, such as:

- The arrival of a PDU for transmission to the peer WTRU.
- A change in the rate of arrival of PDUs for transmission to the peer WTRU.
- The setting/resetting of a timer associated with the arrival of data for transmission to the peer WTRU.
- The expiry of such timer.
- An event associated with the amount of data received, possibly over a fixed time period
  a. For example, the amount of data received over the last N seconds exceeds a threshold or goes below a threshold.
- An event, or status associated with the buffer occupancy at the TX WTRU.
  a. For example, the amount of data in the buffers at the TX WTRU, possibly associated with a specific peer WTRU, exceeds a threshold, or goes below a threshold, possibly for a period of time.
- Any event that is generated as a combination of the above events.

In one example embodiment, a TX WTRU may change the number of values of k used (i.e. the number of periodicities to be monitored by a TX WTRU as part of its partial sensing) based on one or more timers associated with the arrival of data for transmission. Specifically, a WTRU may be configured with a first set of periodicities (e.g. 100 ms, 200 ms, etc) initially. Upon expiry of a first timer, the WTRU may change to a smaller such set. Upon expiry of a second timer, the WTRU may change to an even smaller such set. And so on. The WTRU may reset such timer, and move to the initial set of periodicities, upon the arrival of a PDU from upper layers for transmission.

In one example embodiment, the number or percentage of candidate resources considered by the TX WTRU, possibly occurring in the active period of the peer WTRU, may be determined by the amount of data in the TX buffers of the peer WTRU, possibly associated with a specific peer WTRU. The TX WTRU may then determine the number resources in the TX pool to be monitored for sensing based on the candidate resources using a partial sensing configuration described herein. The WTRU may determine the actual partial sensing configuration (e.g. k, m, N, p, R-set) based on other methods described herein. In addition, the number of candidate resources for a given buffer occupancy may further depend on the measured CBR and/or the QoS/SLRB configuration of the data. For example, the TX WTRU may be configured with a number of candidate resources for each combination of CBR and/or priority associated with the data in the buffers.

In one example embodiment, a TX WTRU may perform sensing on the TX pool as long as a timer associated with the arrival of data, possibly where such timer is specific to the peer WTRU, is running. Specifically, when the timer is running, the TX WTRU performs sensing according to a configuration of resources in the TX pool. The WTRU may (re) sets the timer upon arrival of a PDU for transmission. When the timer expires, the WTRU stop sensing (i.e. monitoring of the TX resource pool for collection of sensing results). Furthermore, if a TX WTRU does not have sufficient sensing results at the moment of transmission, possibly associated to the resources required to reach a specific peer WTRU (e.g. WTRU's active time), a WTRU may perform random selection.

It should be noted that, in addition to the examples given above, any solution described elsewhere herein in the context of varying the monitoring of the RX pool (i.e. DRX configuration) based on the arrival of data for transmission can also be applied to the monitoring of the TX pool for the purposes of collecting sensing results.

WTRU Uses Sensing Result Output to Determine the Activity Behavior

In one embodiment, a WTRU may use the output/results of sensing for resource selection to determine and/or modify its activity behavior. Activity behavior may include monitoring of PSCCH for reception. Activity behavior may further include decoding of PSCCH and storing of SCI for sensing. Activity behavior may further include processing/use of sensing results for resource selection. For example, a WTRU may use the results of sensing to determine the frequency with which, or timing of when it monitors sidelink for its transmissions intended to it. For example, a WTRU may use sensing results, or the results of resource selection procedure to determine which resources it can use to perform sensing/resource selection in the future.

In one example, the WTRU may determine its number of blind decoding for a given slot and/or the amount/pattern of slots on which it performs blind decoding for SCI based on sensing results. For example, a WTRU may increase/decrease the amount of blind decoding per slot, or the number of slots on which it performs blind decoding, based on any of:

- The number of resources in the sensing window in which the measured RSSI is above a threshold.
- The number of resources in the sensing window which are considered occupied/reserved based on resource selection criteria;
  - (i) possibly with preconfigured values/criteria for the priority of transmission/reception used to determine occupancy.
  - (ii) possibly with values/criteria for the priority of transmission/reception used to determine occupancy that are derived from QoS of the services active at the WTRU.
- The measured CBR.

In another example, the WTRU may use results of sensing to control any timer or related aspect related to activity behavior as discussed herein. For example:

- A WTRU may reset an inactivity timer related to DRX if it sensing results indicate activity (e.g. activity may be determined based on measured RSSI above a threshold or number of occupied resources below a threshold).
- A WTRU may determine its start/end time or duration of an on time or monitoring time based on the activity of the sensing results (e.g. the WTRU may select the time/frequency resources of the on time based on the concentration of occupied resources based on sensing results).

(A). Activity on a First Pool Measured by Sensing Triggers Activity on a Second Pool For example, a WTRU may be configured to monitor sensing results associated with a first pool of resources and may initiate monitoring of a second pool (either for reception, or for sensing results for transmission) when some conditions associated with the first pool of transmissions is met, such as the following or any other conditions associated with sensing results described herein:

- the number/percentage of available/occupied resources is above/below a threshold.
- the RSSI (possibly averaged over multiple resources) associated with a percentage of resources in the first pool is above/below a threshold.
- result of one or more resource selection procedures performed on the first pool results in an insufficient number of resources determined available for selection.

The WTRU may stop monitoring the second pool when the conditions associated with initiating monitoring of the second pool are no longer met, possibly for a period of a time (associated with a timer).

TX Pool Switch Upon Lack of Availability in Resource Selection Procedure:

In one example, a WTRU may perform sensing and resource selection on a first pool of resources. Specifically, the WTRU may be configured to monitor a first pool of resources for sensing over a (pre) configured sensing window and use the results of such monitoring in the selection of resources for its own transmissions. Following one or more resource selection procedures for transmission, a WTRU may initiate sensing and resource selection on a second TX pool if some conditions associated with the one or more resource selection procedures for transmission are met. Such conditions may be based on the amount/percentage of available resources found by the sensing procedure (e.g. the percentage of available resources in the last N consecutive resource selection procedures at the WTRU is below a threshold). The WTRU may then use the second resource pool for sensing and resource selection until another condition is met. Such second condition for the return to sensing of the first resource pool may be based on the expiry of a timer alone (i.e. the WTRU performs sensing and resource selection on the second pool for some (pre) configured timer period). Alternatively, the condition for return may be based on a second condition associated to the resource selection results (e.g. percentage of available resources from resource selection of the first and/or second pool is above a second threshold).

Figure 6:
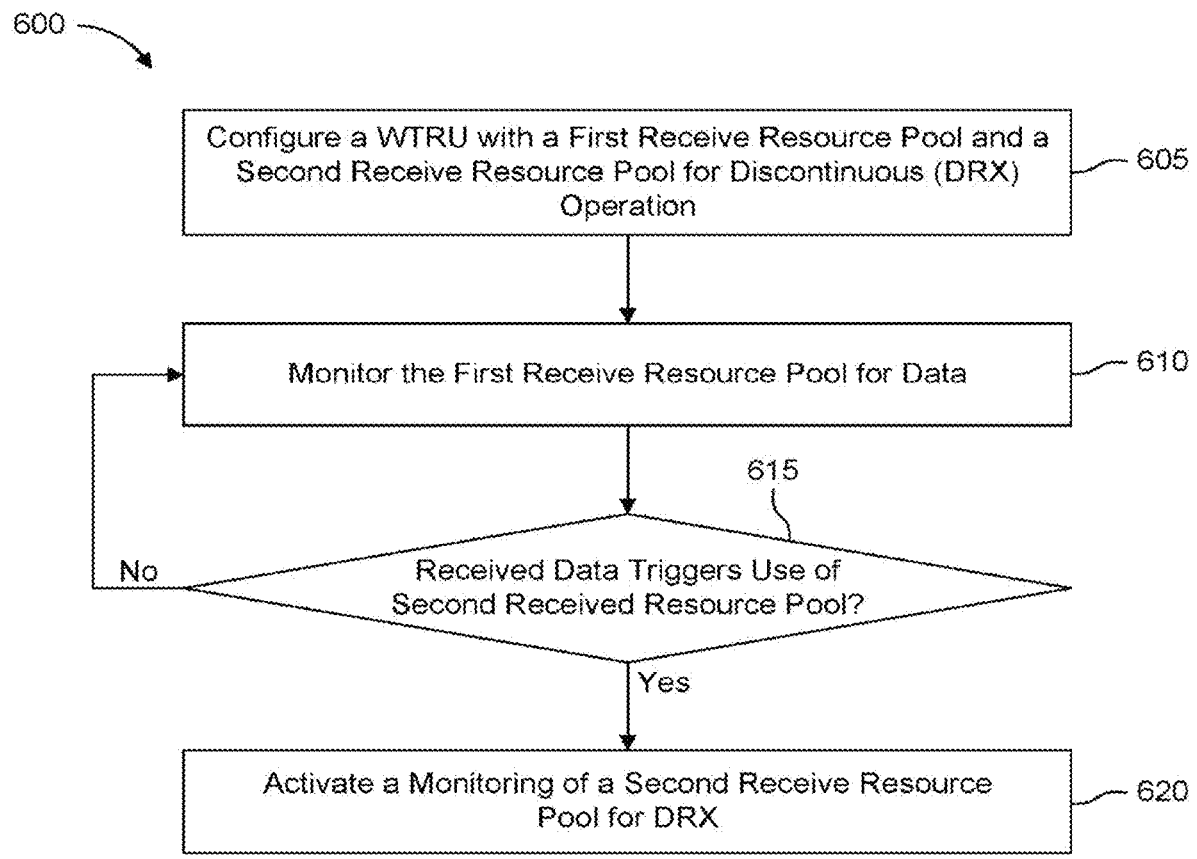
FIG. 6 depicts a flow diagram for a procedure involving the use of one or more receive resource pools.

In one example based on the above concepts related to DRX operations and the use of multiple RX resource pools, use of a first RX resource pool may trigger the use of a second RX resource pool. FIG. 6 depicts an overall method 600 of the use of a second RX resource pool. At 605, it is assumed that a RX WTRU is configured with a first receive resource pool and a second receive resource pool. The second receive resource pool may be for use with a discontinuous reception (DRX) operation. In one instance, the RX WTRU uses the first RX resource pool to process information from a TX WTRU. At 610, the RX WTRU monitors the first RX resource pool for data. Such data can induce activity/behavior in the RX WTRU as described above.

At 615, data obtained from monitoring the first RX resource pool is processed to determine if a trigger is present to use the second RX resource pool for processing. If such a trigger is decoded from data of the first RX resource pool, then, at 620, the second RX resource pool is activated for monitoring for DRX based on the activity of the first RX resource pool.

Activating the second RX resource pool in the RX WTRU may be based on one or more of:

- reception of data within the first RX resource pool.
- reception of transmissions from the TX WTRU using the first RX resource pool that exceed a density threshold.
- reception of one or more transmissions using the first RX resource pool that exceeds a priority threshold.
- determining a location of the TX WTRU with respect to the RX WTRU, or
- determination of a type of transmission from the TX WTRU received by the RX WTRU.

In one instance, activating/monitoring the second RX resource pool based on reception of data within the first RX resource pool may include starting a timer upon the reception of data and decoding on the second RX resource pool until expiry of the timer.

Activating/monitoring the second RX resource pool based on reception of transmissions from the TX WTRU using the first RX resource pool that exceed a density threshold may include monitoring the second RX resource pool until the transmission from the TX WTRU drops below the density threshold.

In one instance, activating/monitoring the second RX resource pool based on reception of one or more transmissions using the first RX resource pool that exceeds a priority threshold comprises monitoring the second RX resource pool until the transmission from the TX WTRU drops below the priority threshold.

In one instance, activating/monitoring the second RX resource pool based on determining a location of the TX WTRU with respect to the RX WTRU may include determining location information from sidelink control information (SCI) and decoding on the second RX resource pool when the location information from the TX WTRU is unchanged from a previous location.

In one instance, activating/monitoring the second RX resource pool based on determination of a type of transmission from the TX WTRU received by the RX WTRU may include monitoring the second RX resource pool if the type of transmission is any of unicast, groupcast, broadcast, data or control, periodic or asynchronous, or feedback transmission.

Figure 7:
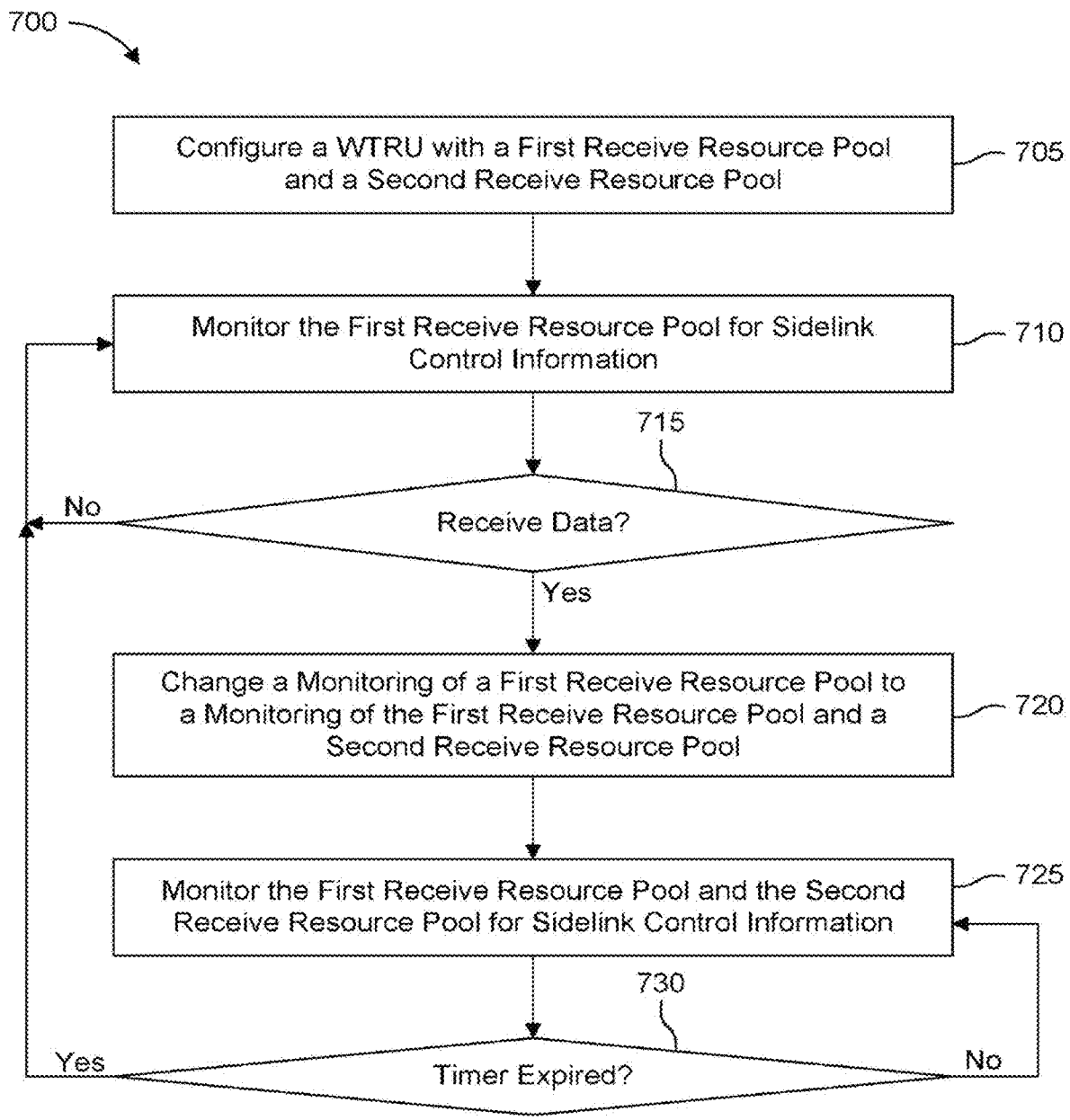
FIG. 7 depicts a flow diagram for another procedure involving the use of one or more receive resource pools.

In one example related to DRX operations, use of a first RX resource pool may trigger the use of a second RX resource pool based on data, such as QoS data, from the first RX resource pool. FIG. 7 depicts an overall method 700 of the use of a second RX resource pool. At 705, it is assumed that a RX WTRU is configured with a first receive resource pool for a receive operation and a second receive resource pool for a discontinuous reception (DRX) operation. In one instance, the RX WTRU uses the first RX resource pool to process information from a TX WTRU or possibly from a core network element via a core network connection.

At 710, the RX WTRU monitors the first RX resource pool for relevant data that concerns RX WTRU operations. Such data may be received via the first RX resource pool via SCI data of a PSCCH or PSFCH received by the RX WTRU. At 715, if data is received, then the method 700 may move to 720 where the monitoring of both resource pools is changed. At 720, the monitoring from the first RX resource pool to monitoring of both the first RX resource pool and a second RX resource pool is activated. At 725, the monitoring by the RX WTRU of both the first and second RX resource pools continues as data is received from either or both pools.

At 725, the RX WTRU may determine if a timer, such as an inactivity timer, has expired. If the timer has not expired, then monitoring at 725 continues. If the timer has expired, the RX WTRU may revert to monitoring only the first RX resource pool at 710.

In one instance, the reception of data is a reception of sidelink control information (SCI) containing a minimum communication range (MCR) element. An MCR element may be included in QoS-related data. In one instance, the timer, such as the inactivity timer, may be restarted on condition that the RX WTRU is within a minimum communication range value signaled in the SCI. In one instance, the RX WTRU sets a value of the inactivity timer based on the received data.

In one example, the aspects described in FIG. 7 are applied to describe a method for use in a receive wireless transmit receive unit, RX WTRU, having received configuration information including a first RX resource pool and a second RX resource pool, includes changing a monitoring from the first RX resource pool to monitoring the first RX resource pool and a second RX resource pool upon reception of data, and changing the monitoring from the first RX resource pool and the second RX resource pool back to monitoring the first RX resource pool after an elapsed time.

In the above, changing the monitoring from the first RX resource pool to the monitoring of the first RX resource pool and the second RX resource pool upon reception of data may include changing the monitoring based on a received transmission from a transmitting, TX, WTRU or a core network entity. The reception of data may include reception of sidelink control information, SCI, containing a minimum communication range, MCR, information element. Changing the monitoring from the first RX resource pool and the second RX resource pool back to monitoring the first RX resource pool after an elapsed time may include changing the monitoring to the first RX resource pool upon expiration of an inactivity timer. The above may include resetting the inactivity timer on condition that the RX WTRU is within a minimum communication range value signaled in the received data. The RX WTRU may reset the inactivity timer using a value of the inactivity timer based on received QoS data. The RX WTRU may reset the value of the inactivity timer based on the QoS data of the last received transmission.

Figure 8:
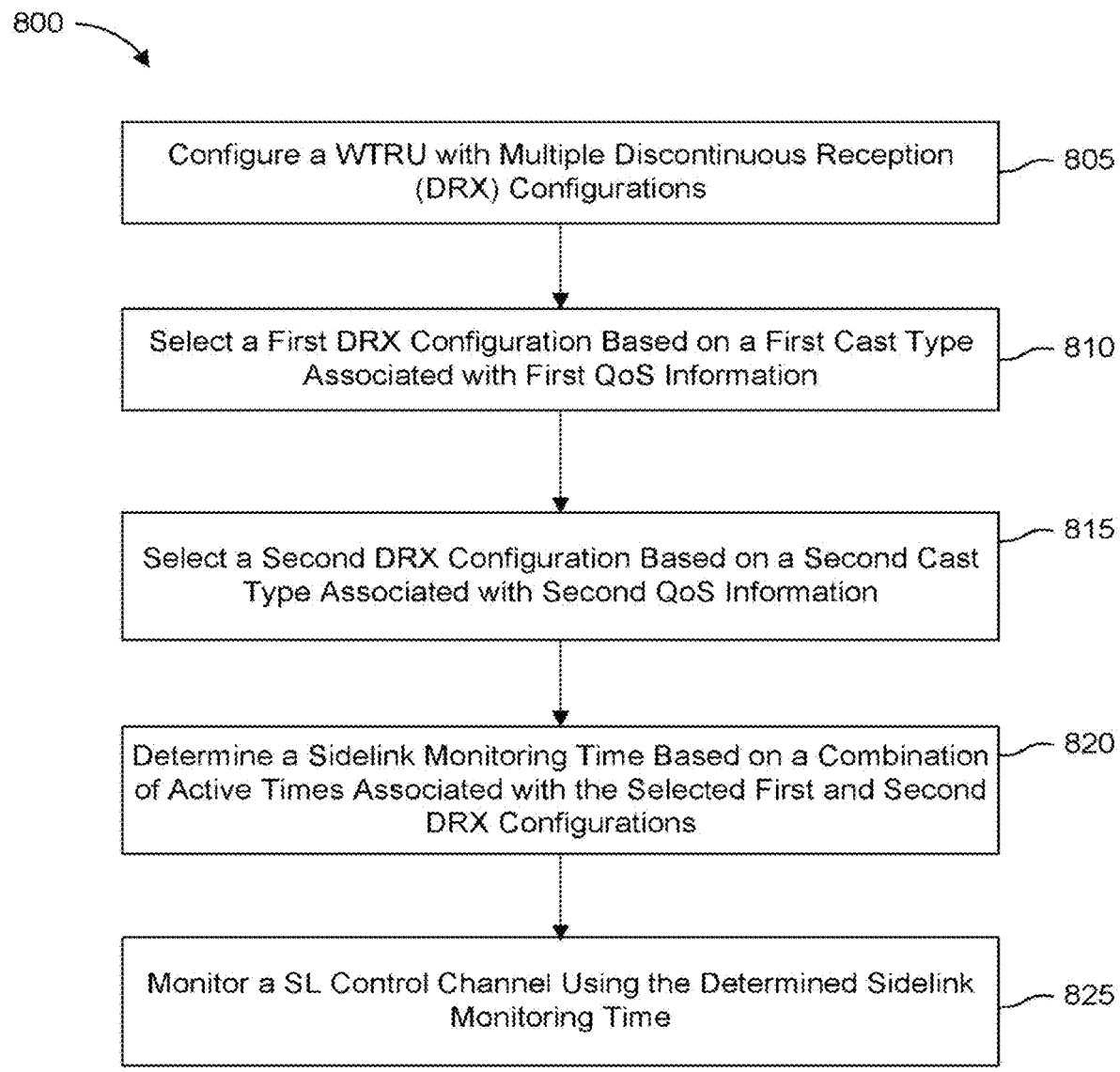
FIG. 8 is an example method of determining a sidelink monitoring time for a WTRU.

FIG. 8 depicts an example method 800 to determine a DRX operation in a WTRU with respect to a determination of a sidelink monitoring time as described above herein. In FIG. 8 at 805, the WTRU may be configured with multiple DRX configurations. These multiple DRX configurations may be obtained in any of the above described methods. These include a peer WTRU provided DRX configuration, a static DRX configuration obtained via signaling from a network, or a pre-configuration of a DRX configuration occurring at the WTRU. At 810, a first DRX configuration of the multiple DRX configurations in the WTRU may be selected based on a first cast type and an associated first QoS for a first SLRB. In one example, a unicast transmission cast type may be associated with unicast associated/related QoS information which may indicate a selection of a particular DRX configuration (a first selected DRX configuration). At 815, a second DRX configuration of the multiple DRX configurations may be selected based on a second cast type and an associated second QoS for a second SLRB. In one example, a groupcast transmission cast type or a broadcast transmission cast type may be associated with different associated/related QoS information which may indicate a selection of a particular different DRX configuration (a second selected DRX configuration).

Having the two selected DRX configurations, a sidelink monitoring time may be determined at 820. The sidelink monitoring time may be determined based on a combination of an active time related to the selected first DRX configuration and the active time related to the selected second DRX configuration. As indicated above herein, a WTRU may determine that it is to be active (e.g. monitors SL PSCCH) when at least one of the active times indicate the WTRU should be active. In one example, the determination at 820 may include a determination that at least one of the active times associated with a selected DRX configuration indicates that the WTRU be in an active monitoring state. Having determined the sidelink monitoring time, the WTRU, at 825 may monitor the SL control channel using the determined sidelink monitoring time.

Thus, a method for determining DRX operation in a WTRU having information indicating multiple DRX configurations includes determining the sidelink monitoring time. Such a method includes selecting a first DRX configuration from the multiple DRX configurations based on a first cast type associated with a first QoS information for a first SLRB configuration, and selecting a second DRX configuration from the multiple DRX configurations based on a second cast type associated with a second QoS information for a second SLRB configuration. The WTRU may then determine a sidelink monitoring time based on a combination of an active time associated with the first DRX configuration and an active time associated with the second DRX configuration. The WTRU may then monitor the SL control channel using the determined sidelink monitoring time.

In one instance, the sidelink monitoring time may be determined using a combination of at least one of the active times associated with a selected DRX configuration that indicates an active monitoring state for the WTRU. The determined sidelink monitoring time may include time slots for monitoring a sidelink control channel transmission.

In one instance, the DRX configuration may include of any of a DRX cycle, a DRX on duration timer, a DRX inactivity timer, a hybrid automatic repeat request round-trip timer, or a retransmission timer associated with defining the sidelink monitoring time. The first DRX configuration selection may be based on a first cast type and the second DRX configuration selection may be based on a second cast type. The cast types may include a unicast transmission type, a groupcast transmission type, or a broadcast transmission type. The multiple DRX configurations may be one or more of a DRX configuration obtained from a peer WTRU, a static DRX configuration obtained via signaling from a network, or a pre-configuration at the WTRU. The selection of a first DRX configuration may be further based on an identifier of a transmitter. The selection of a first DRX configuration may include selecting one of the multiple DRX configurations based on QoS information received from a peer WTRU. The selection of a second DRX configuration may include selecting one of the multiple DRX configurations based on QoS information associated with a broadcast transmission or a groupcast transmission.

Power Saving States and Transitions

A WTRU may be configured with multiple (e.g. more than one) power saving states, where each power savings state may have a different intensity of power savings based on the required operation to be performed by the WTRU in that state. A given power saving state may be characterized by the requirement of the WTRU to perform or not perform any of the following operations associated with SL:

Monitor PSCCH only (i.e. SCI-1 only).
  a. A WTRU may be (pre) configured with a set of SCI-1 formats to monitor in a power saving state. For example, a compact SCI-1 format with small payload size may be (pre) configured for a light sleep state and/or a SCI-1 monitoring only state. In another example, a SCI-1 format for wake-up/sleep indication may be (pre) configured for a deep/light/micro sleep state.

Monitor PSCCH and PSSCH (i.e. monitor/decode both SCI-1 and SCI-2).
Monitor, or not monitor PSFCH.
Perform or not perform CSI requests.
Perform or not perform RSRP measurements.
Perform or not perform pathloss measurements.
Monitor and/or transmit SL synchronization signals/channels.
Collect/process sensing results from the monitoring of PSSCH SCI-1.
Perform partial sensing for transmission in mode 2.
Perform random selection for transmission in mode 2.

A WTRU May be Configured with a Set of Multiple Sleep States, where Each Sleep State is Associated with Decoding a Subset Set of SL Channels and/or Performing a Subset of Certain Sidelink Operations A WTRU may be configured with a power saving state associated with different operations on SL. Such operations may consist of decoding of certain physical (PHY) channels while not decoding of other PHY channels. Alternatively, such operations may consist of performing a subset of operations.

A WTRU May be Configured Sleep States Separately Defined for Transmission and Reception A WTRU may be configured with a power saving state associated with (potentially only) transmission of data. A WTRU may be configured with a power saving state associated with (potentially only) reception of data. A WTRU may have separate activity behavior associated with each of transmission and reception only sleep state, as described herein. For example, without loss of generality, a WTRU may be configured with the following sleep states, and associated WTRU behavior for each sleep state:

Deep sleep:
  a. The WTRU may not perform any monitoring/decoding of PSCCH or PSSCH.
  b. The WTRU may not perform CSI requests.
  c. The WTRU may not perform RSRP measurements.
  d. The WTRU may perform SSB/SL sync monitoring only.
  e. The WTRU may perform sync transmission if it is the sync source.

Light sleep for transmission only.
  a. In addition to any monitoring/transmission performed in deep sleep, the WTRU may additionally perform:
    (i) Monitor PSCCH (SCI-1) only (without SCI-2/PSSCH decoding).
    (ii) Monitor PSFCH.
    (iii) Collect/process sensing results.
    (iv) Perform CSI requests.
    (v) Perform RSRP measurements.

Light sleep for reception only.
  a. In addition to any monitoring/transmission performed in deep sleep, the WTRU may additionally perform:
    (i) Monitor PSCCH and PSSCH.
    (ii) The WTRU may avoid monitoring PSFCH.
    (iii) The WTRU may avoid collecting/processing sensing results.

No power savings.
  a. The WTRU, in this state, may perform all operations associated with normal SL transmission/reception.

In addition to the above sleep states, a WTRU may further perform microsleep, such that it can be configured to perform behavior associated with one sleep state in certain slots and symbols, while it may perform behavior associated with another sleep state in other slots or symbols.

In another solution, a WTRU may be (pre) configured with a set of SL power saving states. A WTRU may perform (pre) defined SL activities associated with each power saving state, as described herein. For example, without loss of generality, a WTRU may be (pre) configured with the following power saving states and its associated WTRU behavior:

SL Deep sleep:
  a. A WTRU may not perform any operations as specified above under the section titled Power Saving States and Transitions hereinabove.
  b. A WTRU may switch off all power islands (e.g. circuit groups, modules, etc.) required for a SL normal operation including the RF front-end.

SL Light sleep.
  a. A WTRU may perform operations required to maintain and/or provide a SL time and frequency synchronization based on SL synchronization signals/channels.
    (i) The operation may be performed based on SL synchronization signals/channels configuration, e.g. SL SSB/PBCH periodicity.
  b. A WTRU may switch off all power islands including the RF front-end when not performing the required SL synchronization operations.

PSCCH (SCI-1) monitoring state:
  a. A WTRU may perform PSCCH (SCI-1) monitoring and decoding (as described under the section entitled Interaction between DRX and Sensing Activity hereinabove) and associated operations in this power saving state.
    (i) The associated operations may include SL time and frequency synchronization based on SL synchronization signals/channels.
  b. A WTRU may switch off all power islands used for SL transmission and PSSCH/SCI-2 reception in this state.
PSFCH monitoring state:
  a. A WTRU may perform PSFCH monitoring and decoding and associated operations in this power saving state.
    (i) The associated operations may include SL time and frequency synchronization based on SL synchronization signals/channels.
  b. A WTRU may switch off all power islands used for SL transmission and PSCCH/PSSCH/SCI-2 reception in this state.
SL reception state:
  a. A WTRU may perform monitoring and decoding of both SCI-1 and SCI-2 and associated operations in this power saving state.
    (i) The associated operations may include SL time and frequency synchronization based on SL synchronization signals/channels.
  b. A WTRU may perform PSSCH decoding based on the SCI-1 and SCI-2 decoding result.
  c. A WTRU may perform one or multiple of the operations below based on the configuration and/or request.
    (i) RSRP measurement.
    (ii) Path loss measurement.
    (iii) CSI measurement.
    (iv) CBR measurement.
  d. A WTRU may switch off all power islands used for SL transmission in this state.
SL transmission state:
  a. A WTRU may perform PSCCH/PSSCH transmission and associated operations in this state.
    (i) The associated operations may include SL time and frequency synchronization based on SL synchronization signals/channels.
  b. A WTRU may not perform sensing in this state and apply random resource selection.
  c. A WTRU may apply resources granted in a DCI received from gNB.
  d. A WTRU may perform PSFCH monitoring and reception in this state when HARQ is enabled for the transmission.
  e. A WTRU may switch off power islands used for SL control channel monitoring and decoding.
Normal SL operation (no power saving) state.
  a. A WTRU may perform all SL operations associated with normal SL transmission/reception.
  b. The SL transmission may be based on full and/or partial sensing.
  c. A WTRU may switch on all power islands used for SL operations.
(A.) a WTRU May Perform Temporary PSFCH Decoding Only Following a Last Transmission In one example, a WTRU may perform a last SL transmission, following which, the WTRU may move to any of the sleep states. A WTRU may, following such transition, continue to monitor PSFCH temporarily. Without loss of generality, a last transmission may correspond to any SL transmission where further monitoring of PSCCH (e.g. for reception or for sensing-based transmission) is not required, such as a WTRU being configured with a periodic transmission only and being in sleep state with respect to reception. A WTRU may determine the amount of time for which it monitors PSFCH based on any or a combination of the following:
  (Pre) configured timer following the last transmission.
  Until the PSFCH slot associated with the last transmission.
    a. For example, following the last transmission, a WTRU may perform possible retransmissions without monitoring of SCI. The WTRU may perform monitoring of PSFCH only at PSFCH slots associated with the WTRU's (re) transmissions and ignore all other PSFCH monitoring.
  Until the reception of a HARQ feedback, possibly of a specific type, associated with the last transmission.
    a. For example, the WTRU may stop monitoring PSFCH upon reception of HARQ ACK.
    b. For example, the WTRU may stop monitoring PSFCH upon reception of the last HARQ ACK associated with each WTRU in the group.
    c. For example, the WTRU may stop monitoring PSFCH upon reception of a (pre) configured number of HARQ ACK received from a subset of WTRUs in the group.

A WTRU may be configured with triggers for moving between one state to another state. A combination of triggers may be used to determine which of the multiple states a WTRU can transition. Alternatively, a WTRU may be allowed only certain state transitions (i.e. possible second states) from a first state based on (pre) configuration of predefined in specifications. Alternatively, the target state may depend on both the trigger and the initial state.

Arrival of Data for Transmission May Independently Transition the WTRU to a Transmission Only Sleep State.

A WTRU may be configured with a trigger for transition between two or more states based on the arrival of data in the WTRU buffers for transmission.
  For example, a WTRU may transition from deep sleep to light sleep for transmission only upon arrival of data at the WTRU buffers for transmission. A WTRU may further be configured with one or more logical channels for which such transition should occur if data arrives at the buffers of such LCH.
  For example, a WTRU, while in light sleep for transmission only, may further receive a trigger based on reception/related sleep state. In such case, a WTRU may transition to no power savings state. Alternatively, the WTRU may transition to a state associated with the combination of behaviors associated with both light sleep for reception only and light sleep for transmission only.
  For example, a WTRU may stay in the state allowing transmission (e.g. light sleep for transmission, or no power savings state) until one of the following:
    a. Expiry of a timer, where such timer is (re) started upon the arrival of data for transmission at the same LCHs (or any LCH).
    b. Indication from upper layers of the absence of data.

A WTRU May Change the Transmission Resource Pool/Sensing Mechanism as a Result of State Transition.

In one solution, a WTRU may change the transmission resource pool, and/or the sensing mechanism during, or some time following, a change of sleep state. A WTRU may associate transmission using a specific transmission resource pool to operation while in a specific sleep state.

For example, a WTRU may use random selection from an exceptional resource pool (or a pool associated with random selection) when the WTRU performs transmission while in deep sleep and/or in light sleep for reception only. For example, a WTRU may use full sensing based resource selection when the WTRU performs transmission while in light sleep for transmission or no power savings state. For example, a WTRU may perform random selection from the exceptional resource pool during the first N slots following transition from deep sleep to light sleep for transmission, and after N slots, may perform full sensing.

For example, a WTRU may use sensing resources provided by another WTRU when the WTRU performs transmission while in deep sleep and/or in light sleep for reception only. For example, a WTRU may use sensing results provided by another WTRU during the first N slots following transition from deep sleep to light sleep for transmission, and after N slots, may perform full sensing.

Although features and elements are provided above in particular combinations, one of ordinary skill in the art will appreciate that each feature or element can be used alone or in any combination with the other features and elements. Thus, unless otherwise specifically indicated hereinabove, features or aspects of one embodiment may be readily combined with features of another embodiment. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the methods, apparatuses and systems provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect.

What is claimed is:

1. A wireless transmit/receive unit (WTRU), the WTRU comprising:
   a processor configured to:
     receive a plurality of discontinuous reception (DRX) configurations from a network node, each DRX configuration associated with one or more sets of Quality of Service (QOS) parameters, each DRX configuration including a sidelink (SL) DRX cycle value and an SL on-duration value, the plurality of DRX configurations associated with SL broadcast and/or groupcast transmission;
     on condition that multiple SL DRX cycle values are associated with a destination layer-2 ID, wherein the multiple SL DRX cycle values are included in the plurality of received DRX configurations associated with the one or more sets of QoS parameters, select a smallest SL DRX cycle value from the multiple SL DRX cycle values associated with the destination layer-2 ID;
     on condition that multiple SL on-duration values are associated with the destination layer-2 ID, wherein the multiple SL on-duration values are included in the plurality of received DRX configurations associated with the one or more sets of QoS parameters, select a largest SL on-duration value from the multiple SL on-duration values associated with the destination layer-2 ID; and
     monitor the sidelink based on the selected SL DRX cycle value and the selected SL on-duration value.

2. The WTRU of claim 1, wherein the plurality of DRX configurations are received from the network node in a system information block (SIB).

3. The WTRU of claim 1, wherein each DRX configuration includes an SL inactivity timer value.

4. The WTRU of claim 1, wherein the processor is further configured to:
   on condition that multiple SL inactivity timer values are associated with the destination layer-2 ID, wherein the multiple SL inactivity timer values are included in the plurality of received DRX configurations associated with the one or more sets of QoS parameters, select a largest SL inactivity timer value from the multiple SL inactivity timer values associated with the destination layer-2 ID; and
   monitor the sidelink based on the selected SL inactivity timer value.

5. The WTRU of claim 1, wherein the one or more sets of QoS parameters comprise a PC5 QoS Identifier (PQI).

6. The WTRU of claim 1, wherein the one or more sets of QoS parameters comprise a range value.

7. The WTRU of claim 1, wherein the processor is configured to:
   receive data via the sidelink during an active time determined based on the selected SL DRX cycle value and the selected SL on-duration value.

8. The WTRU of claim 7, wherein the data received via the sidelink during the active time comprises a physical sidelink control channel (PSCCH) transmission and a physical sidelink shared channel (PSSCH) transmission associated with the destination layer-2 ID.

9. The WTRU of claim 1, wherein the plurality of DRX configurations are received from the network node in a radio resource control (RRC) message.

10. The WTRU of claim 1, wherein the processor is further configured to:
receive configuration information indicating that the WTRU is to monitor for synchronization (sync) transmissions sent from a plurality of peer WTRUs;
select a sync source based on the sync transmissions sent from the plurality of peer WTRUs;
determine an activity state configuration based on the selected sync source, wherein the activity state configuration is determined based on a timing of a received physical sidelink broadcast channel (PSBCH) transmission from the selected sync source and information provided in the PSBCH transmission from the selected sync source, wherein the information provided in the PSBCH transmission comprises an indication of a period of activity; and
determine a slot for beginning an on-period relative to a slot in which the PSBCH transmission was received from the selected sync source; and
wake up in the determined slot for beginning the on-period.

11. A method implemented by a wireless transmit/receive unit (WTRU), the method comprising:
receiving a plurality of discontinuous reception (DRX) configurations from a network node, each DRX configuration associated with one or more sets of Quality of Service (QOS) parameters, each DRX configuration including a sidelink (SL) DRX cycle value and an SL on-duration value, the plurality of DRX configurations associated with SL broadcast and/or groupcast transmission;
selecting a smallest SL DRX cycle value from multiple SL DRX cycle values associated with a destination layer-2 ID in response to the multiple SL DRX cycle values being associated with the destination layer-2 ID, wherein the multiple SL DRX cycle values are included in the plurality of received DRX configurations associated with the one or more sets of QoS parameters;
selecting a largest SL on-duration value from multiple SL on-duration values associated with the destination layer-2 ID in response to the multiple SL on-duration values being associated with the destination layer-2 ID, wherein the multiple SL on-duration values are included in the plurality of received DRX configurations associated with the one or more sets of QoS parameters; and
monitoring the sidelink based on the selected SL DRX cycle value and the selected SL on-duration value.

12. The method of claim 11, wherein the plurality of DRX configurations are received from the network node in a system information block (SIB).

13. The method of claim 11, wherein each DRX configuration includes an SL inactivity timer value.

14. The method of claim 11, further comprising:
selecting a largest SL inactivity timer value from multiple SL inactivity timer values associated with the destination layer-2 ID in response to the multiple SL inactivity timer values being associated with the destination layer-2 ID, wherein the multiple SL inactivity timer values are included in the plurality of received DRX configurations associated with the one or more sets of QoS parameters; and
monitoring the sidelink based on the selected SL inactivity timer value.

15. The method of claim 11, wherein the one or more sets of QoS parameters comprise a PC5 QoS Identifier (PQI).

16. The method of claim 11, wherein the one or more sets of QOS parameters comprise a range value.

17. The method of claim 11, further comprising:
receiving data via the sidelink during an active time determined based on the selected SL DRX cycle value and the selected SL on-duration value.

18. The method of claim 17, wherein the data received via the sidelink during the active time comprises a physical sidelink control channel (PSCCH) transmission and a physical sidelink shared channel (PSSCH) transmission associated with the destination layer-2 ID.

19. The method of claim 11, wherein the plurality of DRX configurations are received from the network node in a radio resource control (RRC) message.

20. The method of claim 11, further comprising:
receiving configuration information indicating that the WTRU is to monitor for synchronization (sync) transmissions sent from a plurality of peer WTRUs;
selecting a sync source based on the sync transmissions sent from the plurality of peer WTRUs;
determining an activity state configuration based on the selected sync source, wherein the activity state configuration is determined based on a timing of a received physical sidelink broadcast channel (PSBCH) transmission from the selected sync source and information provided in the PSBCH transmission from the selected sync source, wherein the information provided in the PSBCH transmission comprises an indication of a period of activity; and
determining a slot for beginning an on-period relative to a slot in which the PSBCH transmission was received from the selected sync source; and
waking up in the determined slot for beginning the on-period.

* * * * *